(12) United States Patent
Allen

(10) Patent No.: US 11,536,544 B1
(45) Date of Patent: Dec. 27, 2022

(54) TARGET TRACKING SYSTEM

(71) Applicant: Jon Paul Allen, Tustin, CA (US)

(72) Inventor: Jon Paul Allen, Tustin, CA (US)

( * ) Notice: Subject to any disclaimer, the term of this patent is extended or adjusted under 35 U.S.C. 154(b) by 0 days.

(21) Appl. No.: 17/671,476

(22) Filed: Feb. 14, 2022

(51) Int. Cl.
*F41J 5/06* (2006.01)
*G01S 3/808* (2006.01)
*H04R 3/00* (2006.01)

(52) U.S. Cl.
CPC ............... *F41J 5/06* (2013.01); *G01S 3/808* (2013.01); *H04R 3/005* (2013.01)

(58) Field of Classification Search
CPC .............. F41J 5/06; G01S 3/808; H04R 3/005
USPC ........................................................ 367/127
See application file for complete search history.

(56) References Cited

U.S. PATENT DOCUMENTS

| | | | | |
|---|---|---|---|---|
| 7,937,878 | B2 * | 5/2011 | Sammut | F41G 1/38 |
| | | | | 89/41.17 |
| 9,004,490 | B2 * | 4/2015 | Kazakov | F41J 5/06 |
| | | | | 273/408 |
| 11,280,593 | B2 * | 3/2022 | Sitzman | F41J 5/14 |
| 2016/0258722 | A9 * | 9/2016 | Mason | F41J 5/06 |

FOREIGN PATENT DOCUMENTS

| | | | | |
|---|---|---|---|---|
| GB | 2083177 A | * | 3/1982 | ............... F41J 5/044 |
| WO | WO-2016065259 A1 | * | 4/2016 | ................ F41J 1/10 |

OTHER PUBLICATIONS https://autotrickler.com/pages/shotmarker.

* cited by examiner

*Primary Examiner* — Daniel L Murphy

(74) *Attorney, Agent, or Firm* — John D. Tran; Rhema Law Group

(57) ABSTRACT

A target tracking system and method of operation can include: generating data based on a detection of a shock wave of a bullet by target microphones, the target microphones including an offset target microphone; wirelessly transmitting the data with a target transceiver communicatively connected to the target microphones; determining a bullet speed at the target microphones based on the shock wave detected by the offset target microphone with a processor; and determining a shot placement of the bullet relative to the target microphones with the processor, the processor communicatively connected to the target transceiver.

20 Claims, 43 Drawing Sheets

TARGET TRACKING SYSTEM

TECHNICAL FIELD

This disclosure relates to target tracking, more particularly to target tracking for long-range rifle shooting.

BACKGROUND

Target practice at long-range presents many challenges; some of which have been addressed by key innovations, while many still remain. Chief among these problems is shot detection and shot placement on the target.

At some ranges, shot placement can be addressed by high power optics, steel targets, or other specialized targets intended to magnify the impact of a shot. These manual solutions fail, however, at longer ranges as even the best optics fail to provide adequate shot placement.

Furthermore, many training scenarios would benefit from different types of targets at longer ranges. Accurately determining shot placement therefore remains a challenge.

Some previous solutions have suggested electronic shot placement devices for long distance shot placement. These electronic systems can offer better detection of shot placement at longer ranges, but still suffer from many unique problems.

For example, side shooters could throw off the electronic shot detection, bumped tables or electronics can result in false readings, and external sound or low shots can result in bad shot data.

Solutions have been long sought but prior developments have not taught or suggested any complete solutions, and solutions to these problems have long eluded those skilled in the art. Thus, there remains a considerable need for devices and methods that can provide shot detection, and shot placement for long-range shooting. There remains a further need for devices and methods that can detect off-target shot misses and show arrows in the direction they missed, thereby allowing a Shooter to get on target more rapidly with successive adjustments.

SUMMARY

A target tracking system and methods, providing shot detection and shot placement for long-range shooting, are disclosed. Furthermore, the target tracking system and methods for detecting off-target shot misses and showing arrows in the direction of the missed shot, thereby allowing a Shooter to get on target more rapidly with successive adjustments, are disclosed. The target tracking system and method of operation can include: generating data based on a detection of a shock wave of a bullet by target microphones, the target microphones including an offset target microphone; wirelessly transmitting the data with a target transceiver communicatively connected to the target microphones; determining a bullet speed at the target microphones based on the shock wave detected by the offset target microphone with a processor; and determining a shot placement of the bullet relative to the target microphones with the processor, the processor communicatively connected to the target transceiver.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The target tracking system is illustrated in the figures of the accompanying drawings which are meant to be exemplary and not limiting, in which like reference numerals are intended to refer to like components, and in which.

DETAILED DESCRIPTION

Figure 1:
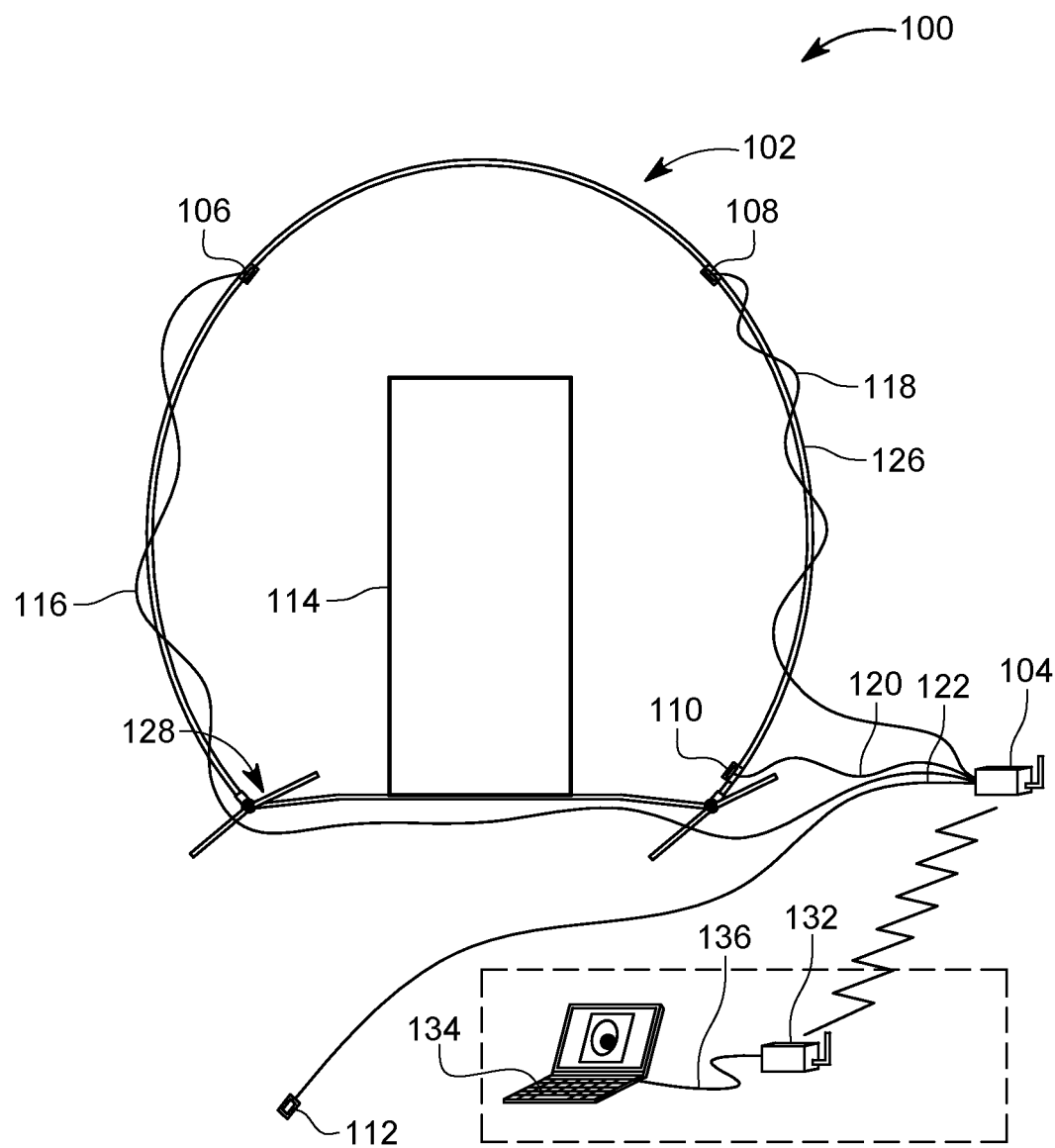
FIG. 1 is an isometric view of the target tracking system.

In the following description, reference is made to the accompanying drawings that form a part hereof, and in which are shown by way of illustration, embodiments in which the target tracking system may be practiced. It is to be understood that other embodiments may be utilized and structural changes may be made without departing from the scope of the target tracking system.

When features, aspects, or embodiments of the target tracking system are described in terms of an application, steps of a process, an operation, a control flow, or a flow chart, for example with regard to FIGS. 27-29, it is to be understood that the steps can be combined, performed in a different order, deleted, or include additional steps without departing from the target tracking system as described herein. That is, while the arrows and description generally conveys an order of operation, the steps are not to be understood as necessary predecessors to the ones that follow and there are several cases where the described order of steps is not critical and multiple steps could be reversed or merged with no adverse effect.

Furthermore, regarding the control flows of FIGS. 27-29, the application, the steps, processes, and operations cannot practically be performed in the human mind, because for instance, the human mind is not equipped to perform the operations and therefore could not, as a practical matter, be performed entirely in a human's mind. These operations require the manipulation of computer data structures, electromechanical detection of shock waves, and the output of a modified computer data structure showing the shot placement 2304 of the graphical views of FIGS. 23 and 24.

The control flows of FIGS. 27-29 reflect an improvement in the functioning of a computer and the interfaced sensors allowing the target tracking system to provide shot detection and shot placement for long-range shooting, something that computerized shooting systems are not currently capable of doing consistently and accurately.

Many of the disclosed processes, steps, and operations provide valuable solutions necessarily rooted in computer technology. That is, the disclosed processes, steps, and operations provide technical solutions arising from the inability of electronic systems to disambiguate shots, shooters, sounds, and vibrations.

The control flows of FIGS. 27-29 control the technical process or the internal functioning of the target tracking system itself together with its interfaces and sensors. The steps, processes, and operations inherently comprise, or reflect, corresponding technical features of the target tracking system.

The target tracking system is described in sufficient detail to enable those skilled in the art to make and use the target tracking system and provide numerous specific details to give a thorough understanding of the target tracking system; however, it will be apparent that the target tracking system may be practiced without these specific details.

In order to avoid obscuring the target tracking system, some well-known system configurations and descriptions are not disclosed in detail. Likewise, the drawings showing embodiments of the system are semi-diagrammatic and not to scale and, particularly, some of the dimensions are for the clarity of presentation and are shown greatly exaggerated in the drawing FIGs. As used herein the term "couple" as in coupling, coupled means a direct or indirect physical connection between elements.

Referring now to FIG. 1, therein is shown an isometric view of the target tracking system 100. The target tracking system 100 is depicted having four target microphones situated about a target frame 102 and communicatively coupled to a target transceiver 104. The target transceiver 104 can have a weatherproof enclosure and can collect sensor data and transmit it.

The microphones in the target tracking system 100 can be acoustic sensors or acoustic transducers for converting sound into a signal for use with the target transceiver 104 and will be referred to as microphones herein for descriptive convenience only. The term microphone is therefore not intended to introduce limitations of any kind on the type of acoustic sensor or acoustic transducer disclosed so long as the acoustic sensor or acoustic transducer converts sound into a signal for use with the target transceiver 104.

The signal could illustratively include electric signals transmitted over electrically conductive cables, optical signals transmitted using fiber optics or lasers, or even radio transmissions utilizing commonly available local data transmission protocol. The four target microphones can include a first target microphone 106, a second target microphone 108, a third target microphone 110, and a fourth target microphone 112 arranged in a fixed and known position relative to each other. The first target microphone 106, the second target microphone 108, and third target microphone 110 can be fixed to the target frame 102.

The first target microphone 106, the second target microphone 108, and the third target microphone 110 should retain their relative positions. That is, the distances between the target microphones should remain absolute so that the proper calculations can be made.

The time differential measurements between successive sensor triggering events along with the sensor triggering order is used to look up the closest matching X-Y coordinate from an X-Y coordinate matrix with each element linked to a unique set of differentials and sensor triggering orders. This X-Y coordinate matrix is pre-populated using the sensors in these set positions, if the sensors were to be moved further or closer to each other the time differentials and sensor triggering orders would be different for a given X-Y coordinate. This could be done but the pre-populated X-Y lookup matrix would just have to be recalculated in that case.

The first target microphone 106 and the second target microphone 108 can be separated horizontally by sixty inches. The first target microphone 106 and the second target microphone 108 can be vertically separated from third target microphone 110 by seventy-seven and a quarter inches. The third target microphone 110 is ideally at least five inches from the ground to help avoid interference and disturbances from low-lying objects such as rocks that can create sonic shadows.

The fourth target microphone 112 should be exactly 15 feet relative to third target microphone 110 along a line that is perpendicular to a sensor frame plane, which is the plane formed by the positions of the first target microphone 106, the second target microphone 108, and the third target microphone 110. Alternatively, it is contemplated that the fourth target microphone 112 could be a different predefined distance. However, it should be noted that this distance is used to calculate accurate bullet speed, which is the most critical factor as it determines the Mach angle of the shock wave and this is needed to determine the transverse speed that the shockwave propagates along the target, which is how you know where the bullet went. A multiple foot distance, meaning any distance over a foot, provides the needed and importantly missing benefit of accurate speed determination, which is difficult to obtain with shorter distances.

The fourth target microphone 112 being a predetermined distance perpendicular from the sensor frame plane is important as the target tracking system 100 uses the relationship between the fourth target microphone 112 and the third target microphone 110 as a chronometer to measure bullet speed at the target 114. Illustratively, for example, when the fourth target microphone 112 is positioned 15 feet from the third target microphone 110, this distance is divided by the time in seconds between the triggering of fourth target microphone 112 and then third target microphone 110 to calculate the bullet speed in feet per second.

This speed is used to determine a Mach angle of the bullet at the target 114 which is an important input to accurately interpret the bullet's position. The larger the Mach angle the faster the shock-wave moves longitudinally across the sensor frame plane.

It has been discovered that the target frame 102 allowing the first target microphone 106, the second target microphone 108, the third target microphone 110, and the fourth target microphone 112 to be separated and positioned as described provides an optimal 'rectangular' area inside the target frame 102. More particularly, the measurements disclosed enable the target frame 102 to completely surround a five foot wide by six foot tall target 114.

Any wider or taller and the target frame 102 can become susceptible to swaying in wind. Furthermore, a larger sized target frame would also mean longer cables would be needed or the target transceiver 104 would need to be moved closer to the impact area near the target 114.

The circular shape of the target frame 102 is more a result of how the system is mechanically setup and not necessarily a requirement for the target tracking system 100. The target frame 102 could be any shape as long as the target microphones are in the correct positions known by the target tracking system 100 so that proper calculations can be made. However, the circular shape being a result of the collapsible flexible frame is a unique feature of the system since it is easy to setup, easy to store, and portable when collapsed.

The four target microphones can be communicatively coupled to the target transceiver 104 with four cables. That is the first target microphone 106 can be coupled to the target transceiver 104 with a first microphone cable 116, the second target microphone 108 can be coupled to the target transceiver 104 with a second microphone cable 118, the third target microphone 110 can be coupled to the target transceiver 104 with a third microphone cable 120, and the fourth target microphone 112 can be coupled to the target transceiver 104 with a fourth microphone cable 122. The first microphone cable 116 and the second microphone cable 118 can be wound around the target frame 102 for cable management.

The target frame 102 can include a collapsible hoop 126 coupled to a four-piece segmented H-frame base 128. The collapsible hoop 126 can for example be seen in FIG. 17 in a collapsed configuration. The target transceiver 104 can wirelessly send and receive information with a shooter transceiver 132, which can be communicatively coupled to a laptop 134 with a USB cable 136, for example.

The shooter transceiver 132 can include a weatherproof enclosure and can detect a shot as the sound of the shot's muzzle blast, transmit a wireless 'wake-up' signal to the target transceiver 104 in order to initiate the detection sequence, receives the transmitted bullet impact data from the target transceiver, and sends the data to the User's laptop via serial cable for analysis.

The shooter transceiver 132 and the target transceiver 104 are programmed with a unique pair of wireless address codes that allow them to communicate only with each other and ignore outside signals from other units. This feature allows multiple systems to operate simultaneously on the same shooting range without data loss or interference.

The length of the USB cable 136 for the shooter transceiver 132 is six feet long which importantly allows the shooter transceiver 132 to be elevated on a tripod if necessary for good line of sight with the target transceiver 104. The USB cable 136 connection can then still reach the User's laptop USB port if it is sitting on a shooting table.

For context, the target transceiver 104 should be able to transmit and receive data with the shooter transceiver 132 from 200 yards out to about 3000 yards and would be positioned this distance from the target frame 102 during operation. The laptop 134 can include a digital display configured to provide shot analysis and shooting instructions illustrated by the graphical views of FIGS. 22-26.

Figure 2:
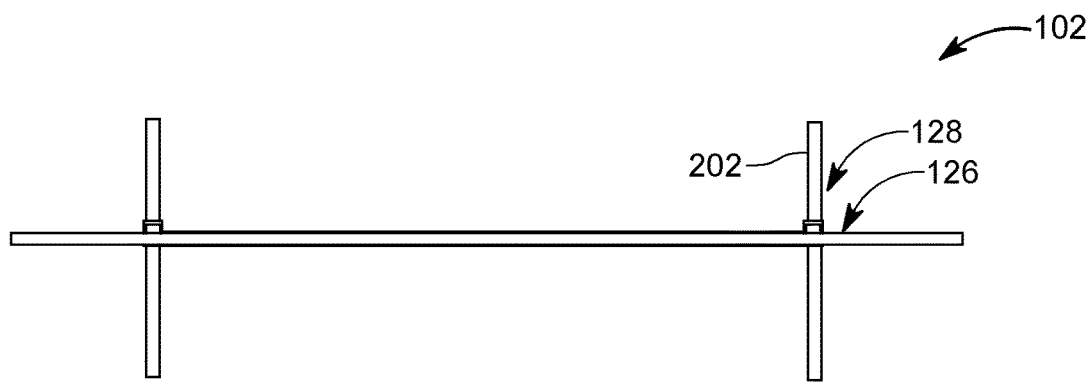
FIG. 2 is a top view of the target frame of FIG. 1.

Referring now to FIG. 2, therein is shown a top view of the target frame 102 of FIG. 1. The target frame 102 is shown having the four-piece segmented H-frame base 128 extending from underneath the collapsible hoop 126. The four-piece segmented H-frame base 128 can include h-bars 202.

The h-bars 202 can extend perpendicularly away from the collapsible hoop 126 and extend about thirty inches from tip to tip. The h-bars 202 are also positioned in line with the collapsible hoop 126 with sixty-one inches therebetween.

Figure 3:
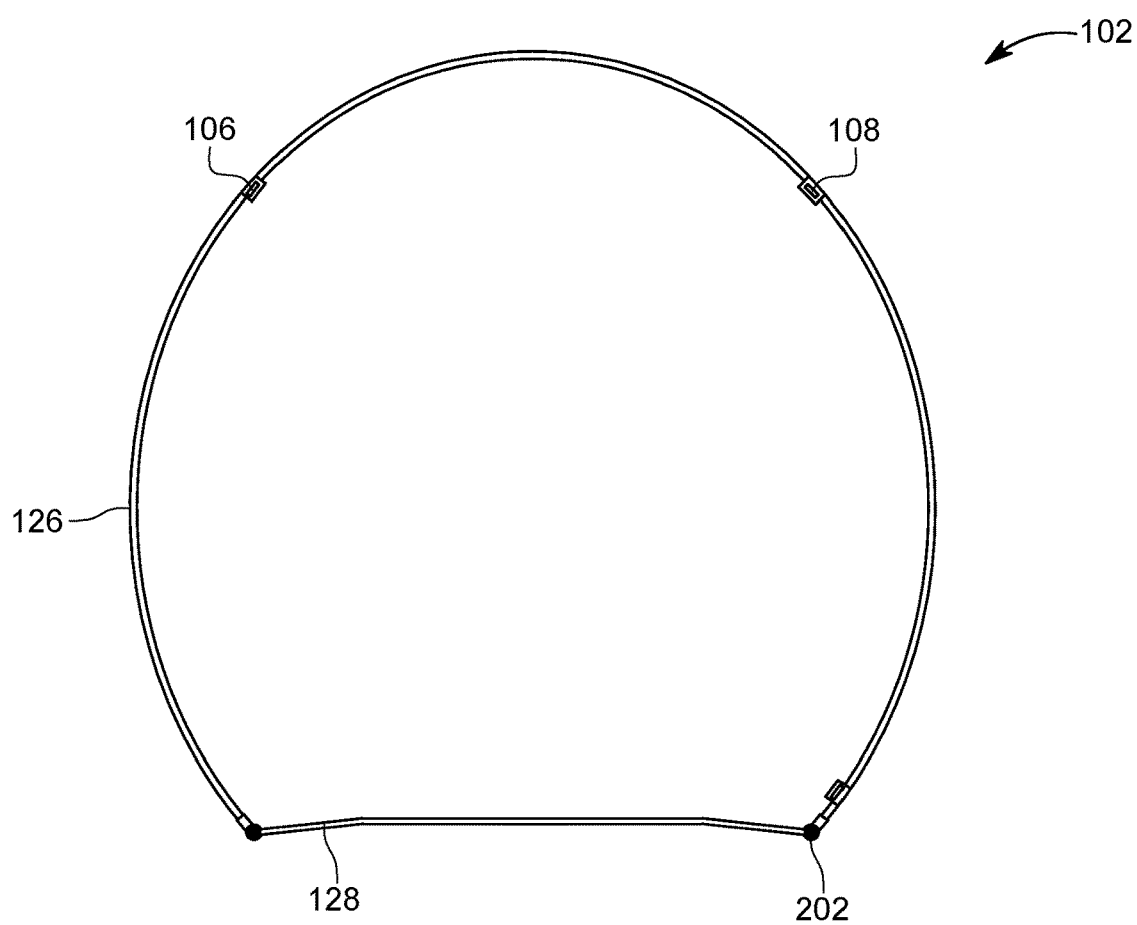
FIG. 3 is a front view of the target frame of FIG. 1.

Referring now to FIG. 3, therein is shown a front view of the target frame 102 of FIG. 1. The target frame 102 is shown having the collapsible hoop 126 in a semi-circle extending in a loop between the h-bars 202 of the four-piece segmented H-frame base 128.

At the widest part, the collapsible hoop 126 can be 84.5 inches wide and at its tallest, the collapsible hoop 126 can be 97.5 inches tall. This shape of the collapsible hoop 126 can be accomplished by providing a 110° angle between the four-piece segmented H-frame base 128 and the collapsible hoop 126.

The 110° angle has been discovered to provide at least one highly successful circular shape for the collapsible hoop 126. Larger and smaller angles could make the collapsible hoop 126 too tall and narrow or too wide and short. The 110° angle could be adjusted very slightly without significant impact as long as the relative sensor positions remain the same but the 110° angle has been discovered to provide at least one optimal circular or egg-shape that maximizes the clear rectangular area that can be fit inside the frame to accommodate the target 114 of FIG. 1.

The first target microphone 106 is shown affixed to the target frame 102 60 inches horizontally from the second target microphone 108. The center of the second target microphone 108 can be 77.25 inches vertically above the center of the third target microphone 110 and 2 inches horizontally offset from the third target microphone 110.

The four-piece segmented H-frame base 128 can extend off of the ground by 2.5 inches near the middle of the four-piece segmented H-frame base 128. The third target microphone 110 can be affixed to the collapsible hoop 126 2.5 inches above the raised four-piece segmented H-frame base 128 making the third target microphone 110 5 inches above ground level.

The 2" horizontal offset for third target microphone 110 relative to the second target microphone 108 is purely a result of the shape of the collapsible hoop 126 and not intended for any particular advantage. The third target microphone 110 can be as low as possible to the ground while remaining at least 5" above to help reduce effects of local ground disturbances like rocks, which places third target microphone 11 in a fixed spot. The first target microphone 106 and the second target microphone 108 can then be placed on the frame such that the optimal rectangular sensor field area is achieved.

The collapsible hoop 126 can be realized by utilizing a ⅜ inch segmented flexible rod frame. The four-piece segmented H-frame base 128 can be a four piece one inch pipe base.

Figure 4:
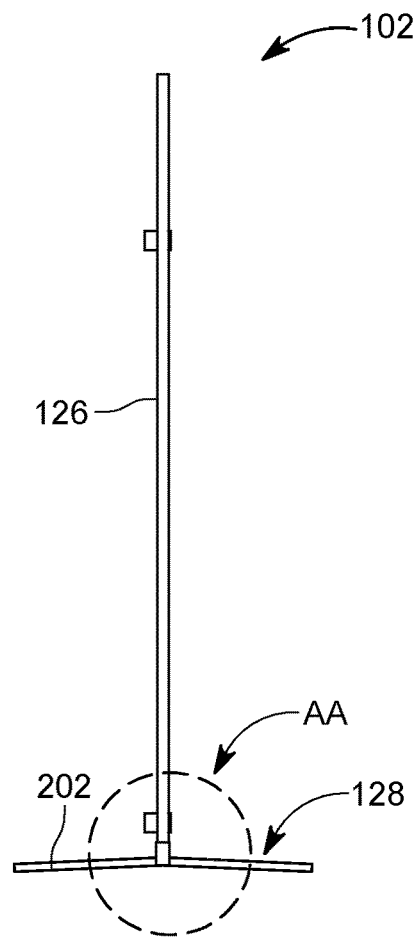
FIG. 4 is a side view of the target frame of FIG. 1.

Referring now to FIG. 4, therein is shown a side view of the target frame 102 of FIG. 1. The target frame 102 is shown having the four-piece segmented H-frame base 128 contacting the ground near the ends of the h-bars 202. The h-bars 202 angle up from the ground to near the contact point with the collapsible hoop 126.

Figure 5:
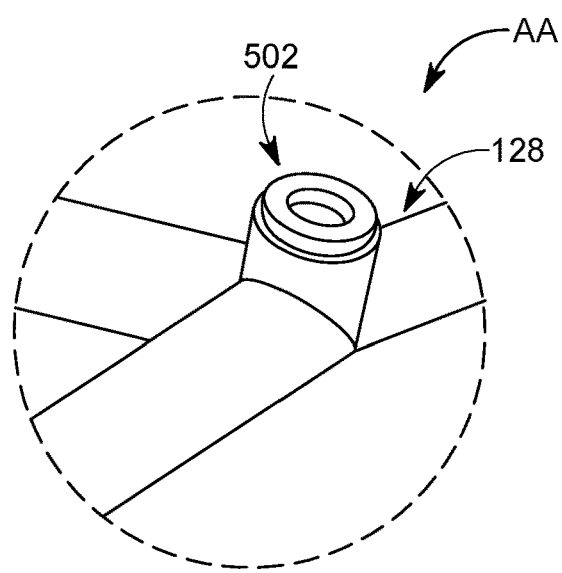
FIG. 5 is a magnified isometric view of the area AA of FIG. 4 before an attachment phase of assembly.

Referring now to FIG. 5, therein is shown a magnified isometric view of the area AA of FIG. 4 before an attachment phase of assembly. The four-piece segmented H-frame base 128 is shown having a ⅜ inch hole 502 for coupling with the collapsible hoop 126 of FIG. 1. The hole can be lined with rubber or silicon to secure the collapsible hoop 126 to the four-piece segmented H-frame base 128 without looseness or rattle.

Figure 6:
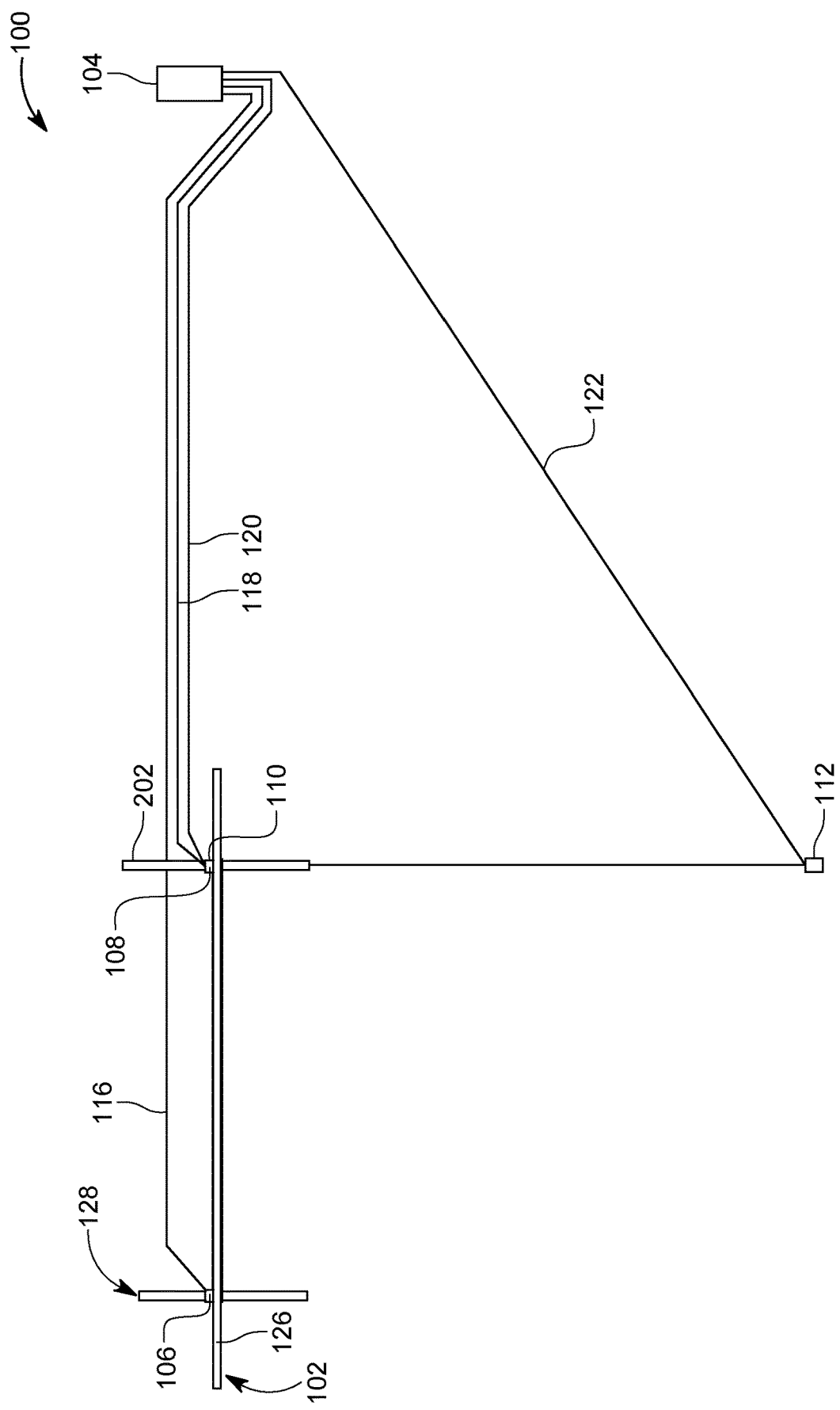
FIG. 6 is a top view of the target tracking system of FIG. 1.

Referring now to FIG. 6, therein is shown a top view of the target tracking system 100 of FIG. 1. The first target microphone 106, the second target microphone 108, and the third target microphone 110 are depicted affixed to the collapsible hoop 126 of the target frame 102 and can define the sensor frame plane. The fourth target microphone 112 can be positioned 180 inches orthogonally offset from the sensor frame plane.

The first target microphone 106 can be coupled to the target transceiver 104 with the first microphone cable 116. Similarly, the second target microphone 108, the third target microphone 110, and the fourth target microphone 112 can be coupled to the target transceiver 104 with the first microphone cable 116, third microphone cable 120, and the fourth microphone cable 122, respectively. The target transceiver 104 can be positioned 120 inches from the h-bars 202 of the four-piece segmented H-frame base 128.

The four cables can each be 25 feet in length. This cable length provides a minimum ten foot stand-off distance between the target transceiver 104 and the target frame 102. This ten foot stand-off is considered a safe distance to prevent the target transceiver 104 from getting hit since it is not considered an expendable or interchangeable part of the target tracking system 100.

Figure 7:
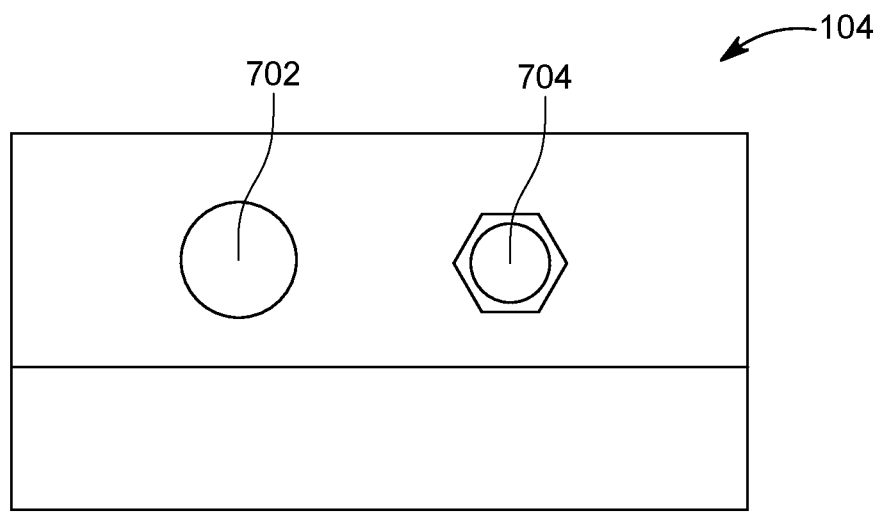
FIG. 7 is a back view of the target transceiver of FIG. 1.

Referring now to FIG. 7, therein is shown a back view of the target transceiver 104 of FIG. 1. The target transceiver 104 is shown having a power switch 702 positioned horizontally apart from a battery charge port 704.

The size of the target transceiver 104 was chosen to be as small as possible that still allowed a 9.6V rechargeable battery to be included inside and that also allowed all four cables to be ported on one end, as is shown below in FIGS. 9 and 10.

Both the target transceiver 104 and the shooter transceiver 132 of FIG. 1 are contemplated to be less than 3.5 inches in width, which allows them to fit into a standard selfie-stick tripod for elevation in the case of low-lying obstructions between the shooting and target positions.

Figure 8:
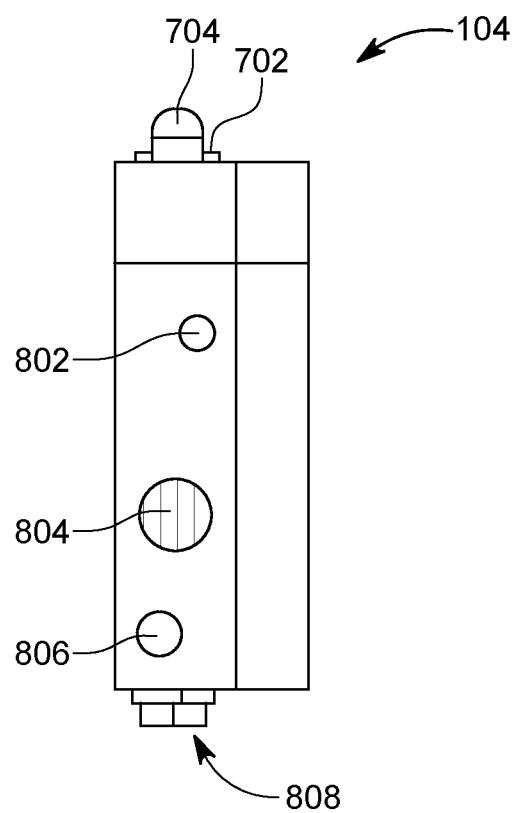
FIG. 8 is a right side view of the target transceiver of FIG. 1.

Referring now to FIG. 8, therein is shown a right side view of the target transceiver 104 of FIG. 1. The target transceiver 104 is shown having the battery charge port 704 extending 0.5 inches from the backside of the target transceiver 104.

The target transceiver 104 is further shown having an antenna port 802, an air vent 804, a humidity and temperature sensor port 806, and microphone cable ports 808. The antenna port 802 can be a 0.375 inch port. The air vent 804 can be one inch in diameter and can provide a screen to prevent contamination from entering the target transceiver 104. The one inch size for the air vent 804 was chosen to provide adequate air flow in order to prevent circuits, internal to the target transceiver 104, from overheating in hot environments.

The humidity and temperature sensor port 806 can provide a 0.5 inch opening for detecting humidity and temperature. The microphone cable ports 808 are more clearly shown below in the top view of the target transceiver 104 of FIG. 9 and in the left side view of the target transceiver 104 of FIG. 10.

The humidity and temperature sensor port 806 can provide a port for the humidity and temperature sensor of FIG. 18F below. The humidity and temperature sensor allows an accurate measurement of air density which is used in conjunction with User input bullet characteristics in order to calculate the theoretical bullet speed at the target 114 of FIG. 1.

This theoretical speed calculation is used to help determine if the third target microphone 110 of FIG. 1 and fourth target microphone 112 of FIG. 1 are operating properly. That is, this calculation essentially provides a double check of the chronometer reading which determines bullet speed at the target 114 based on the time differences between the detections of the third target microphone 110 and the fourth target microphone 112.

This air density calculation is also needed to back-calculate the ballistics coefficient of the bullet from field measurements. It is contemplated that the target tracking system 100 can back-calculate a very accurate ballistic coefficient for each shot.

It is contemplated that back-calculating the ballistic coefficient might be a primary purpose for the target tracking system 100 since determining a bullet's ballistic coefficient accurately is not easy and is very important for Shooters and Ammunition Manufacturers. The Ballistics Coefficient is a characteristic of a projectile that describes how it interacts with the surrounding air and is one factor in determining the amount of drag force slowing it.

The other factors contributing to drag force are velocity, mass, cross-sectional area, distance traveled, and air density, all of which we know from a combination of field device measurement and User input. The drag force equation can be rearranged to find the Ballistics Coefficient.

The reason the calculation is not so straightforward is because the velocity is continuously slowing throughout the bullet's trajectory so the Drag Force is changing throughout the bullet's flight. This means that it becomes a calculus problem to find the cumulative drag force over the bullet's travel.

This can be accomplished by assuming an initial estimate for the Ballistics Coefficient and then iterating the bullet's trajectory information for 10 ms increments, and then adding up the cumulative drag energy. We know the energy the bullet's starts with and ends with since we know its mass, initial (muzzle) velocity, and final velocity at the target so we can calculate the energy lost from drag over the bullets flight.

From this cumulative drag energy, the cumulative drag force is found and therefore a better, more refined Ballistics Coefficient. The process is repeated several times until the last Ballistics Coefficient estimate matches closely to the new one; or in other words, they converge. The actual humidity and temperature sensor port 806 provides an accurate measurement of the outside air versus the air inside the enclosure.

The humidity and temperature sensor of FIG. 18F below actually has a temperature sensor built into it, so both humidity and temperature can be determined by a single sensor. The temperature is needed for both the air density calculation as well as the calculation of the actual speed of sound in air. Since the speed of sound in air varies based mostly off of temperature this should be determined as a field measurement.

The speed of sound in air is needed as an input along with bullet speed to accurately calculate the Mach angle. Mach angle is used to properly locate the impact of the bullet. An air pressure sensor, for example shown in FIG. 18F is also needed as an input to calculate the air density so it is used for the same reasons as humidity.

The Mach angle of the shockwave is simply the angle from the horizontal to the leading edge of the shockwave cone. That is, with a cone pointing at the target, the Mach angle is the angle from the center horizontal axis of that cone to the edge of the cone. The formula for this very simple, it's just: Mach Angle=Arcsin(c/v) where c is the speed of sound in air and v is the speed of the bullet at the target. Depending on atmospheric conditions including temperature, humidity, altitude, etc. the speed of sound will change so that is one reason atmospheric sensors are included, to be able to get a precise speed of sound calculated.

When the cone-shaped shockwave intercepts the sensor frame plane at the target, the intersection of the cone and the target is a circle that grows outward from the impact point transversely along the sensor frame plane. Note that if the bullet is rising or plunging at an angle to the target the intersection will be an ellipse and not a circle, which is accounted for separately. The speed that this circle propagates outward on the sensor frame plane is what is called "target propagation speed." This propagation speed is critical because it is the speed that the shockwave propagates to all of the target microphones and therefore determines the time it takes to get to all of the target microphones.

A fast propagation speed will result in shorter times to trigger the sensors and vice versa for a slower propagation speed. In order to find this propagation speed on the target the Mach angle is needed which in turn relies on an accurate measurement of the speed of sound in air (c) and bullet speed at target (v).

As an example if you have a slower bullet that is traveling very close to the speed of sound (c) the cone will be very flat (Mach angle very close to 90 degree) and so the propagation speed on the target will be very fast, likewise a very fast bullet will have a narrow/sharp cone (small Mach angle) and its propagation speed on the target will be slower. An infinitely fast bullet would have a propagation speed of the speed of sound (c).

So as one example imagine a shot hitting the upper left of the target at about twice the speed of sound (moderate Mach angle), the shockwave will first pass over the fourth target microphone 112 and start the chronometer clock, then once the tip of the shockwave cone (the bullet) reaches the sensor frame plane at the impact point it begins propagating outward at the propagation speed. In this example it will hit the first target microphone 106 first, start Differential Timer #1, then hit the second target microphone 108, stop Differential Timer #1 and start Differential Timer #2, and finally hit third target microphone 110 which stops Differential Timer #2. Once it hits the third target microphone 110 it also stops the chronometer clock.

The time difference between the triggering of the fourth target microphone 112 and the third target microphone 110 (always these two) is used to calculate the bullet speed (v) since the distance between them is always fixed by design at 15 feet. This is called the Chronometer time. The angle of the bullet path is also important as part of this bullet velocity calculation. What the target tracking system 100 collects at the end of this process are the measured time durations for Differential Timer #1, Differential Timer #2, and the Chronometer time as well as the order that the sensors were hit. With this information we can accurately place the bullet impact since each possible location will have a unique set of these measured values.

It has been discovered that if either the speed of sound or the bullet speed (v) are not measured accurately then this will result in an inaccurate Mach angle which will mean an inaccurate calculation of target propagation speed which will in turn cause inaccurate time triggering between sensors which will lead us to believe that the bullet matches with an incorrect unique set of timers and order corresponding to an incorrect impact location, which was common in previous solutions using very small or no offset microphone.

Figure 9:
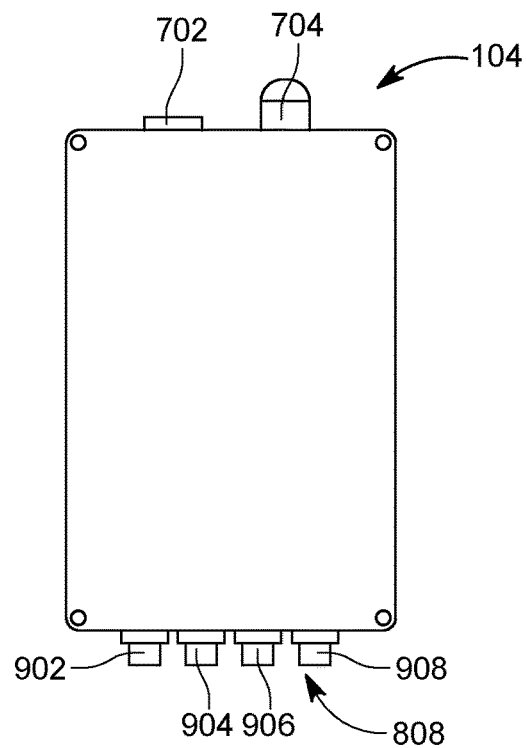
FIG. 9 is a top view of the target transceiver of FIG. 1.

Referring now to FIG. 9, therein is shown a top view of the target transceiver 104 of FIG. 1. The target transceiver 104 is shown with the power switch 702 and the battery charge port 704 extending from the back side, while the microphone cable ports 808 are depicted as evenly distributed along the width of the target transceiver 104.

The battery charge port 704 can be 0.63 inches in width and extend 0.5 inches from the back side of the target transceiver 104. The microphone cable ports 808 can each be 0.688 inches wide and extend 0.25 inches from the front side of the target transceiver 104.

The microphone cable ports 808 can include four ports, such as a first cable port 902, a second cable port 904, a third cable port 906, and fourth cable port 908. The first cable port 902 can mate with the first microphone cable 116 of the first target microphone 106 both of FIG. 1. Likewise, the second cable port 904, the third cable port 906, and the fourth cable port 908 can mate with the second microphone cable 118 of FIG. 1, the third microphone cable 120 of FIG. 1, and the fourth microphone cable 122 of FIG. 1, respectively.

Figure 10:
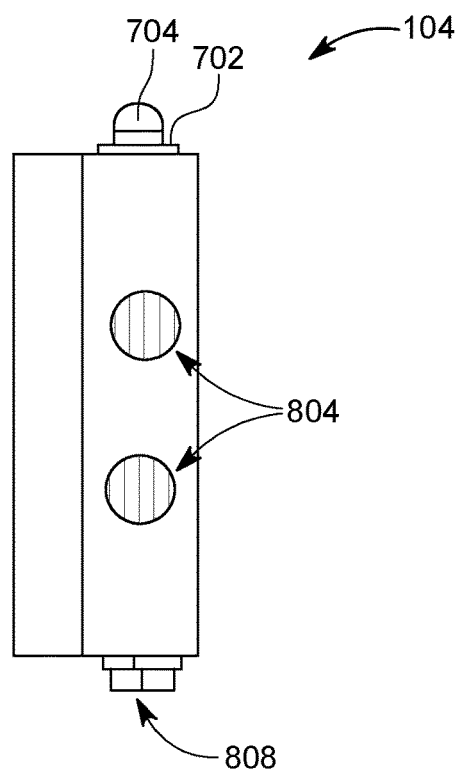
FIG. 10 is a left side view of the target transceiver of FIG. 1.

Referring now to FIG. 10, therein is shown a left side view of the target transceiver 104 of FIG. 1. The target transceiver 104 is shown having the air vents 804. The air vents 804 can each provide a one inch opening for providing adequate air flow to prevent internal circuits from overheating in hot environments. The target transceiver 104 is shown with the battery charge port 704 extending from the back side while the microphone cable ports 808 are shown extending from the front side of the target transceiver 104.

Figure 11:
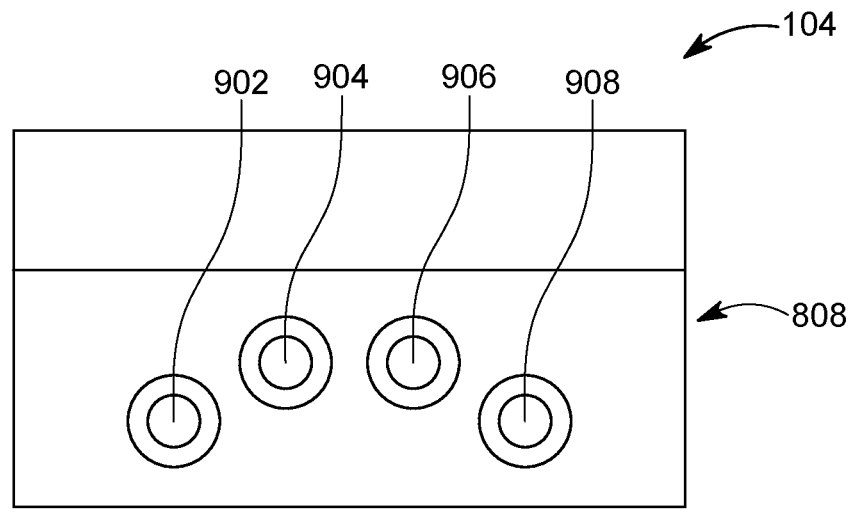
FIG. 11 is a front view of the target transceiver of FIG. 1.

Referring now to FIG. 11, therein is shown a front view of the target transceiver 104 of FIG. 1. The target transceiver 104 depicts the microphone cable ports 808 distributed thereon.

Figure 12:
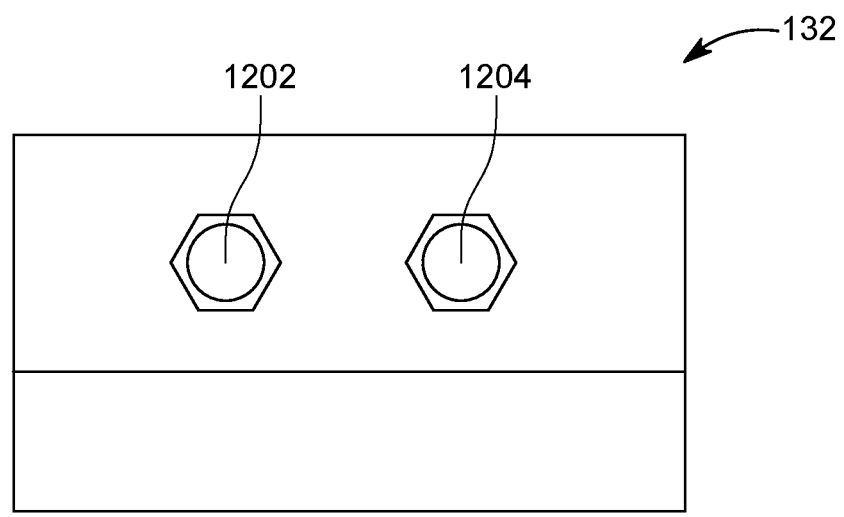
FIG. 12 is a back view of the shooter transceiver of FIG. 1.

Referring now to FIG. 12, therein is shown a back view of the shooter transceiver 132 of FIG. 1. The shooter transceiver 132 is shown having a serial cable port 1202 positioned next to a temperature sensor port 1204.

The design of the temperature sensor port 1204 is important since the temperature sensor 2016, for example of FIG. 20A below, needs to measure external air and not the air inside the enclosure. The temperature sensor for the shooter transceiver 132 is inserted inside the port cord grip plug and is then sealed from the inside so that only air external to the shooter transceiver 132 can be measured at the temperature sensor.

The temperature from this temperature sensor is averaged with the temperature at the target transceiver 104 of FIG. 1 to provide a better overall representation of outside air temperature for the air density calculation and speed of sound calculation.

Figure 13:
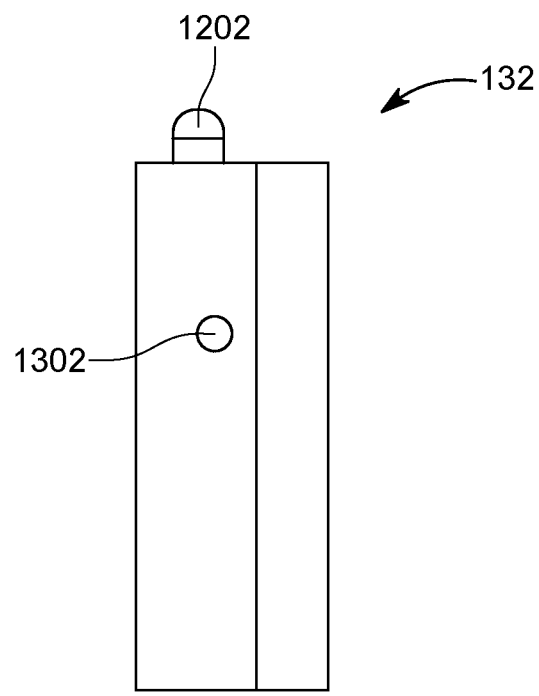
FIG. 13 is a right side view of the shooter transceiver of FIG. 1.

Referring now to FIG. 13, therein is shown a right side view of the shooter transceiver 132 of FIG. 1. The shooter transceiver 132 is shown with the serial cable port 1202 extending from the back end of the shooter transceiver 132. The serial cable port 1202 can be 0.63 inches wide and can extend 0.5 inches from the back side of the shooter transceiver 132.

The shooter transceiver 132 is further shown having an antenna port 1302 within the right side. The antenna port 1302 can be 0.375 inches in diameter.

Figure 14:
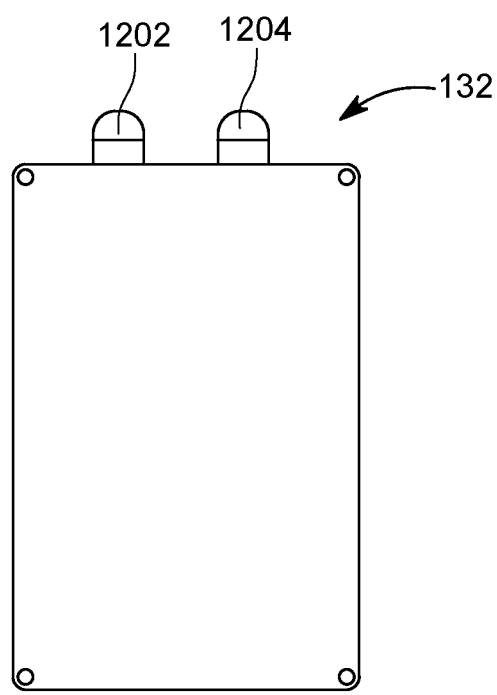
FIG. 14 is a top view of the shooter transceiver of FIG. 1.

Referring now to FIG. 14, therein is shown a top view of the shooter transceiver 132 of FIG. 1. The shooter transceiver 132 is shown having the serial cable port 1202 positioned next to the temperature sensor port 1204. The serial cable port 1202 and the temperature sensor port 1204 can be 0.63 inches wide and can both extend 0.5 inches from the back side of the shooter transceiver 132.

Figure 15:
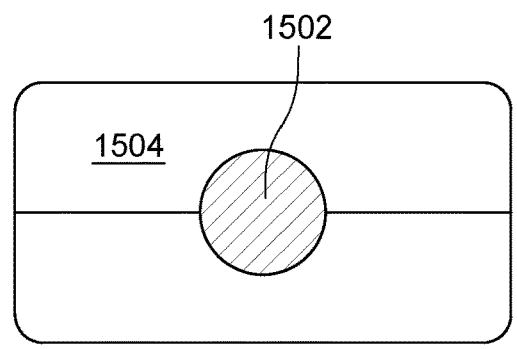
FIG. 15 is a back view of a target microphone of FIG. 1 in a first embodiment.

Referring now to FIG. 15, therein is shown a back view of a target microphone of FIG. 1 in a first embodiment. The target microphone can for example be the first target microphone 106, the second target microphone 108, the third target microphone 110, or the fourth target microphone 112, each of FIG. 1.

The individual sensor enclosure dimensions were chosen to be as small as possible to make them less likely to be struck by a bullet and can be easily replaced. Illustratively, for example, the target microphone can be 3.31 inches long, 0.56 inches thick, and 1.03 inches wide. The back of the target microphone can include a cable port 1502 for communicatively coupling with the one of the four cables connecting the target microphones to the target transceiver 104 of FIG. 1.

The four target microphone sensor assemblies each contain an internal fixed-tone speaker 1504 that emits a short pulse tone after each shot to provide a means of verifying the sensor is operational and still intact after the bullet has passed by. The status of the sensors is then reported after each shot. These tones are also used by the system to check the triggering response times for each microphone sensor relative to the others which is used as a system calibration by measuring their individual response times when measuring and detecting the speaker tones.

Environmental conditions can cause the microphone sensors to drift in sensitivity and responsiveness so this recalibration after each shot is key to maintaining accuracy. The microphone sensor assemblies are each housed inside a plastic weatherproof enclosure to prevent false triggering from the wind and to protect from moisture while retaining the ability to detect the shockwave of a passing supersonic bullet. The microphone sensors are fully enclosed so they are not susceptible to the wind.

Figure 16:
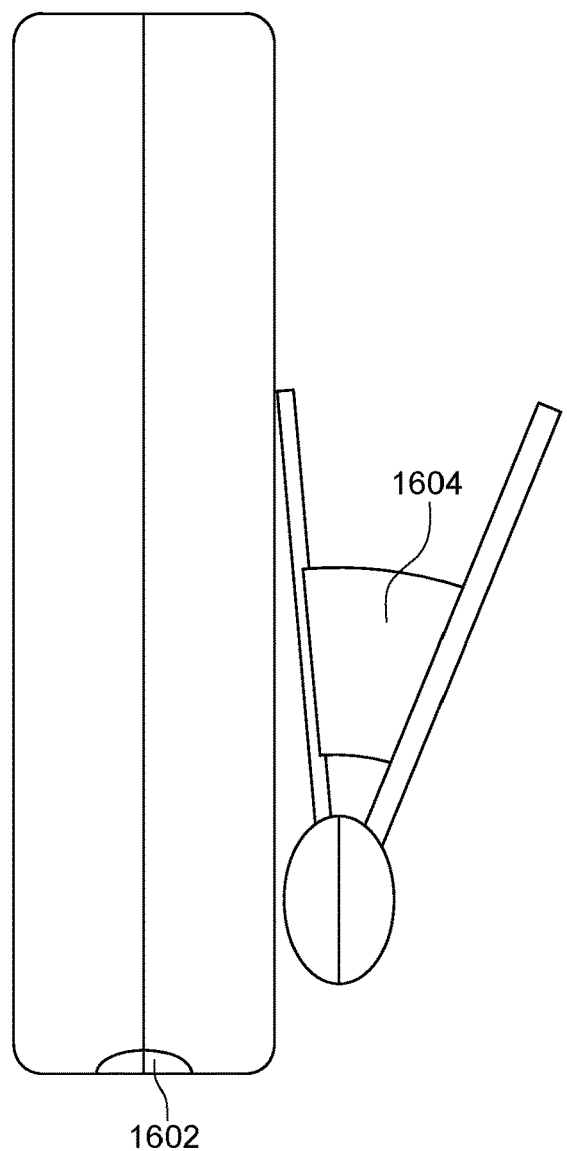
FIG. 16 is a right side view of the target microphone of FIG. 1 in a second embodiment.

Referring now to FIG. 16, therein is shown a right side view of the target microphone of FIG. 1 in a second embodiment. The target microphone can for example be the first target microphone 106, the second target microphone 108, the third target microphone 110, or the fourth target microphone 112, each of FIG. 1.

The individual sensor enclosure dimensions were chosen to be as small as possible to make them less likely to be struck by a bullet. Illustratively, for example, the target microphone can be 3.31 inches long, 0.56 inches thick, and 1.03 inches wide. The back of the target microphone can include a cable port 1602 for communicatively coupling with the one of the four cables connecting the target microphones to the target transceiver 104 of FIG. 1.

The target microphone can also include an attachment mechanism 1604. The attachment mechanism can include a clip, a magnet, a hook, a hook and loop fastener, an adhesive, a zipper, a screw, a bolt, or a combination thereof.

Figure 17:
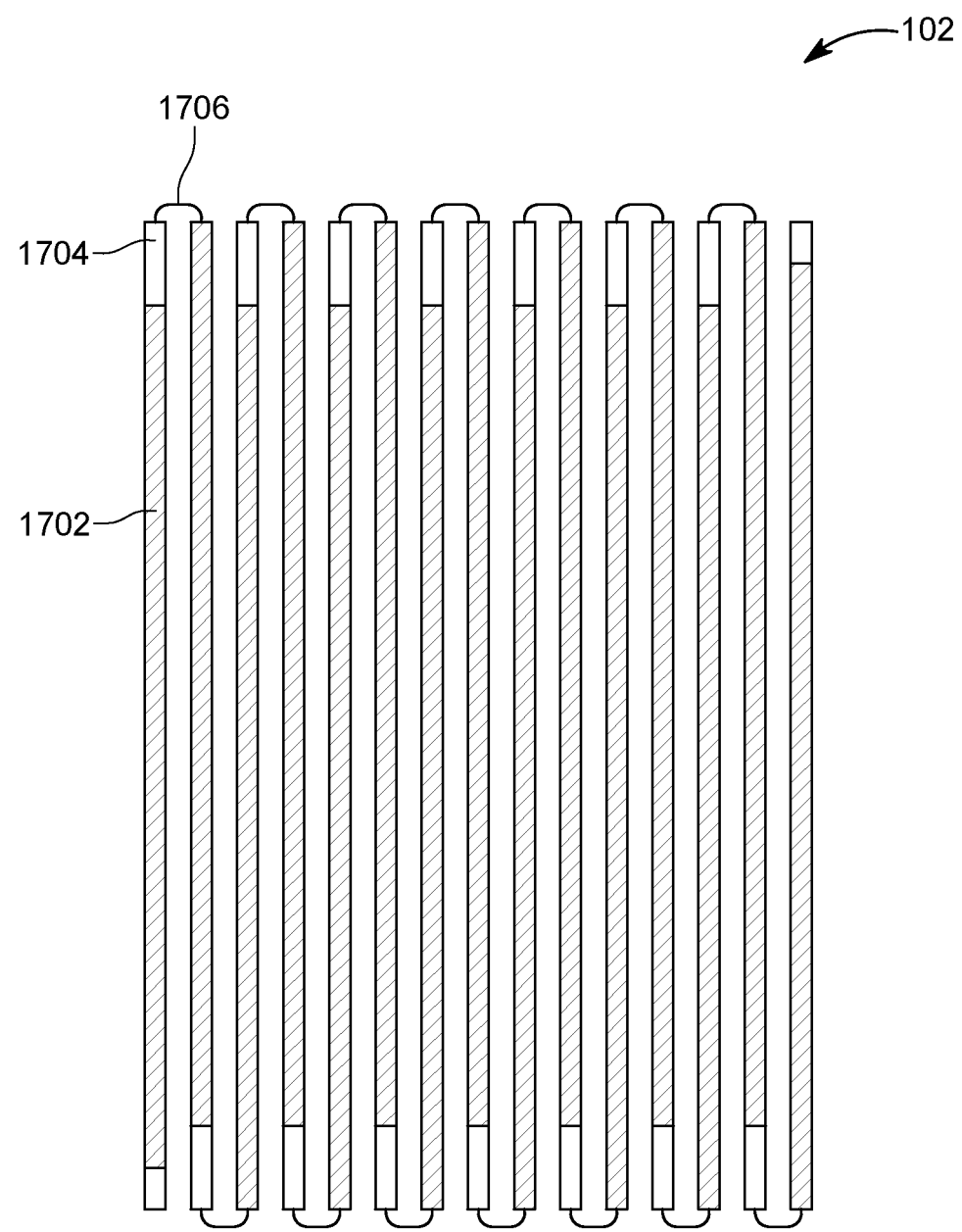
FIG. 17 is a top view of the target frame of FIG. 1 in a collapsed configuration.

Referring now to FIG. 17, therein is shown a top view of the target frame of FIG. 1 in a collapsed configuration. The target frame 102 is shown with a flexible segmented collapsible frame. The length of the target frame 102 was chosen to provide an optimal sensor field target area that is stable in the wind and easy for the User to reach. The width of the target frame 102 was chosen to be a balance between providing adequate strength while being thin enough to make the probability of getting hit by a bullet small.

The use of this tubular/circular frame minimizes frame material per unit area encircled. The target frame 102 includes rods 1702 having a 0.375 inch diameter, 17.44 inch length, and with a 1.5 inch connecting portion 1704 at one end of the rod 1702. The rods 1702 can be held together with a bungie 1706 type material.

Referring now to FIGS. 18A-18H, therein are shown diagrammatical views for an electrical schematic of the target transceiver 104. The target transceiver 104 is provided as a schematic as an illustrative example of how the target transceiver 104 may be practiced in some embodiments and is not intended to limit the disclosure to the specific components disclosed.

The target transceiver 104 is shown coupled to the first target microphone 106, the second target microphone 108, the third target microphone 110, and the fourth target microphone 112 with the first microphone cable 116, the second microphone cable 118, the third microphone cable 120, and the fourth microphone cable 122, respectively.

The target transceiver 104 can include a target transceiver microcontroller 1802. The target transceiver microcontroller 1802 can be an Arduino Pro Mini Micro controller for providing a lightweight microcontroller for the target transceiver 104. The target transceiver 104 can further include a target transceiver chip 1804. The target transceiver chip 1804 can be an EBYTE E32 LoRa Transceiver for providing wireless communications with the shooter transceiver 132 of FIG. 1.

The target transceiver 104 can include 555 timers 1806, a humidity sensor 1808, an air pressure sensor 1810, and an antenna 1812. The humidity sensor 1808 can be exposed to ambient air via the humidity and temperature sensor port 806 of FIG. 8. The antenna 1812 can be coupled to the target transceiver chip 1804.

The 555 timers 1806 essentially provide a latching function for the individual sensor signals from each of the target microphones. This is otherwise known as astable multivibrators. The sensor signals are first inverted through inverters 1812. The inverters 1812 can be components on a 7404 inverter IC. The inverted signals are then each fed into their respective 555 timers 1806.

It has been discovered that the inversion and timing latches keep the sensor signals active and 'latches them' to prevent multiple triggers or 'bouncing' of the sensor signal. The 555 timers 1806 also have a reset function that allows the system to reset all of the latched inputs when the triggering cycle is completed.

Once a valid shot is detected by the shooter transceiver 132, the shooter transceiver 132 can wirelessly alert the target transceiver 104 that a shot is on the way at which point the target transceiver 104 'wakes up' from sleep mode, powers up and resets the four target microphones, and then waits for each to be triggered. The target transceiver 104 can determine good impact data from the target microphones by implementing the control flow for impact sensor timing logic of FIGS. 29A-29D.

Once the triggering event is complete the target transceiver 104 sends the collected data back to the shooter transceiver 132, conducts a function check and calibration check on the target microphones, powers the target microphones back down, and then returns to sleep-mode. By only activating/powering the sensors when a valid shot is confirmed to be on the way, the target system only needs to be in an active state for a few seconds at a time. In this way the system operates on very low power and allows the battery to last for well more than a day on one charge.

Figure 19:
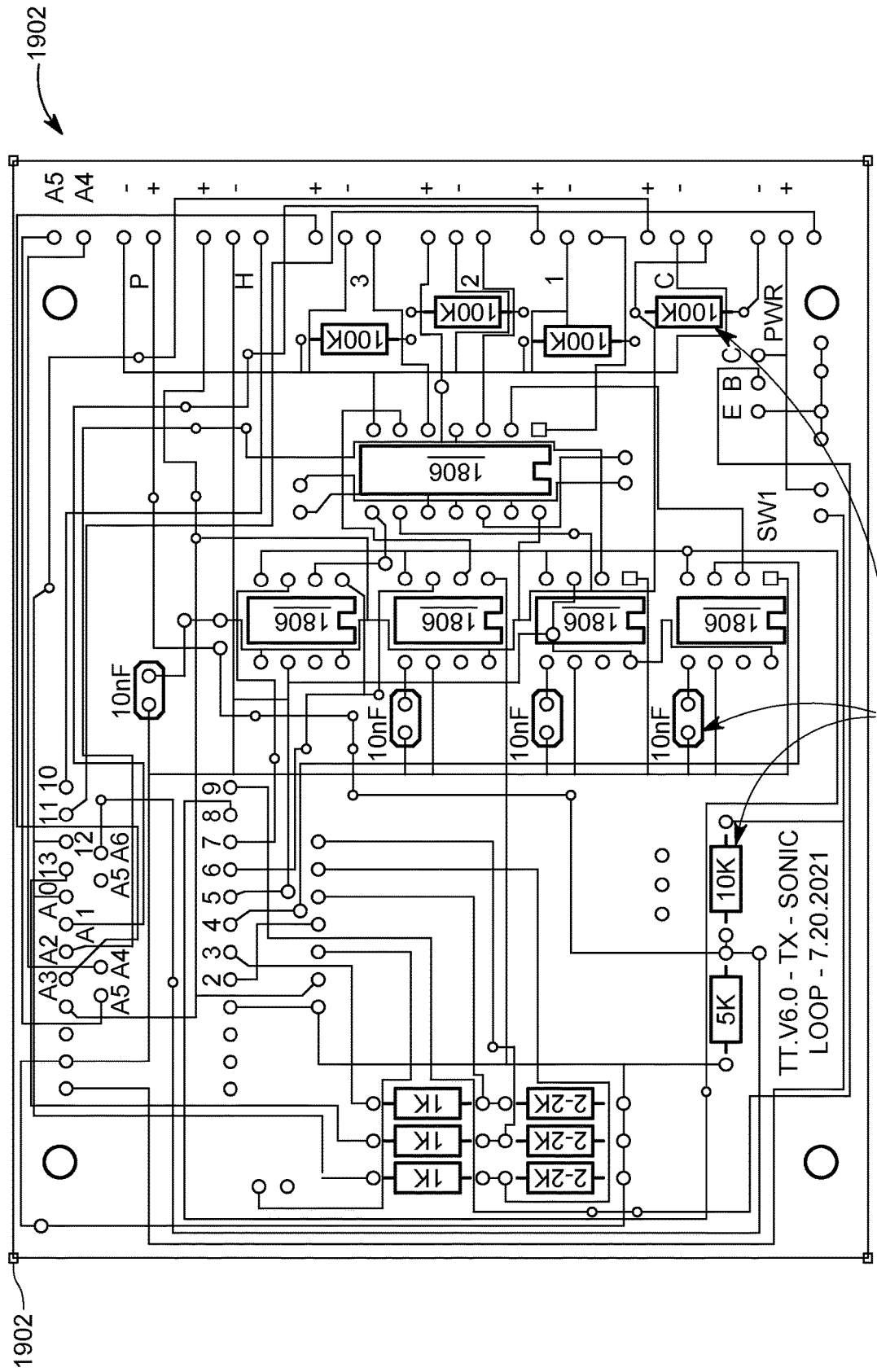
FIG. 19 is a diagrammatical view for a printed circuit board of the target transceiver of FIG. 1.

Referring now to FIG. 19, therein is shown a diagrammatical view for a printed circuit board 1902 of the target transceiver 104 of FIG. 1. The printed circuit board 1902 for the target transceiver 104 of FIG. 1 depicts the inverters 1812 together with the 555 timers 1806 and passive components 1904 including resistors and capacitors. The 555 timers 1806 can provide a latching function for the individual sensor signals from each of the four target microphones of FIG. 1. 555 timers 1806 in this configuration are otherwise known as astable multivibrators.

The signals from each of the four target microphones are first inverted by the inverters 1812, which can be implemented with a 7404 inverter IC. The inverted signals are each fed into their respective 555 timer ICs. In this way, the signals from the target microphones are kept active and latched to prevent multiple triggers or 'bouncing' of the signal. The 555 timers also have a reset function that allows the system to reset all of the latched inputs when the triggering cycle is completed.

Figure 20A:
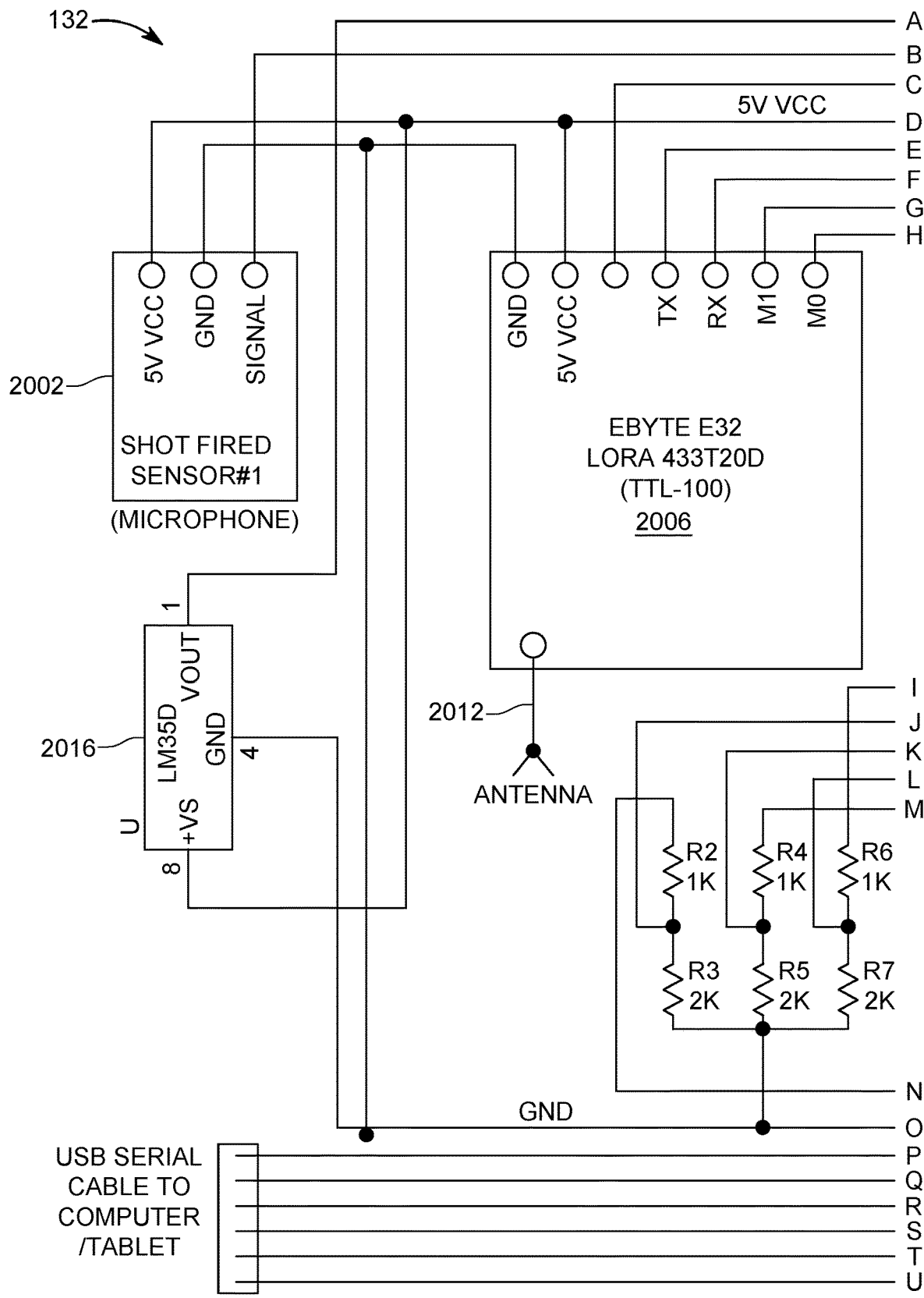
FIGS. 20A-20C are diagrammatical views for an electrical schematic of the shooter transceiver.
Figure 20B:
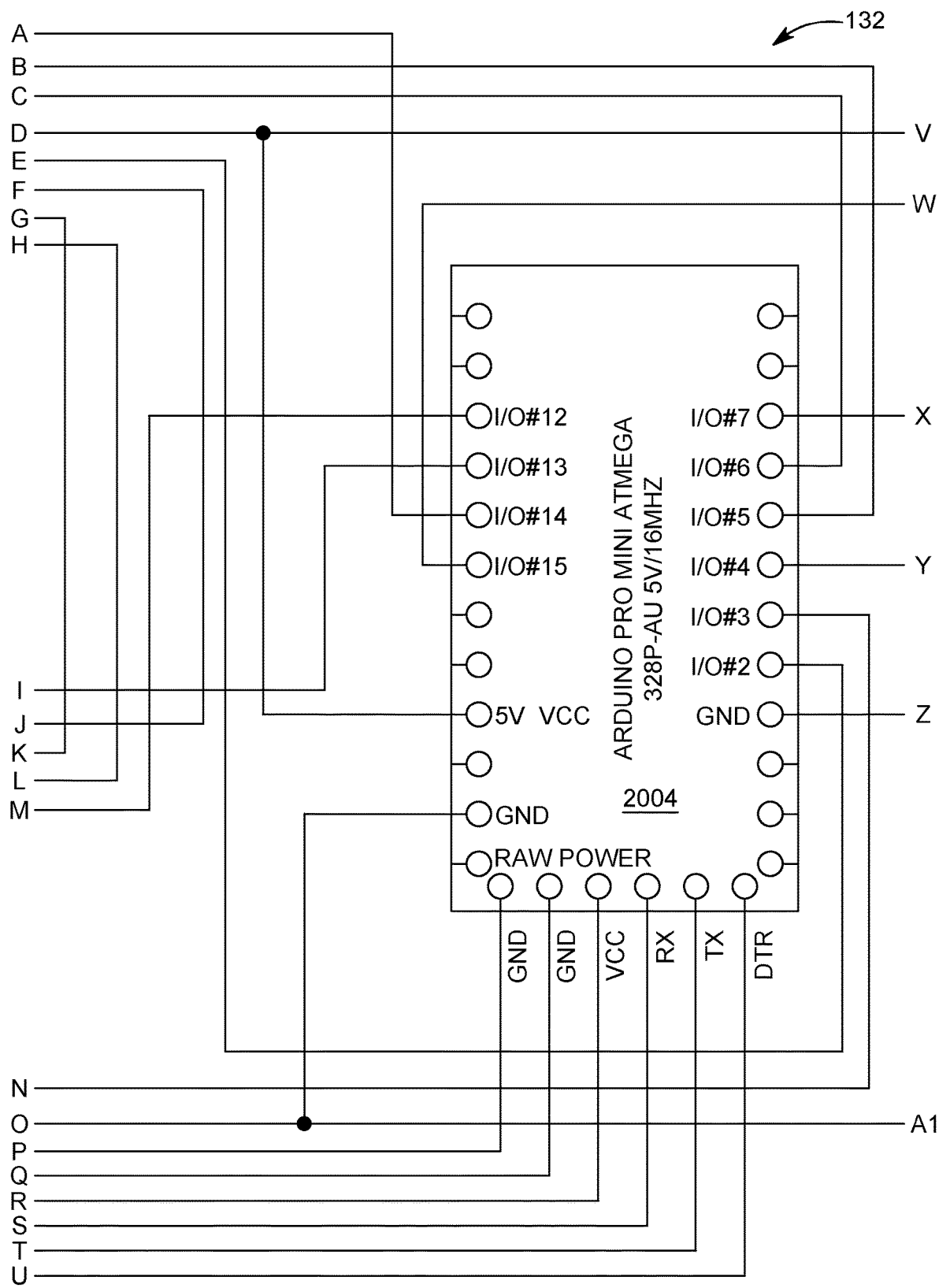
Figure 20C:
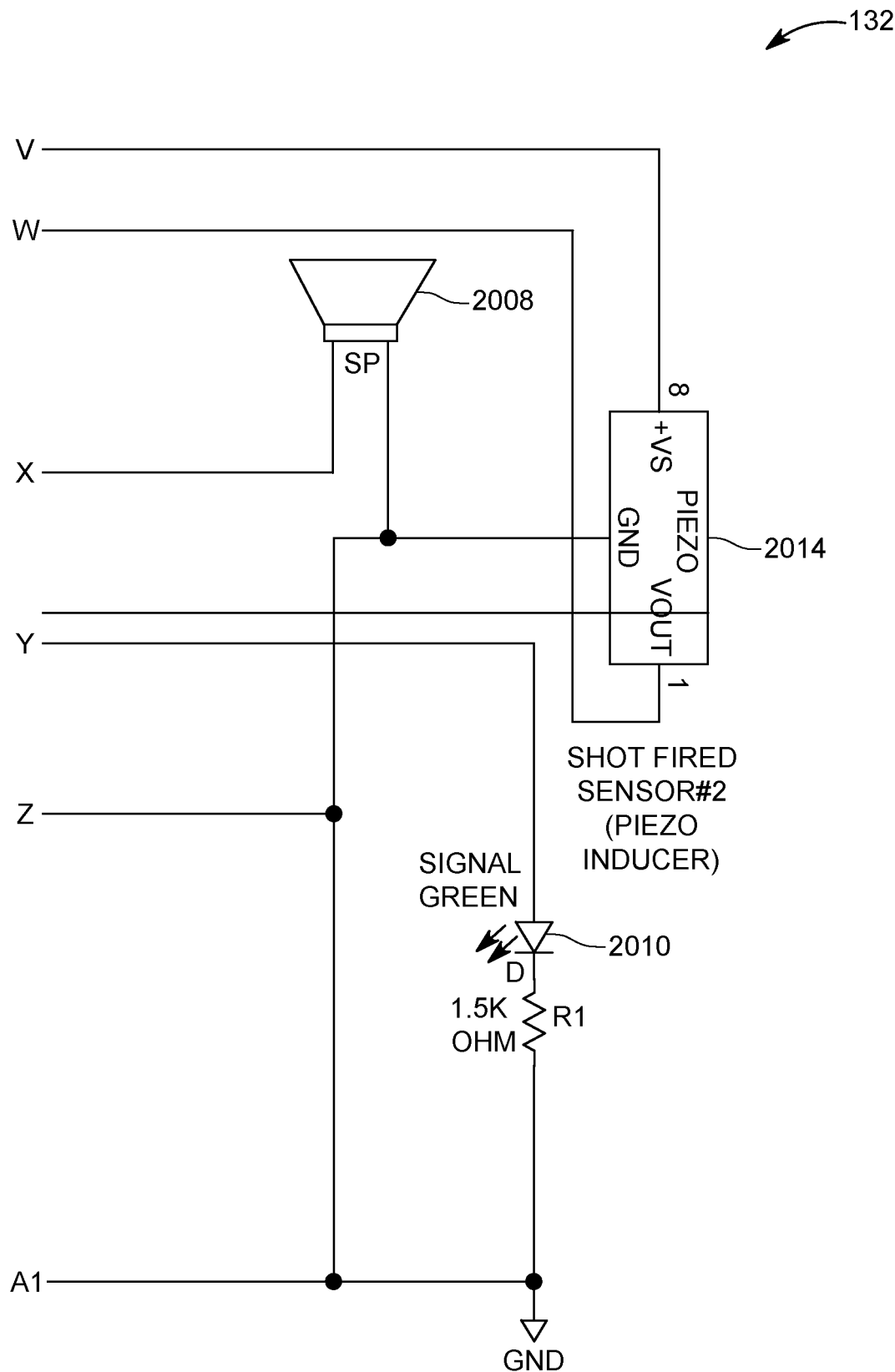

Referring now to FIGS. 20A-20C, therein are shown diagrammatical views for an electrical schematic of the shooter transceiver 132. The shooter transceiver 132 is provided as a schematic as an illustrative example of how the shooter transceiver 132 may be practiced in some embodiments and is not intended to limit the disclosure to the specific components disclosed.

The shooter transceiver 132 is shown having a shooter microphone 2002. The shooter transceiver 132 can include a shooter transceiver microcontroller 2004. The shooter transceiver microcontroller 2004 can be an Arduino Pro Mini Micro controller for providing a lightweight microcontroller for the shooter transceiver 132. The shooter transceiver 132 can further include a shooter transceiver chip 2006. The shooter transceiver chip 2006 can be an EBYTE E32 LoRa Transceiver for providing wireless communications with the target transceiver 104 of FIG. 1.

The shooter transceiver 132 can include a signal speaker 2008, a signal light 2010, and an antenna 2012. The antenna 2021 can be coupled to the shooter transceiver chip 2006. The signal light 2010 can be a Green Signal LED.

In addition to the shooter microphone 2002, the shooter transceiver 132 can further include a piezo inducer 2014 and a shooter temperature sensor 2016. The piezo inducer 2014 can provide vibration detection from the environment around the shooter transceiver 132. The shooter microphone 2002 can be a first "shots fired" sensor while the piezo inducer 2014 can function as a second "shots fired" sensor. The shooter temperature sensor 2016 can be an integrated-circuit temperature sensor.

The shooter microphone 2002 and the piezo inducer 2014 can work in conjunction to detect the shot from the shooter and allow the shooting position transceiver to initiate the target detection sequence as described below in FIGS. 27A and 27B. These two sensors work in conjunction to detect the proper combination of sound and vibration and are tuned such that they ignore shots from adjacent shooters. Once a valid shot is detected, the fixed-tone speaker activates to audibly alert the Shooter that a shot detection is in progress so that they can continue to look through their scope/sights and fire the next shot once the tone ceases.

Figure 21:
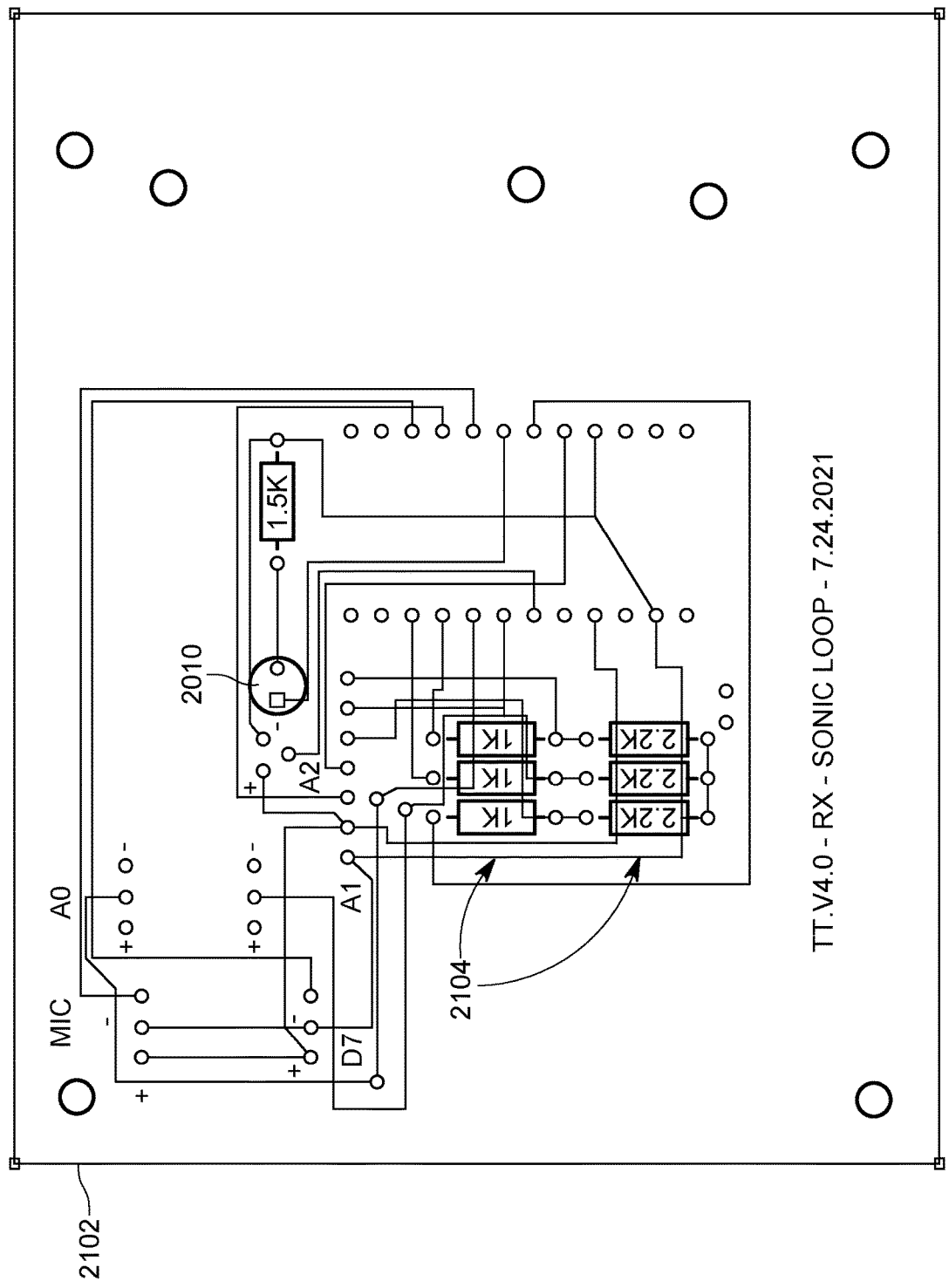
FIG. 21 is a diagrammatical view for a printed circuit board of the shooter transceiver of FIG. 1.

Referring now to FIG. 21, therein is shown a diagrammatical view for a printed circuit board of the shooter transceiver 132 of FIG. 1. The layout of the signal light 2010 is depicted together with passive components 2104 including resistors.

Figure 22:
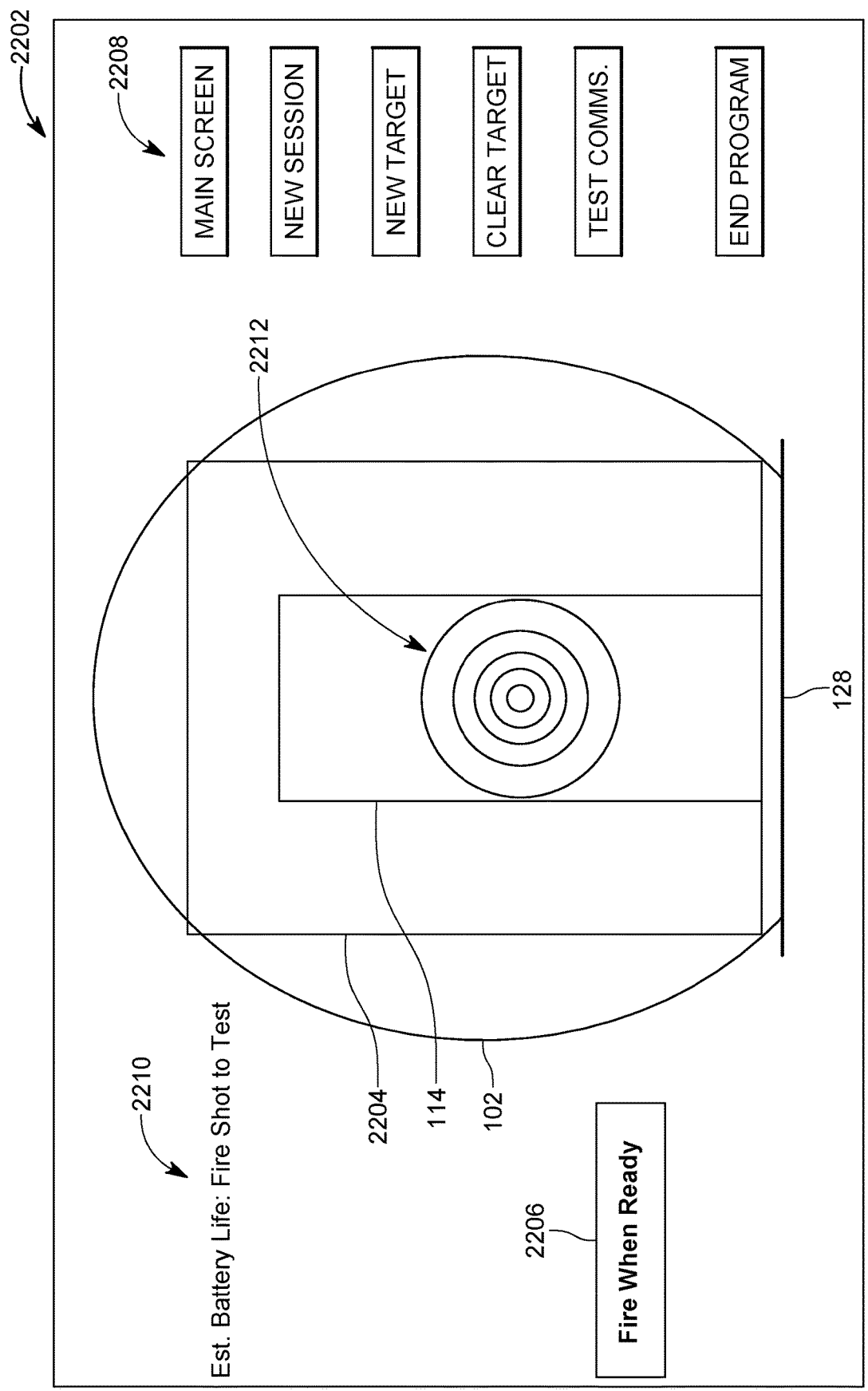
FIG. 22 is a graphical view of a fire when ready screen of the target tracking system of FIG. 1.

Referring now to FIG. 22, therein is shown a graphical view of a fire when ready screen 2202 of the target tracking system 100 of FIG. 1. The fire when ready screen 2202 can include a graphical representation of the target 114, the target frame 102, and the four-piece segmented H-frame base 128.

Figure 23:
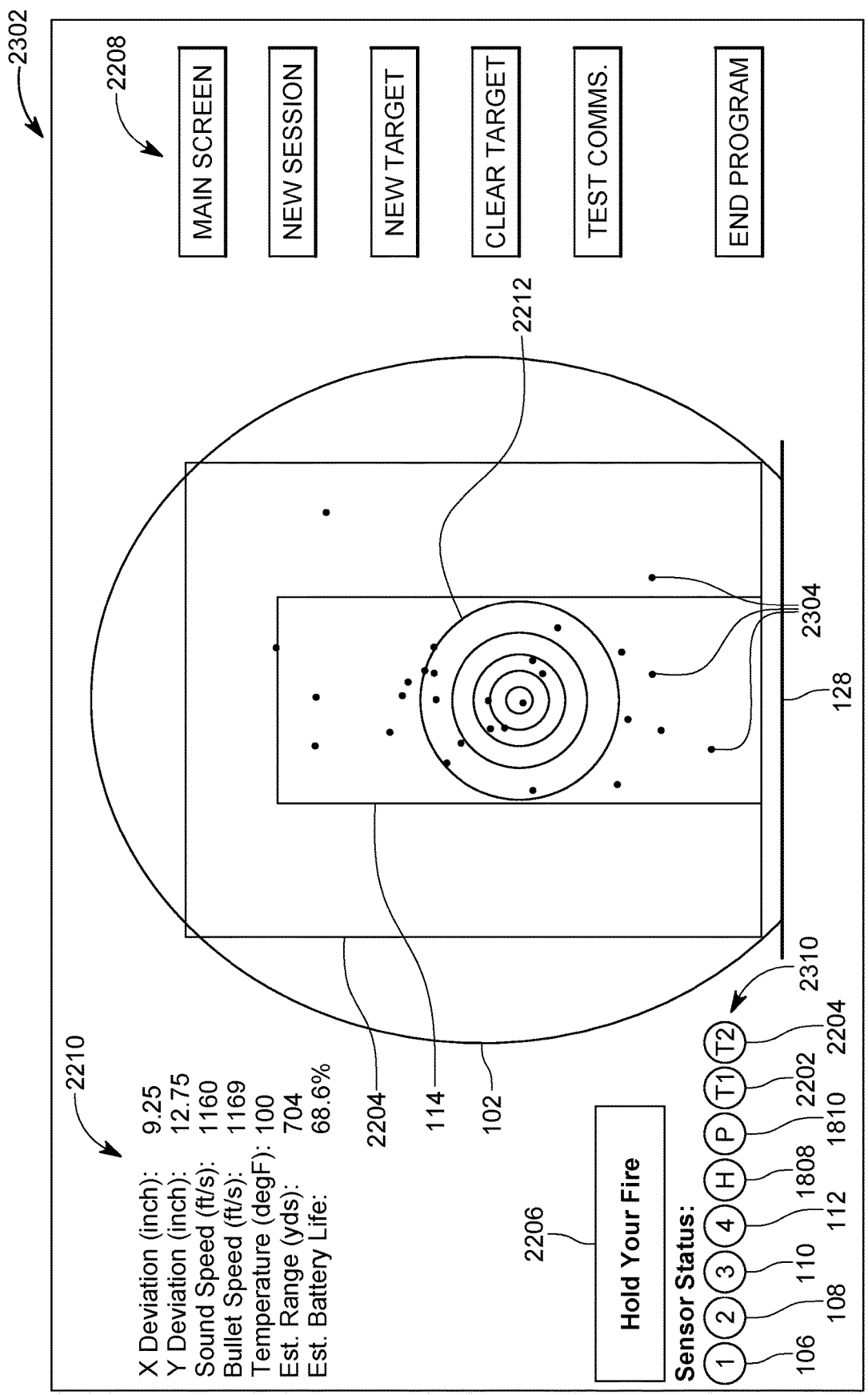
FIG. 23 is a graphical view of a hold your fire screen of the target tracking system of FIG. 1.
Figure 24:
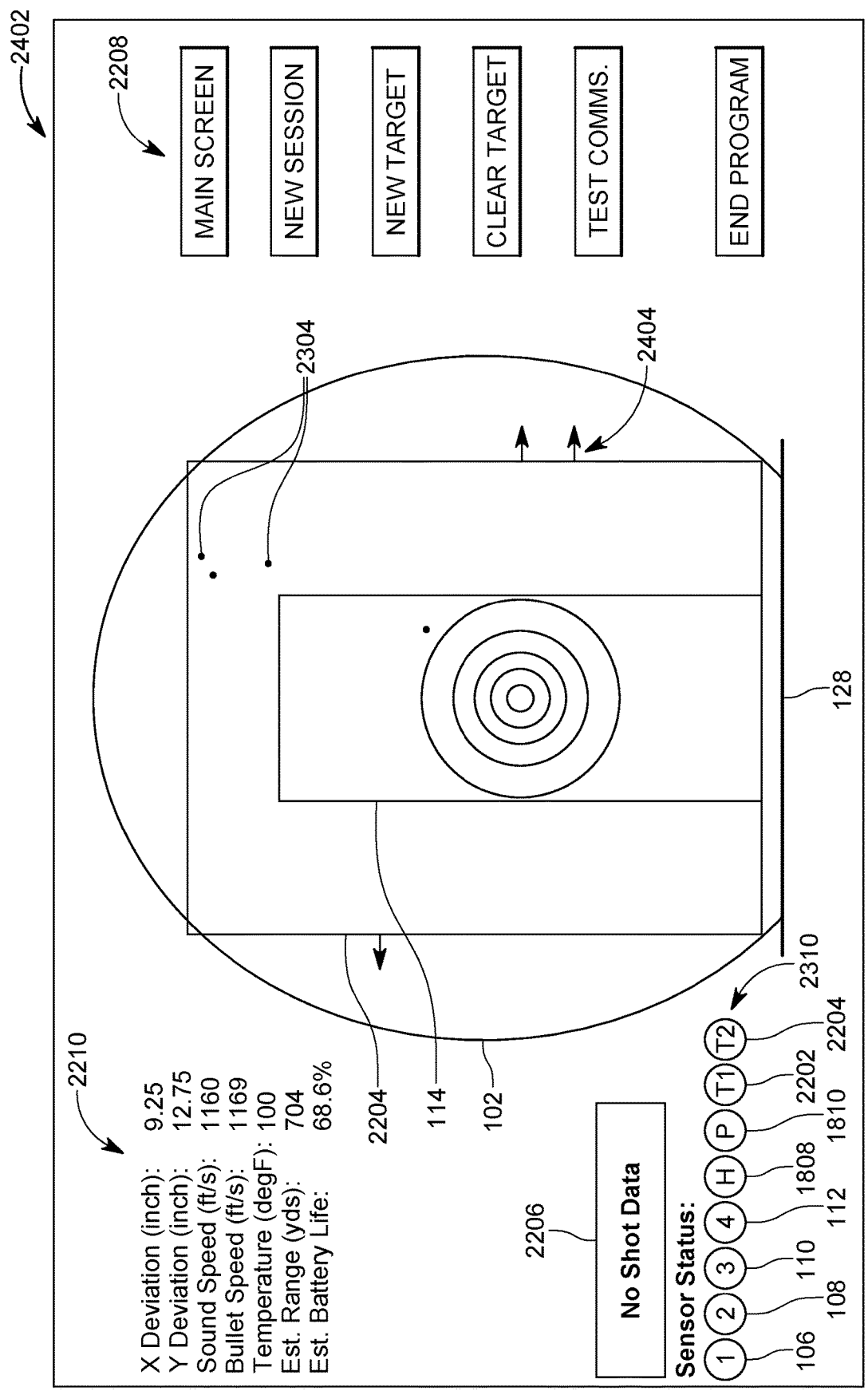
FIG. 24 is a graphical view of a no shot data screen of the target tracking system of FIG. 1.

The target tracking system 100 can implement a Python-based software application that interprets the data from the target transceiver 104 and the shooter transceiver 132, both of FIG. 1, into a graphical display of shot analysis, for example the bullet's impact on target on the Shooter's laptop, can be displayed as the shot placement 2304 of FIGS. 23 and 24 and should be understood herein as shot analysis. Generally, the software application is comprised of a main screen menu with options for 'Multi-Shooter Match' mode, 'Single-Shooter' mode, and 'Data Analysis' function. In either the 'Multi-Shooter Match' of FIG. 25 or 'Single-Shooter' modes of FIGS. 22-24, the application first queries the User for their name, type of target 114 of FIG. 1, whether real or virtual, and if the target 114 is real then asks the User to enter the target dimensions and height from the ground.

Unlike other systems, the presently disclosed target tracking system 100 allows a Shooter to use the target frame itself as a virtual target in place of a real target. If the Shooter selects the 'virtual' target option on the software application, it will draw a virtual target on the laptop screen which is proportional to the width and height of the target frame microphone sensor field. The Shooter then shoots into the target frame as if it were the target and receives accurate feedback on the locations that the bullet passed through or near the frame. This virtual feature allows for accurate night shooting where a normal target would not be visible. For night shooting, four LED headlamps are clipped to the target frame at equidistant points around the frame.

The application then asks the User for the bullet caliber, grains, muzzle velocity, estimated target range, and estimated slope angle to the target. For the 'Multi-Shooter Match' mode the Shooter is further prompted to enter the number of Shooters participating in the match with their names, the number of tournament rounds, and shots per round. Once this data has been entered the virtual or real target representation is displayed on the screen along with a 'Fire When Ready' banner.

In 'Multi-Shooter Match' mode a scoreboard with the current round/shot and each Shooter's name with their cumulative average deviation from center is displayed. For both modes, once a shot is made, the 'Fire When Ready' banner switches to 'Hold Your Fire' and then to 'Receiving Shot Data' while the system collects the data from the transceivers.

The application then plots the latest shot on the screen in red as the shot placement 2304 and turns the previous shot placement 2304 to blue. The temperature, speed of sound, bullet speed at target, estimated target range, impact deviation from center, battery life remaining, and sensor status are also displayed after each shot on the screen. The shot placement 2304 can be determined either by a processor within the target transceiver 104, the shooter transceiver 132, the laptop, or a processor in communication therewith. The shot placement 2304 can be the position a bullet arrives at the sensor frame plane relative to the target microphones.

In 'Single Shooter' mode the system immediately returns to 'Fire When Ready' status after plotting the last shot but in the 'Multi-Shooter Match' mode the system waits for the last Shooter to click a 'Next Shot' button prior to proceeding to the next shot. In either mode, for each shooting session, the software application saves the data for each shot, including deviation distance from target center, into a comma separated value file that can be called up and referenced graphically by the Shooter at any time using the 'Data Analysis' option. If at any time communication between the User's laptop and the shooter transceiver 132 is lost, the system will go into a 'Hold Your Fire' status and prompt the User to troubleshoot the cable connection, once communication is restored, the system will pick up where it left off.

The fire when ready screen 2202 is depicted to include an extended target 2204 around the target 114. The extended target 2204 can be a virtual target, used for dialing in future shots, and for recording shot placement for later analysis and training.

The fire when ready screen 2202 can indicate that the target tracking system 100 is ready for the shooter to fire with a fire indicator 2206 in the bottom left of the screen. The fire indicator 2206 can display the message "Fire When Ready".

The fire when ready screen 2202 can further include program operation buttons 2208. The program operation buttons 2208 can allow a user to control the target tracking system 100 during use. The program operation selections 2208 can include a main screen button, a new session button, a new target button, a test comms. button, and an end program button.

After each shot the target tracking system 100 conducts a function check on all sensors and measures the battery level and then sends this data back to the shooter transceiver 132 which displays the sensor and battery status visually to the Shooter. The test comms button allows the Shooter to verify that the shooter transceiver 132 has line-of-sight communication with the target transceiver 104 prior to shooting.

The fire when ready screen 2202 can further include an information display region 2210. The information display region 2210 can display an estimated battery life and instructions to fire a shot for the system to test and display a value. Within the target 114, the fire when ready screen 2202 can further provide concentric circles 2212 as a center mass indicator, a critical hit indicator, or a points indicator.

Referring now to FIG. 23, therein is shown a graphical view of a hold your fire screen 2302 of the target tracking system 100 of FIG. 1. The hold your fire screen 2302 can be displayed after a shooter has fired and the shot has been detected at the target 114 of FIG. 1 by the target tracking system 100.

The hold your fire screen 2302 can include a graphical representation of the target 114, the target frame 102, and the four-piece segmented H-frame base 128. The hold your fire screen 2302 can further include the extended target 2204 around the target 114. The extended target 2204 can be a virtual target, used for dialing in future shots, and for recording shot placement for later analysis and training.

The target 114 and the extended target 2204 can include depictions of shot placement 2304 as the shots are detected at the target 114. The shot placements 2304 are shown on the target 114, on the extended target 2204, and on the concentric circles 2212.

The target tracking system 100 combines the raw data from all described sensor inputs with the bullet and the target information provided by the Shooter to calculate or measure the expected speed of the bullet at the target, the actual bullet speed at the target, the actual speed of sound in the current environment, the angle that the bullet enters the target, the order of target microphone activation, the time differential between target microphone activations, the actual distance to target, and the total time of flight of the bullet. By accurately calculating and measuring these data points, the target tracking system 100 determines the precise position of the impact on the virtual or real target as the shot placement 2304 by utilizing these values together with the lookup matrix 2808 of FIG. 28A, which can provide the shot placement 2304 for various values of the data points collected by the sensors.

The hold your fire screen 2302 can indicate that the target tracking system 100 is ready for the shooter to hold fire with the fire indicator 2206 in the bottom left of the screen reading: "Hold Your Fire". The hold your fire screen 2302 can further include the program operation buttons 2208. The program operation buttons 2208 can allow a user to control the target tracking system 100 during use. The program operation selections 2208 can include a main screen button, a new session button, a new target button, a test comms. button, and an end program button.

The hold your fire screen 2302 can further include the information display region 2210. The information display region 2210 can display multiple pieces of information regarding the shots taken by the shooter at the target 114.

Illustratively, for example, the information display region 2210 can display an X deviation, a Y deviation, a speed of sound, a bullet speed, a temperature, an estimated range, and an estimated battery life. Each of these pieces of information can be displayed in the information display region 2210.

The hold your fire screen 2302 can also display a sensor status 2310, which provides a color coded status of sensors operated by the target tracking system 100. Illustratively, the first target microphone 106, the second target microphone 108, the third target microphone 110, and the fourth target microphone 112 of FIG. 1 are shown; the shooter microphone 2002 and the piezo inducer 2014 of FIG. 20C are shown; and the humidity sensor 1808 and the air pressure sensor 1810 of FIG. 18F are shown.

Referring now to FIG. 24, therein is shown a graphical view of a no shot data screen 2402 of the target tracking system 100 of FIG. 1. The no shot data screen 2402 can be displayed after a shooter has fired and the shot has not been detected at the target 114 of FIG. 1 by the target tracking system 100. The no shot data screen 2402 can include a graphical representation of the target 114, the target frame 102, and the four-piece segmented H-frame base 128.

The no shot data screen 2402 can further include the extended target 2204 around the target 114. The extended target 2204 can be a virtual target, used for dialing in future shots, and for recording shot placement for later analysis and training.

The target 114 and the extended target 2204 can include the depictions of shot placement 2304 for the shots that are detected at the target 114. When the shots are not detected as falling within the target 114 or the extended target 2204, the target tracking system 100 can display directional indicators 2404 for each shot, when it can be determined. The target tracking system 100 can therefore detect off-target shot misses and show arrows in the direction of the missed shot, thereby allowing a Shooter to get on target more rapidly with successive adjustments.

That is, if a shot missed the extended target 2204 and the target 114 to the right, an arrow extending from the extended target 2204 and pointing to the right can be displayed as the directional indicator 2404. The no shot data screen 2402 can indicate that the target tracking system 100 did not record data for the previous shot.

The no shot data screen 2402 can further include the program operation buttons 2208. The program operation buttons 2208 can allow a user to control the target tracking system 100 during use. The program operation selections 2208 can include a main screen button, a new session button, a new target button, a test comms. button, and an end program button.

The no shot data screen 2402 can further include the information display region 2210. The information display region 2210 can display multiple pieces of information regarding the shots taken by the shooter at the target 114.

Illustratively, for example, the information display region 2210 can display an X deviation, a Y deviation, a speed of sound, a bullet speed, a temperature, an estimated range, and an estimated battery life. Each of these pieces of information can be displayed in the information display region 2210.

The no shot data screen 2402 can also display the sensor status 2310, which provides a color coded status of sensors operated by the target tracking system 100. Illustratively, the first target microphone 106, the second target microphone 108, the third target microphone 110, and the fourth target microphone 112 of FIG. 1 are shown; the shooter microphone 2002 and the piezo inducer 2014 of FIG. 20C are shown; and the humidity sensor 1808 and the air pressure sensor 1810 of FIG. 18F are shown. Further, status codes other than color codes could be shown to indicate the status of the sensors including symbols, text, or images.

Figure 25:
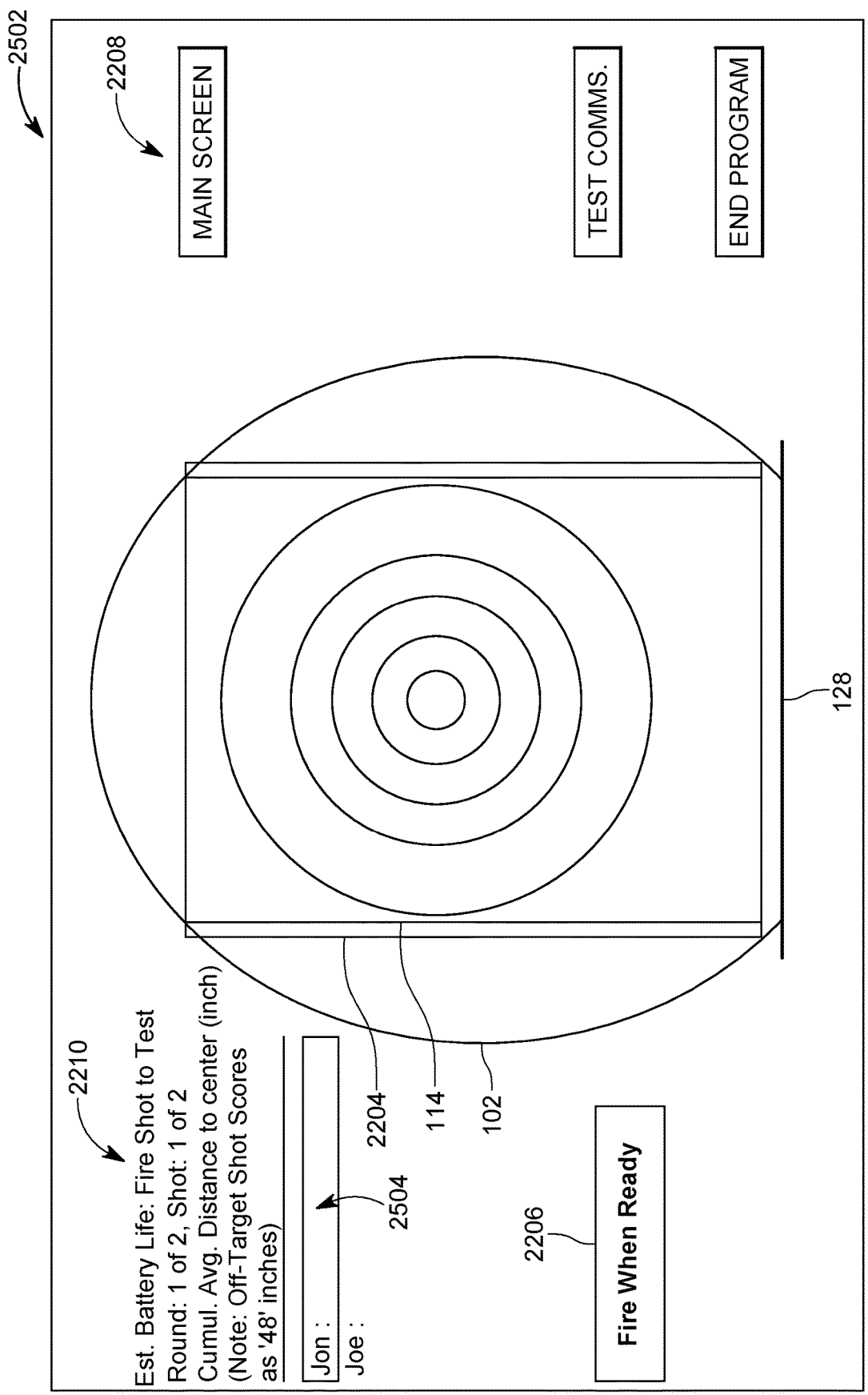
FIG. 25 is a graphical view of a multi-shooter match, fire when ready screen of the target tracking system of FIG. 1.

Referring now to FIG. 25, therein is shown a graphical view of a multi-shooter match, fire when ready screen 2502 of the target tracking system 100 of FIG. 1. The fire when ready screen 2502 can be displayed prior to a shot being fired and detected at the target 114 of FIG. 1 by the target tracking system 100.

The fire when ready screen 2502 can include a graphical representation of the target 114, the target frame 102, and the four-piece segmented H-frame base 128.

The fire when ready screen 2502 can further include the extended target 2204 around the target 114. The extended target 2204 is shown having the same height as the target 114 but being slightly extended laterally from the target 114.

Furthermore, relative to the fire when ready screen 2202 of FIG. 22, for example, the multi-shooter match, fire when ready screen 2502 can provide a larger target 114 in relation to the extended target 2204. This can decrease the difficulty of obtaining a hit. Furthermore, the concentric circles 2212 are shown almost as wide as the extended target 2204 and the target 114.

The fire when ready screen 2502 can indicate that the target tracking system 100 is ready for a first of two shooters to fire with the fire indicator 2206 and a shooter indicator 2504. That is, the fire indicator 2206 can display the message "Fire When Ready" and the shooter indicator 2504 can indicate the first shooter Jon is ready to shoot.

The shooter indicator 2504 can be displayed in the information display region 2210. The information display region 2210 can display multiple pieces of information including the estimated battery life, the current round and shot, an average distance to the center for each shooter, and the order of the shooters.

The multi-shooter match, fire when ready screen 2502 can further include the program operation buttons 2208. The program operation buttons 2208 can allow a user to control the target tracking system 100 during use and can include a main screen button, a test comms. button, and an end program button.

Figure 26:
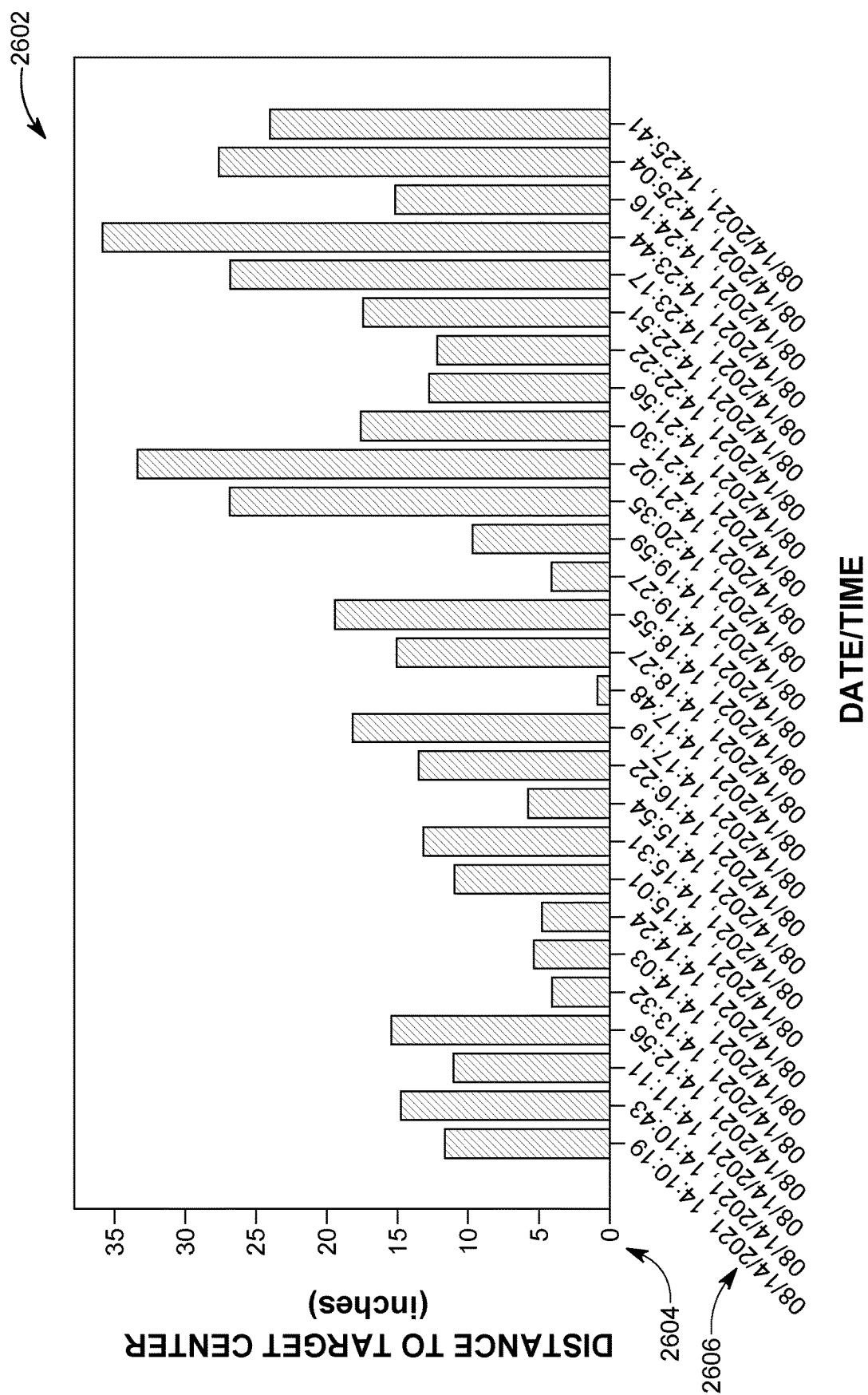
FIG. 26 is a graphical view of a data analysis screen of the target tracking system of FIG. 1.

Referring now to FIG. 26, therein is shown a graphical view of a data analysis screen 2602 of the target tracking system 100 of FIG. 1. The data analysis screen 2602 can display a distance to the center of the target 2604 along the y-axis. The data analysis screen 2602 also shows the time and date 2606 of each shot measured and detected at the target 114 along the x-axis. Illustratively, the last 50 shots are shown and can be used to determine problems with a particular group of shots in order to enhance training and future shot placement.

Figure 27A:
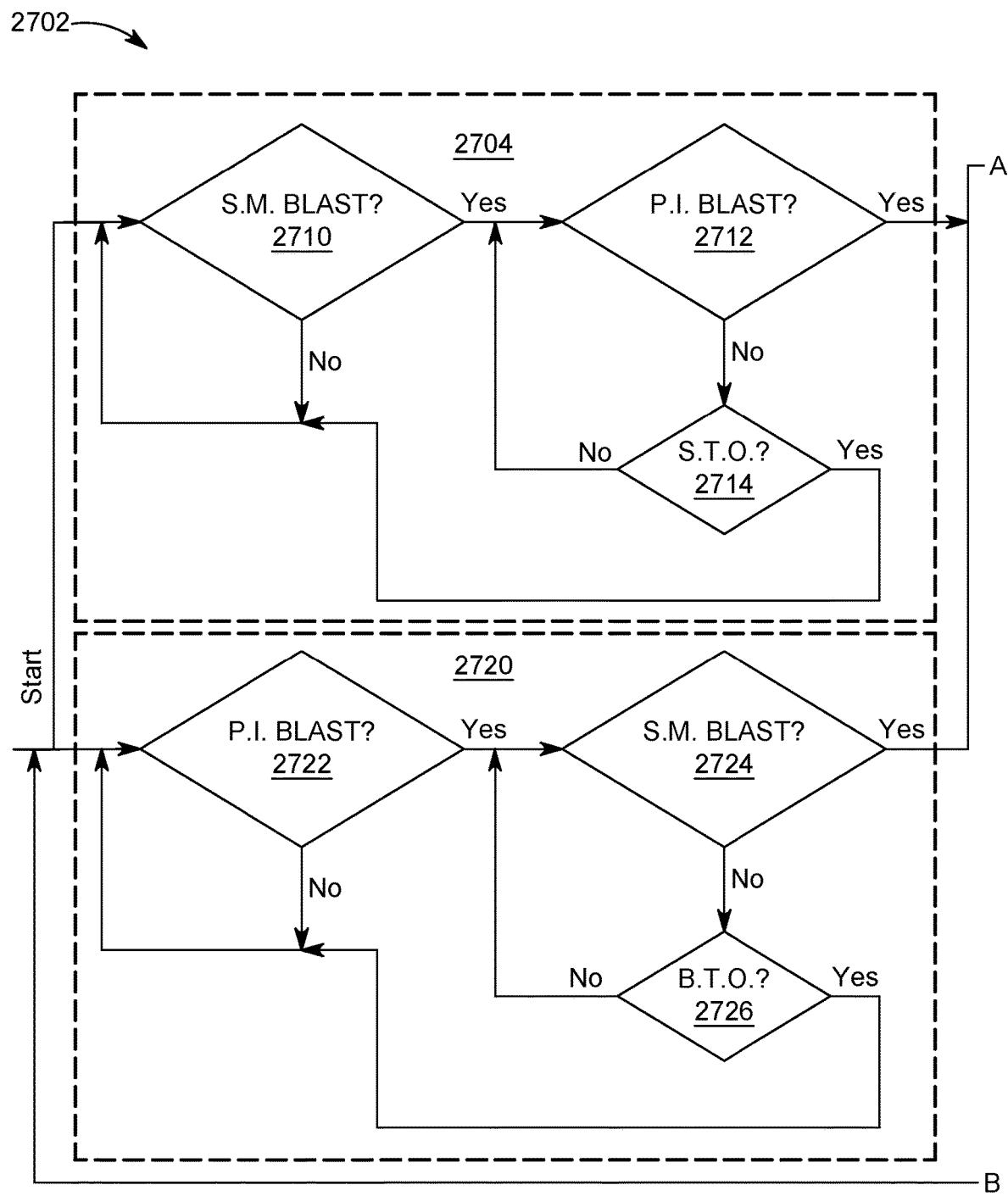
FIGS. 27A-27B are a control flow for a shooting transceiver shot detection and verification for the target tracking system of FIG. 1.
Figure 27B:
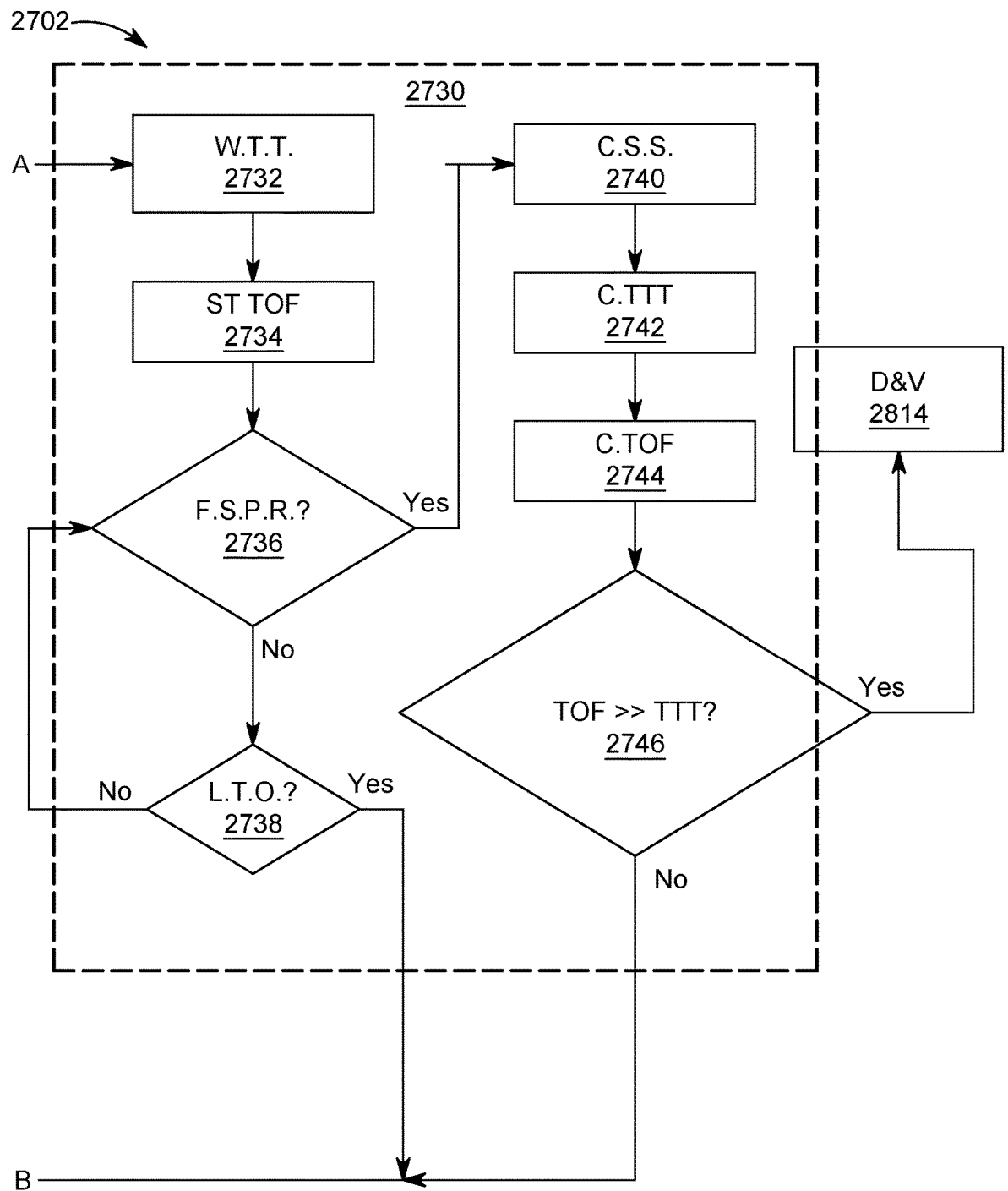

Referring now to FIGS. 27A-B, therein is shown a control flow for a shooting transceiver shot detection and verification process 2702 for the target tracking system 100 of FIG. 1. The shooting transceiver shot detection and verification process 2702 can be executed by the target tracking system 100 and can determine whether a detected sound by the shooter transceiver 132 of FIG. 1 detected a valid shot from the appropriate shooter. This shooting transceiver shot detection and verification process 2702 can exclude side-shooters, bumped transceivers, and external sounds.

The shooting transceiver shot detection and verification process 2702 can test for side-shooters in a side-shooter exclusion process 2704. The side-shooter exclusion process 2704 can begin by executing a first shooter microphone blast detection step 2710.

The first shooter microphone blast detection step 2710 can determine whether the shooter microphone 2002 of FIG. 20A registered or detected a muzzle blast. In practice a muzzle blast detected by the shooter microphone 2002 could be any sound detected by the shooter microphone 2002 that surpasses a sound intensity threshold, for example.

If the first shooter microphone blast detection step 2710 does not detect a muzzle blast, the first shooter microphone blast detection step 2710 will be re-executed. If, however, the first shooter microphone blast detection step 2710 does detect a muzzle blast the target tracking system 100 will execute a first piezo inducer blast detection step 2712.

The first piezo inducer blast detection step 2712 can determine whether the piezo inducer 2014 of FIG. 20C has detected or registered a muzzle blast. In practice a muzzle blast detected by the piezo inducer 2014 could be any vibration detected by the piezo inducer 2014 that surpasses a vibration intensity threshold, for example.

If both the shooter microphone 2002 and the piezo inducer 2014 detect a muzzle blast, the side-shooter exclusion process 2704 will provide a positive result indicating that the muzzle blast detected by both the shooter microphone 2002 and the piezo inducer 2014 is not a shot by a side-shooter because sound was detected by the shooter microphone 2002 and vibration was detected by the piezo inducer 2014.

If no muzzle blast was detected during the first piezo inducer blast detection step 2712, the target tracking system 100 can return a negative result and execute a side-shooter time out determination step 2714. If the side-shooter time out determination step 2714 reaches the end of its counter, the target tracking system 100 will re-execute the first shooter microphone blast detection step 2710. If the side-shooter time out determination step 2714 determines that a time out counter has not reached a timeout threshold, the target tracking system 100 will re-execute the first piezo inducer blast detection step 2712.

Therefore, in order to exclude side-shooters, the target tracking system 100 can execute the side-shooter exclusion process 2704 including the first shooter microphone blast detection step 2710, the first piezo inducer blast detection step 2712, and the side-shooter time out determination step 2714. The side-shooter exclusion process 2704 can therefore exclude shots detected by the shooter microphone 2002 but where vibration is not detected by the piezo inducer 2014.

For the purposes of this application, the solution of excluding side-shooters is necessarily rooted in computer technology that previously failed to provide an acceptable solution to identifying and excluding shots made by side-shooters. False triggering from side-shooters specifically arises in the realm of bullet tracking or targeting systems because electronic sensors, when used in previous solutions to detect shots fired, used non-directional microphones with a simple magnitude threshold. With the limited data provided by previous single sensor solutions, side shooters were impossible to distinguish. The solution set forth as the side-shooter exclusion process 2704 including the first shooter microphone blast detection step 2710, the first piezo inducer blast detection step 2712, and the side-shooter time out determination step 2714, as described, solves the problem of previous bullet tracking or targeting systems by utilizing multiple sensors, collecting specifically described data, and processing the data with specific logical decision steps, which results in a detection of side-shooters based on verification from multiple detections.

The shooting transceiver shot detection and verification process 2702 can test to determine whether the shooter transceiver 132 has been bumped in a bump exclusion process 2720. The bump exclusion process 2720 can begin by executing a second piezo inducer blast detection step 2722.

The second piezo inducer blast detection step 2722 can determine whether the piezo inducer 2014 has detected or registered a muzzle blast. If the second piezo inducer blast detection step 2722 does not detect a muzzle blast, the second piezo inducer blast detection step 2722 will be re-executed.

If, however, the second piezo inducer blast detection step 2722 does detect a muzzle blast the target tracking system 100 will execute a second shooter microphone blast detection step 2724. The second shooter microphone blast detection step 2724 can determine whether the shooter microphone 2002 registered or detected a muzzle blast.

If both the shooter microphone 2002 and the piezo inducer 2014 detect a muzzle blast, the bump exclusion process 2720 will provide a positive result indicating that the muzzle blast detected by both the shooter microphone 2002 and the piezo inducer 2014 is not a bumped shooter transceiver because sound was detected by the shooter microphone 2002 and vibration was detected by the piezo inducer 2014.

If no muzzle blast was detected during the second shooter microphone blast detection step 2724, the target tracking system 100 can return a negative result and execute a bumped transceiver time out determination step 2726. If the second shooter microphone blast detection step 2724 reaches the end of its counter, the target tracking system 100 will re-execute the second piezo inducer blast detection step 2722. If the bumped transceiver time out determination step 2726 determines that a time out counter has not reached a timeout threshold, the target tracking system 100 will re-execute the second shooter microphone blast detection step 2724.

Therefore, in order to exclude bumps and vibrations near the shooter transceiver 132, the target tracking system 100 can execute the bump exclusion process 2720 including the second piezo inducer blast detection step 2722, second shooter microphone blast detection step 2724, and the bumped transceiver time out determination step 2726. The bump exclusion process 2720 can exclude shots detected by the piezo inducer 2014 based on vibration but where sound is not detected by the shooter microphone 2002.

The target tracking system 100 can execute both the side-shooter exclusion process 2704 and the bump exclusion process 2720 in parallel. That is, the first shooter microphone blast detection step 2710 of the side-shooter exclusion process 2704 can be initiated and executed together with the second piezo inducer blast detection step 2722 of the bump exclusion process 2720. Furthermore, both the first shooter microphone blast detection step 2710 and the second piezo inducer blast detection step 2722 can be initiated by a positive result from either the side-shooter time out determination step 2714 or the bumped transceiver time out determination step 2726 or by a negative result from either the first shooter microphone blast detection step 2710 or the second piezo inducer blast detection step 2722.

For the purposes of this application, the solution of excluding false triggering from vibration or "bumps" is necessarily rooted in computer technology that previously failed to provide an acceptable solution to identifying and excluding false shots induced by vibration. False triggering from vibration specifically arises in the realm of bullet tracking or targeting systems because electronic sensors; when used in previous solutions to detect shots fired, used non-directional microphones with a simple magnitude threshold. With the limited data provided by previous single sensor solutions, side shooters were impossible to distinguish. The solution set forth as the bump exclusion process 2720 including the second piezo inducer blast detection step 2722, second shooter microphone blast detection step 2724, and the bumped transceiver time out determination step 2726, as described, solves the problem of previous bullet tracking or targeting systems by utilizing multiple sensors, collecting specifically described data, and processing the data with specific logical decision steps, which results in a detection of false shots fired due to vibration based on verification from multiple detections.

The shooting transceiver shot detection and verification process 2702 can test to determine whether the shooter transceiver 132 has been triggered by a side-shooter or by a low shot from the actual shooter in a low shot determination process 2730. The low shot determination process 2730 can begin with a wake up target transceiver step 2732 initiated by the target tracking system 100.

The wake up target transceiver step 2732 can be initiated by a positive return from either the first piezo inducer blast detection step 2712 or the second shooter microphone blast detection step 2724. The wake up target transceiver step 2732 can send a wake-up signal from the shooter transceiver 132 to the target transceiver 104 of FIG. 1 to ensure the target transceiver 104 is ready to measure and detect the shot from the shooter.

Once the wake up target transceiver step 2732 is executed, the target tracking system 100 can execute a start time of flight timer step 2734. The start time of flight timer step 2734 can for example begin the count on one of the 555 timers 1806 of FIG. 18A-18C or 18H.

Once the start time of flight timer step 2734 has been executed, the target tracking system 100 can initiate and run a full shot packet received step 2736. During the full shot packet received step 2736, the shooter transceiver 132 or the laptop 134 of FIG. 1 can evaluate the shot packet received from the target transceiver 104 by the shooter transceiver 132. The shot packet can be evaluated to determine whether all the microphones detected a shot or that all sensors have registered data within the shot packet.

If the shot packet was not received or the shot packet was not complete, the target tracking system 100 can initiate a low shot time out determination step 2738. The low shot time out determination step 2738 can determine whether a time threshold has been reached.

If the time threshold for a time out has not been reached, the low shot time out determination step 2738 will return a negative result and the full shot packet received step 2736 can be re-executed. If, however, the time threshold for a time out has been reached, the low shot time out determination step 2738 will return a positive result and can start the shooting transceiver shot detection and verification process 2702 over again by re-executing the first shooter microphone blast detection step 2710 and the second piezo inducer blast detection step 2722.

Returning to the full shot packet received step 2736, if the full shot packet received step 2736 does determine that a full shot packet has been received by the shooter transceiver 132, the target tracking system 100 will execute a calculate speed of sound step 2740.

Figure 18A:
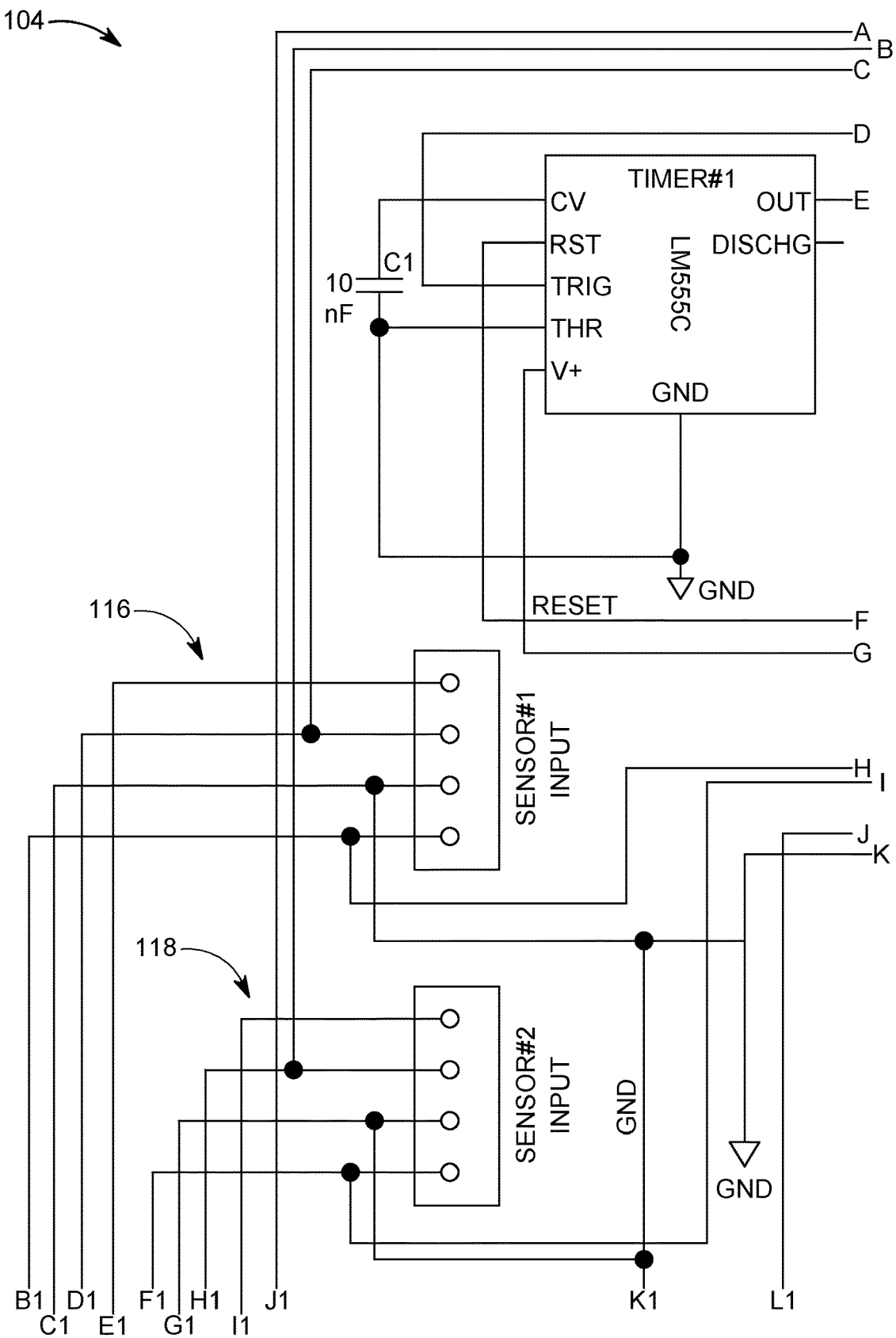
FIGS. 18A-18H are diagrammatical views for an electrical schematic of the target transceiver.
Figure 18B:
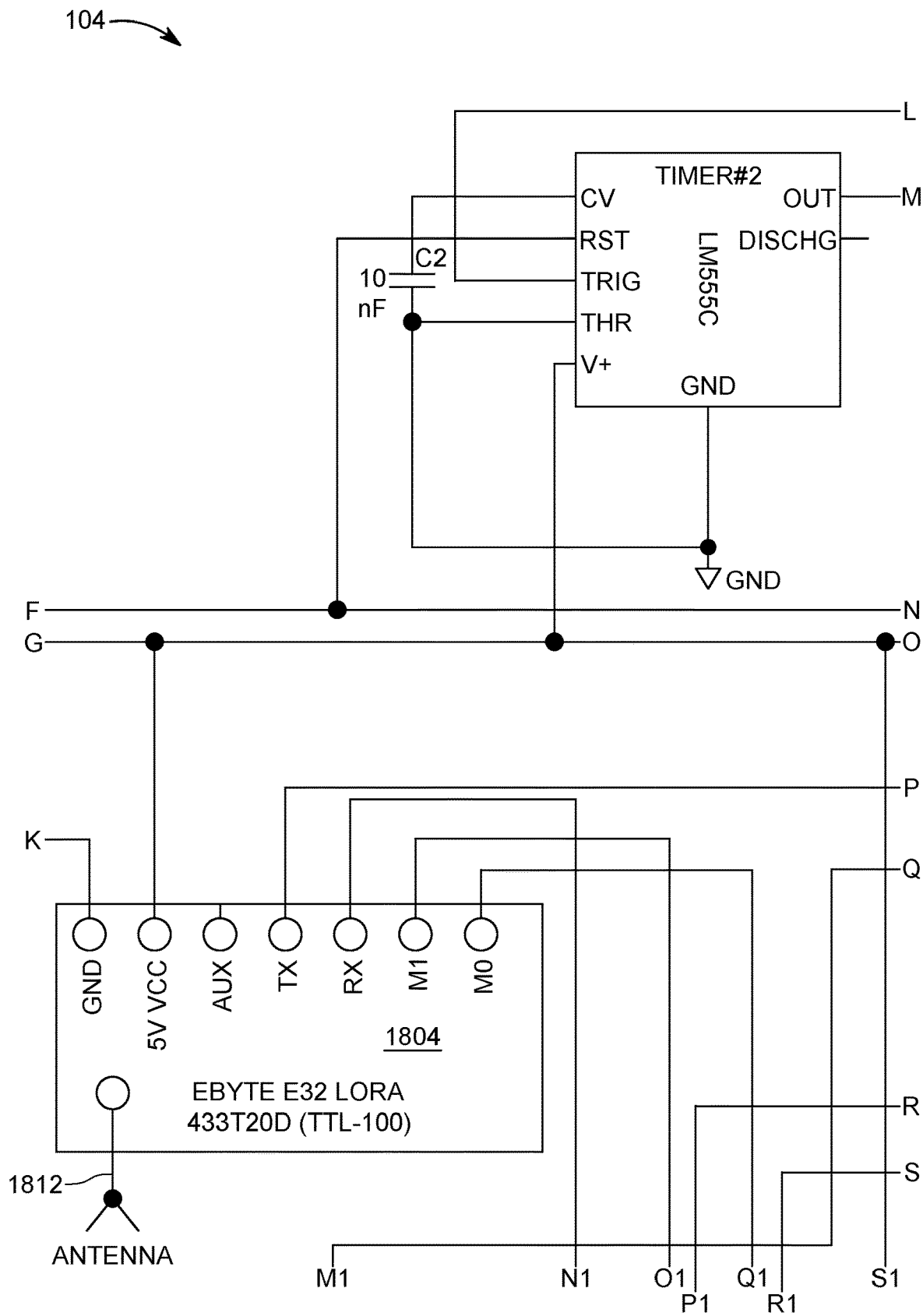
Figure 18C:
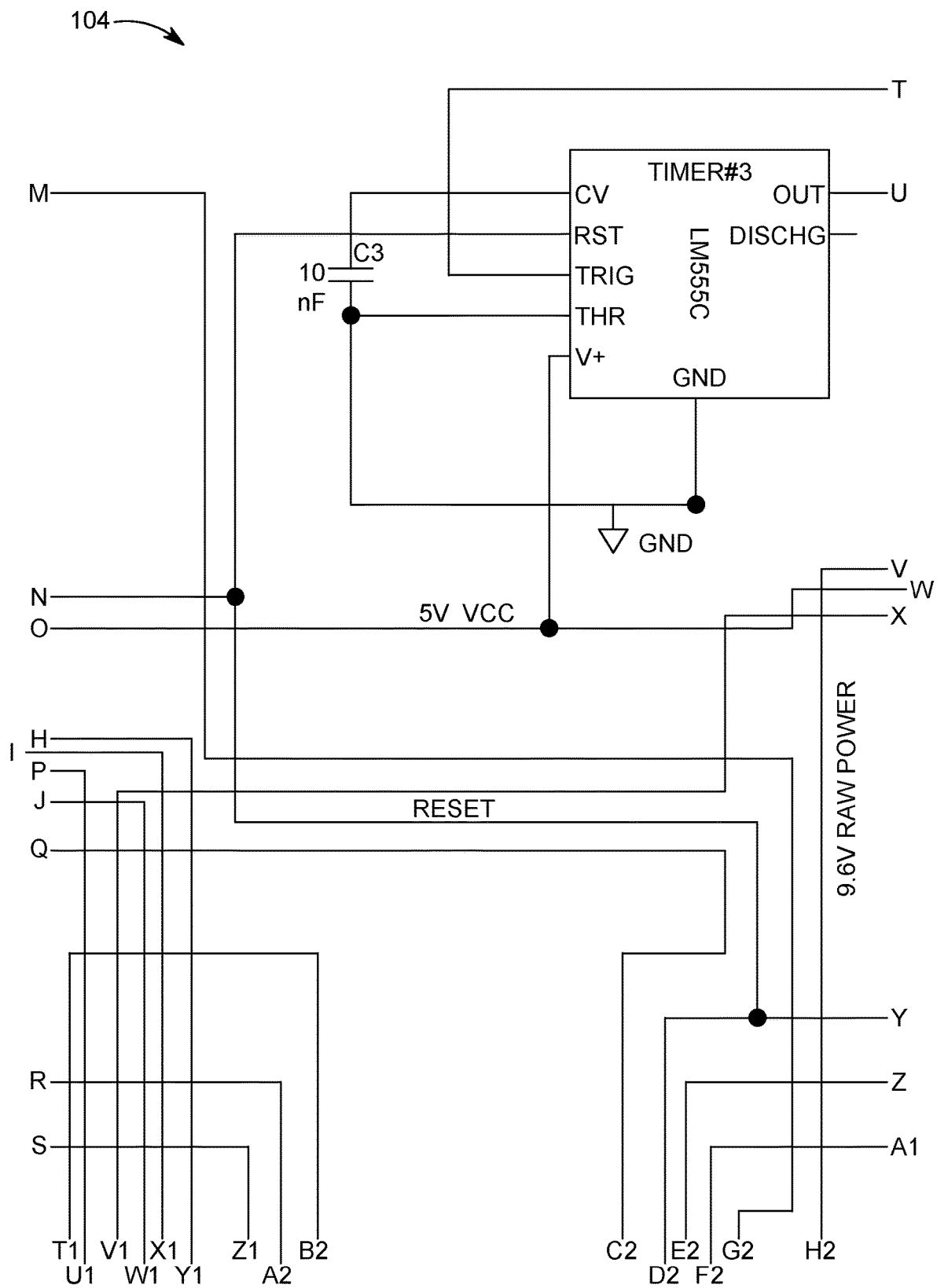
Figure 18D:
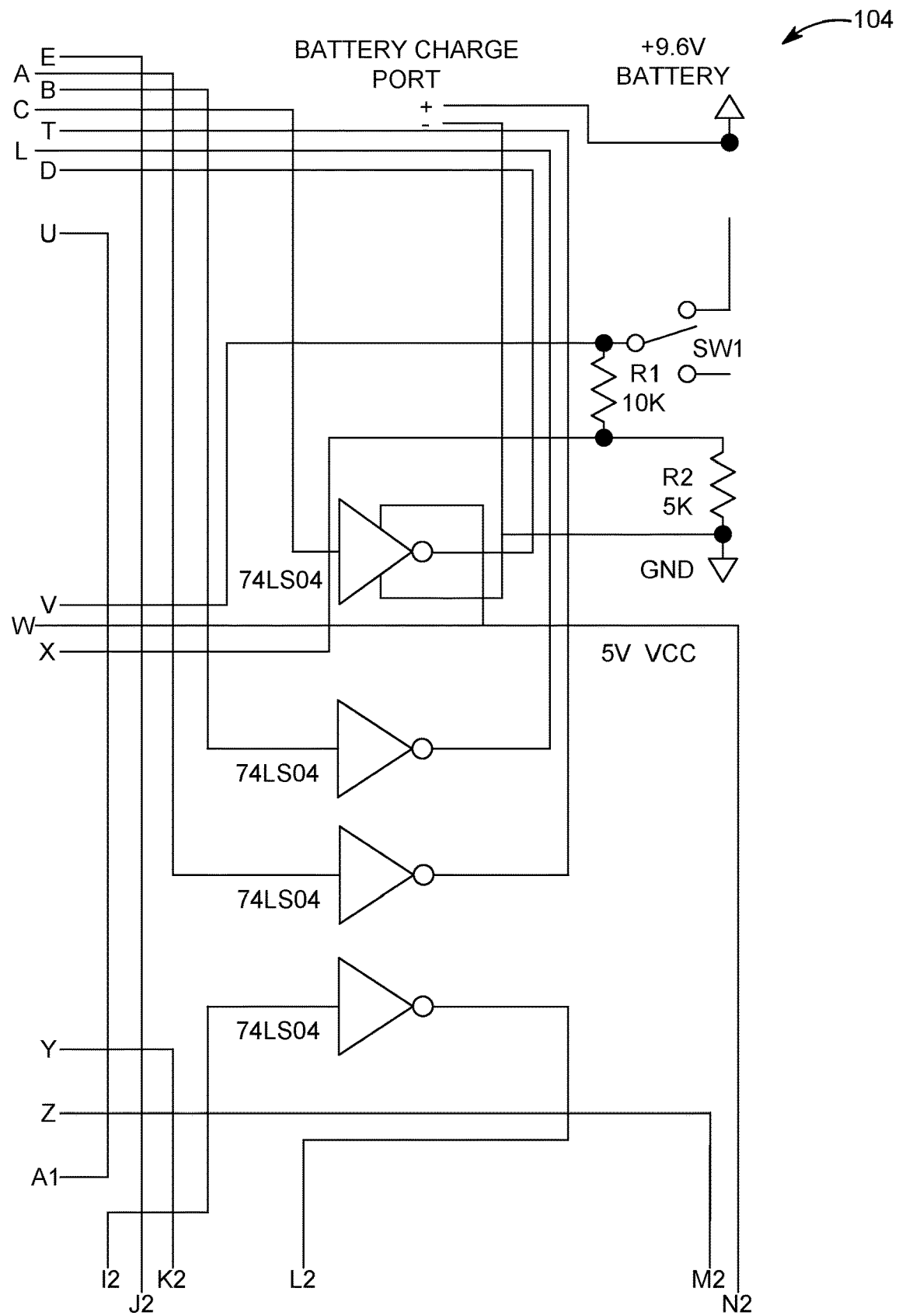
Figure 18E:
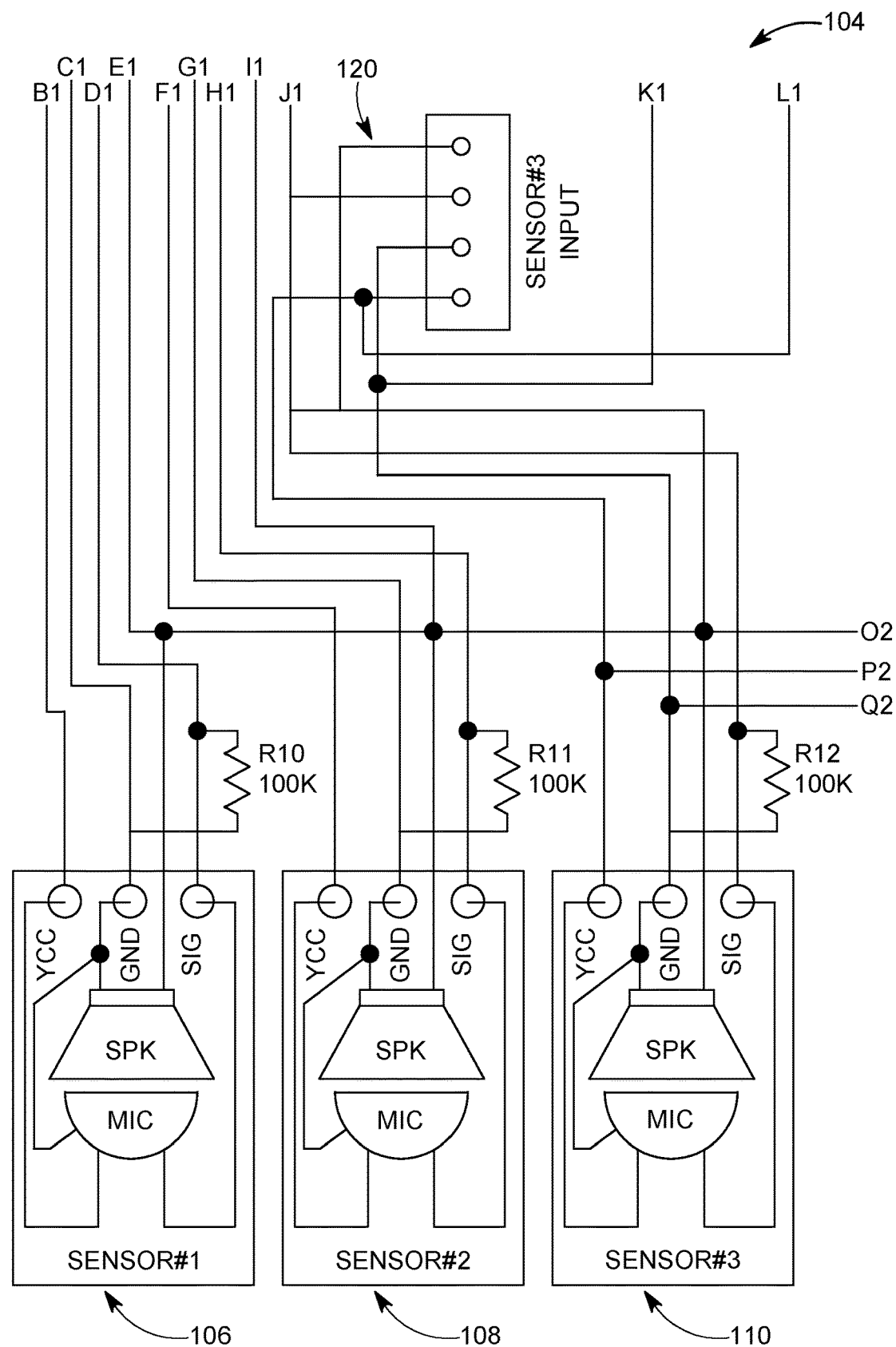
Figure 18F:
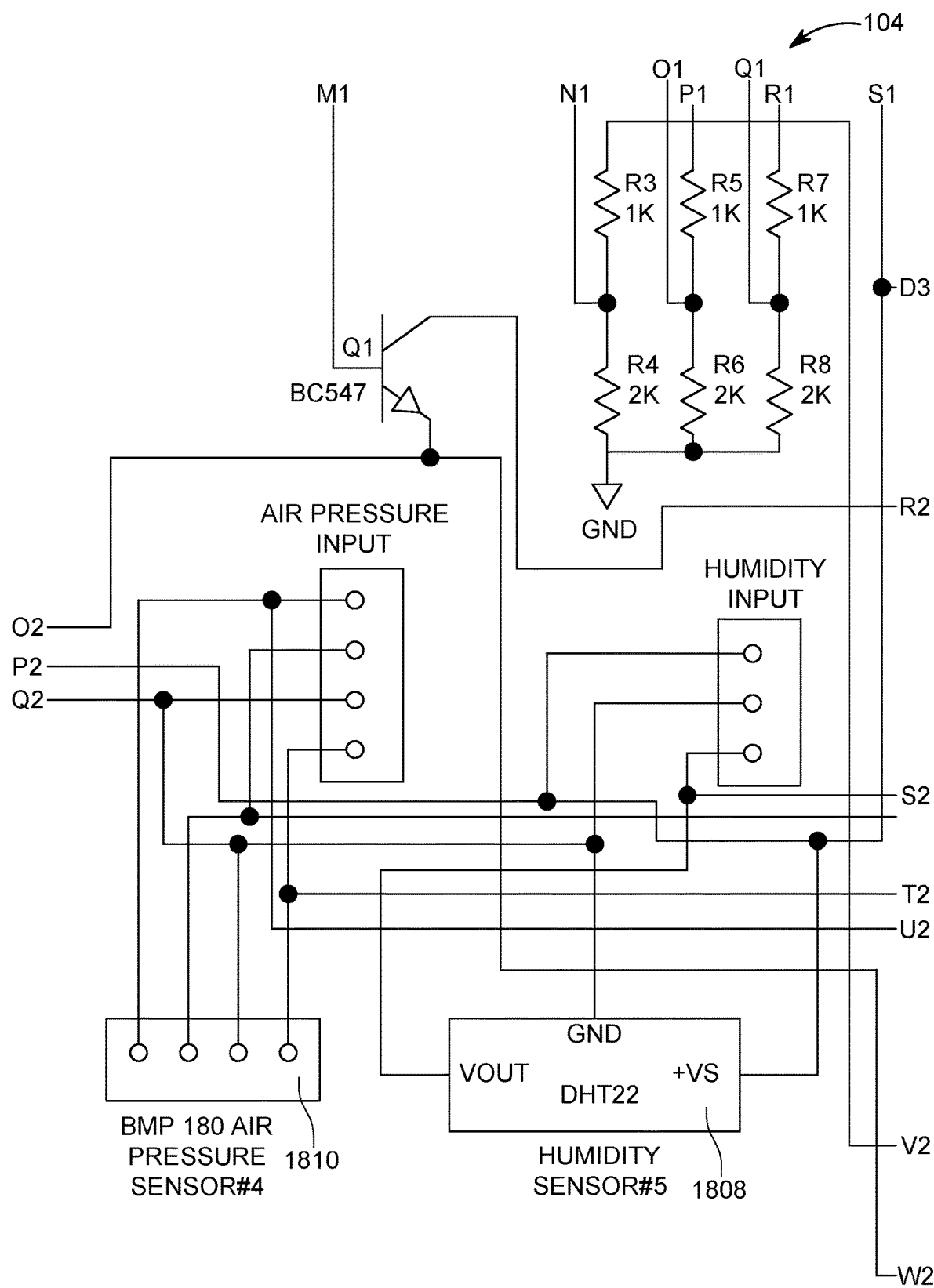
Figure 18G:
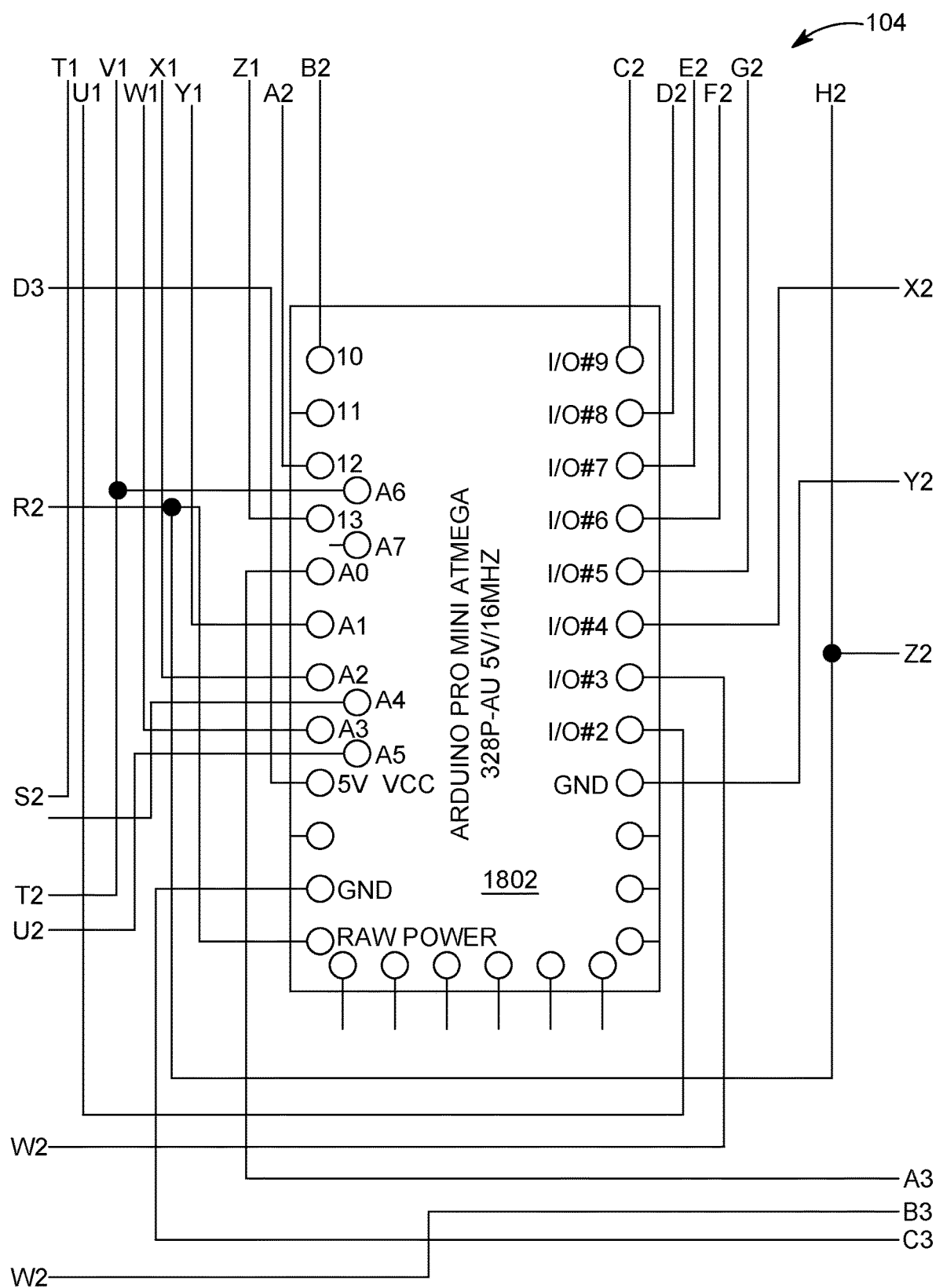
Figure 18H:
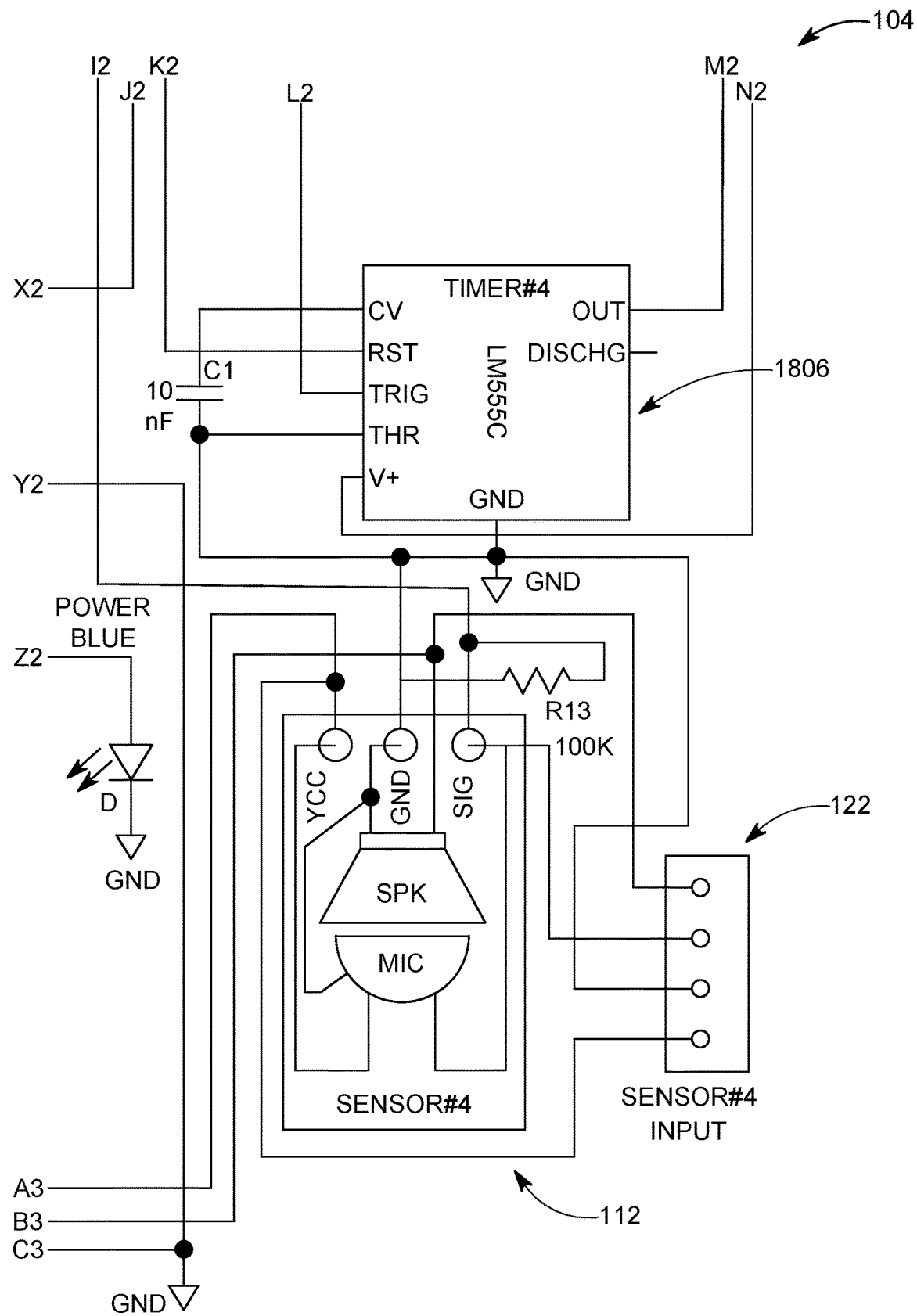

The calculate speed of sound step 2740 can determine the speed of sound at the target 114 of FIG. 1 based on a reading from atmospheric sensors including the humidity sensor 1808 and the air pressure sensor 1810, both of FIG. 18F. Again, the humidity sensor 1808 can also provide a temperature reading.

Once the speed of sound is determined in the calculate speed of sound step 2740, the target tracking system 100 will execute a calculate sound time-to-target step 2742. The calculate sound time-to-target step 2742 can return a time that would be required for sound to travel between the shooter transceiver 132 and the target transceiver 104.

Once the time required for sound to travel between the shooter transceiver 132 and the target transceiver 104 has been determined within the calculate sound time-to-target step 2742, the target tracking system 100 can execute a collect measured time-of-flight step 2744. The collect measured time-of-flight step 2744 can collect the time measured by the target tracking system 100 for a bullet to travel from the shooter transceiver 132 to the target 114.

The time-of-flight reading can be initiated by the start time of flight timer step 2734. Once the bullet time-of-flight has been measured and collected in the collect measured time-of-flight step 2744, the target tracking system 100 can execute a time-of-flight and sound time-to-target discrepancy step 2746.

The time-of-flight and sound time-to-target discrepancy step 2746 can determine whether the measured time of flight of the bullet is significantly greater than the calculated time required for sound to travel between the shooter transceiver 132 and the target 114. A significantly greater time can signify a shot detected from a side-shooter or from the actual shooter, but a shot that is nonetheless, too low.

A time-of-flight for a bullet that is significantly greater than a sound time-to-target can be 3 or 4 times. That is a threshold can be used to determine whether the time-of-flight for a bullet is 3 or 4 times the sound time-to-target. It is to be understood that other thresholds could be used without departing from the target tracking system 100 as disclosed.

If the time-of-flight for a bullet is not significantly greater than the sound time-to-target, the time-of-flight and sound time-to-target discrepancy step 2746 can return a negative result and can start the shooting transceiver shot detection and verification process 2702 over again by re-executing the first shooter microphone blast detection step 2710 and the second piezo inducer blast detection step 2722.

On the other hand, when the time-of-flight for a bullet is significantly greater than the sound time-to-target, the time-of-flight and sound time-to-target discrepancy step 2746 can return a positive result. A positive result from the time-of-flight and sound time-to-target discrepancy step 2746 of the shooting transceiver shot detection and verification process 2702 can indicate that a valid shot has been detected. Once detected, the target tracking system 100 can begin the process of determining and calculating the placement of a bullet impact at the target 114; which is for example, disclosed in FIGS. 28A-28C below.

As will be appreciated, the shooting transceiver shot detection and verification process 2702 cannot practically be performed in the human mind, because the human mind is not equipped to perform the described validation checks on the shooter microphone 2002 and piezo inducer 2014 in real time prior to the bullet reaching the target 114. Nor is the human mind capable of processing raw data from the shooter microphone 2002 or the piezo inducer 2014.

For the purposes of this application, the solution of excluding false triggering from external sound including side-shooters and low shots is necessarily rooted in computer technology that previously failed to provide an acceptable solution to identifying and excluding false shots induced by external sound of side-shots or low shots. False triggering from external sound of side-shots or low shots specifically arises in the realm of bullet tracking or targeting systems because electronic sensors; when used in previous solutions to detect shots fired, used non-directional microphones with a simple magnitude threshold. With the limited data provided by previous single sensor solutions, side shooters were impossible to distinguish as were low shots, because these are actual shots fired. The solution set forth as the low shot determination process 2730 including the wake up target transceiver step 2732, the start time of flight timer step 2734, the full shot packet received step 2736, the low shot time out determination step 2738, the calculate speed of sound step 2740, the calculate sound time-to-target step 2742, the collect measured time-of-flight step 2744, and the time-of-flight and sound time-to-target discrepancy step 2746, as described, solves the problem of previous bullet tracking or targeting systems by utilizing multiple sensors, collecting specifically described data including measured time of flight, processing the data with specific logical decision steps, which results in a detection of false shots fired due to a low measured time of flight.

The side-shooter exclusion process 2704, the bump exclusion process 2720, and the low shot determination process 2730 each individually provide solutions to long standing technical problems. Specifically, traditional shot placement systems had extreme difficulty determining when the correct shooter was actually shooting, excluding side-shooters, excluding bumped devices, and excluding low shots. The solutions provided by the side-shooter exclusion process 2704 excludes other shooters nearby, the solutions provided by the bump exclusion process 2720 excludes bumps at the shooter transceiver 132, and the low shot determination process 2730 excludes other shooters and low shots.

Furthermore, the shooting transceiver shot detection and verification process 2702 controls the technical process or the internal functioning of the shooter transceiver 132 together with its components and the target transceiver 104 together with its components. The side-shooter exclusion process 2704, the bump exclusion process 2720, and the low shot determination process 2730 control the operation of the shooter transceiver 132 and the target transceiver 104, and by extension provide instructions for the shooters to follow.

Figure 28A:
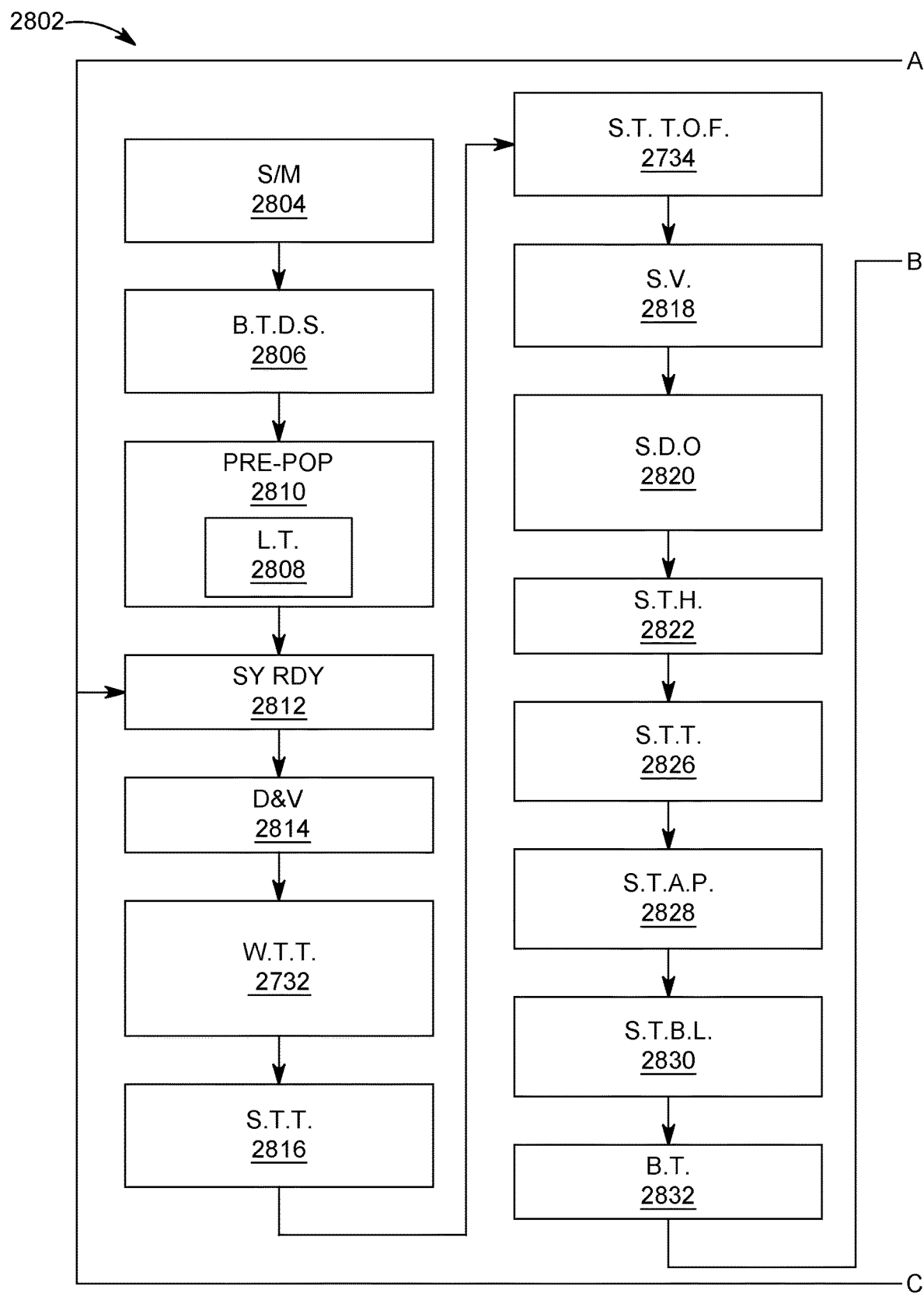
FIGS. 28A-28C are a control flow for an impact placement process for the target tracking system of FIG. 1.
Figure 28B:
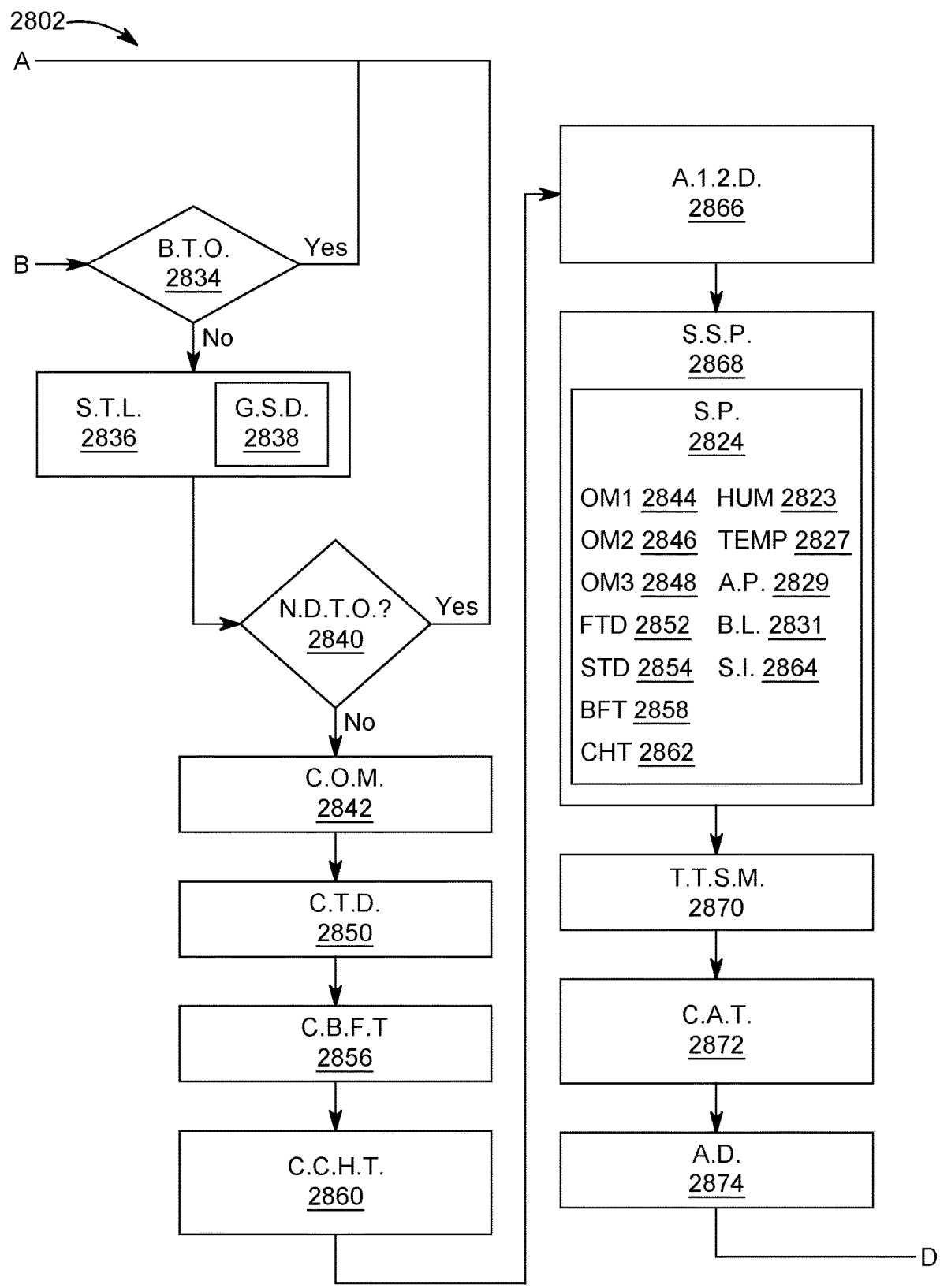
Figure 28C:
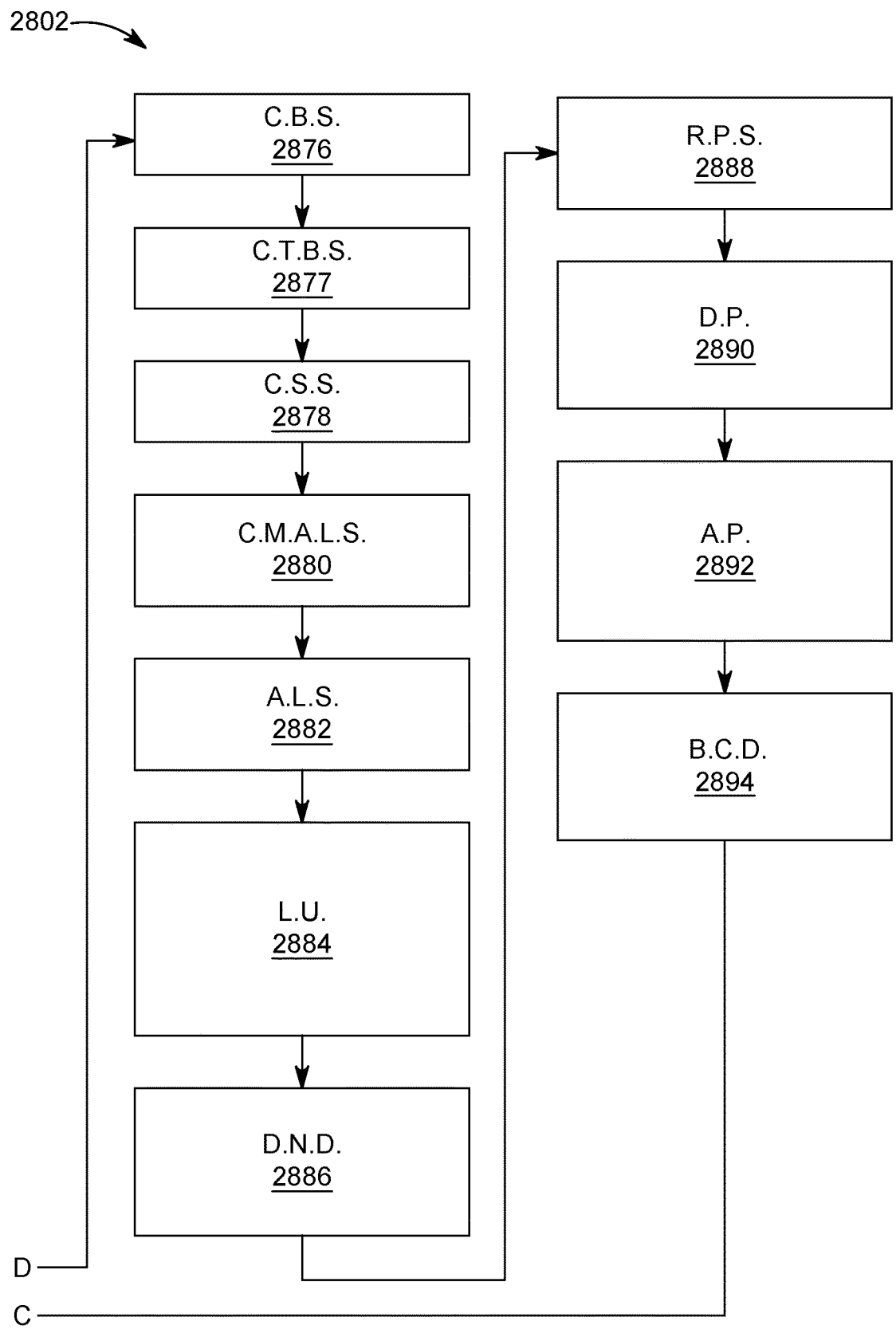
Figure 29A:
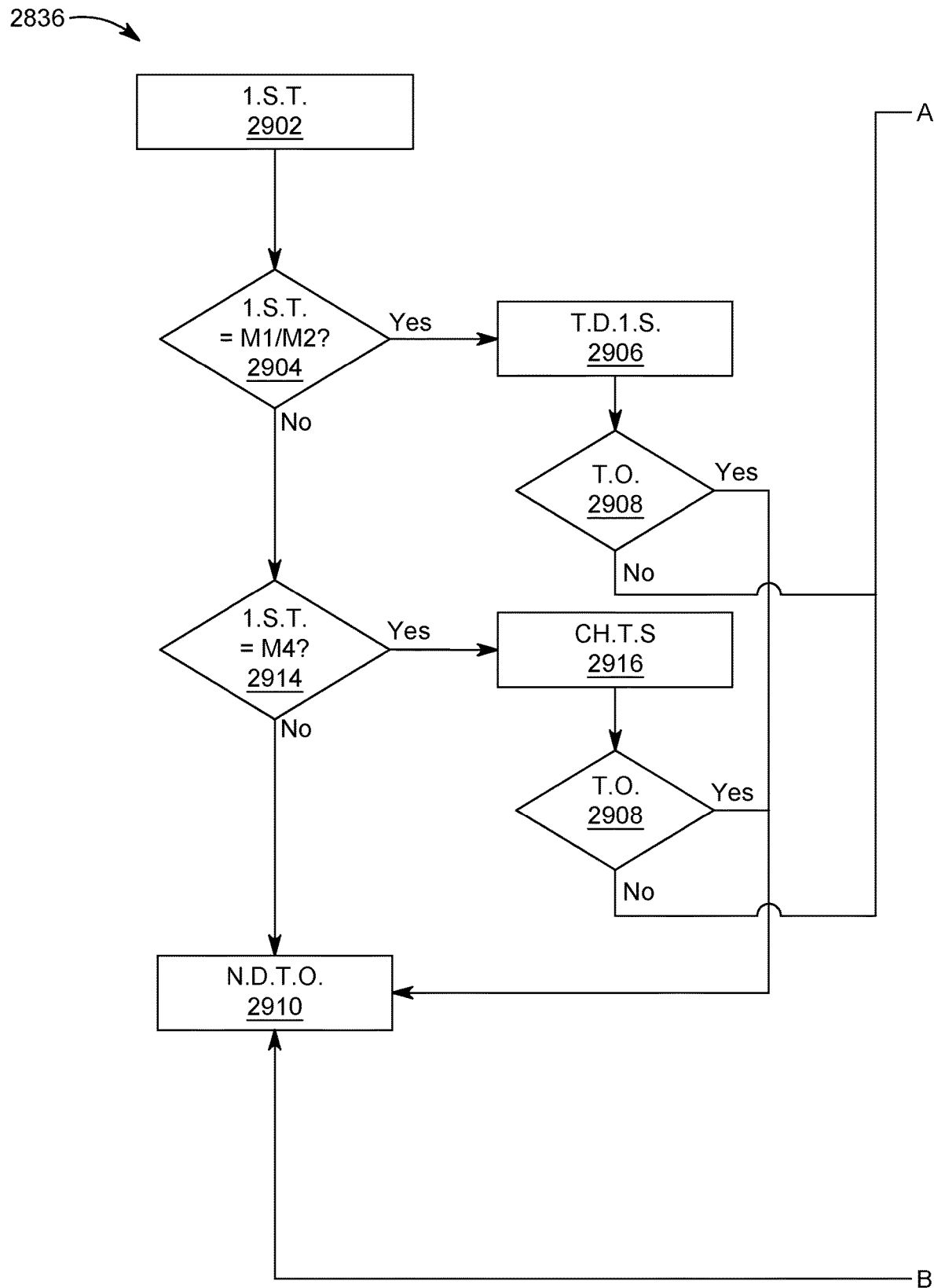
FIGS. 29A-29D are a control flow for impact sensor timing logic for the sensor timer logic step 2836 of FIG. 28B for the target tracking system of FIG. 1.
Figure 29B:
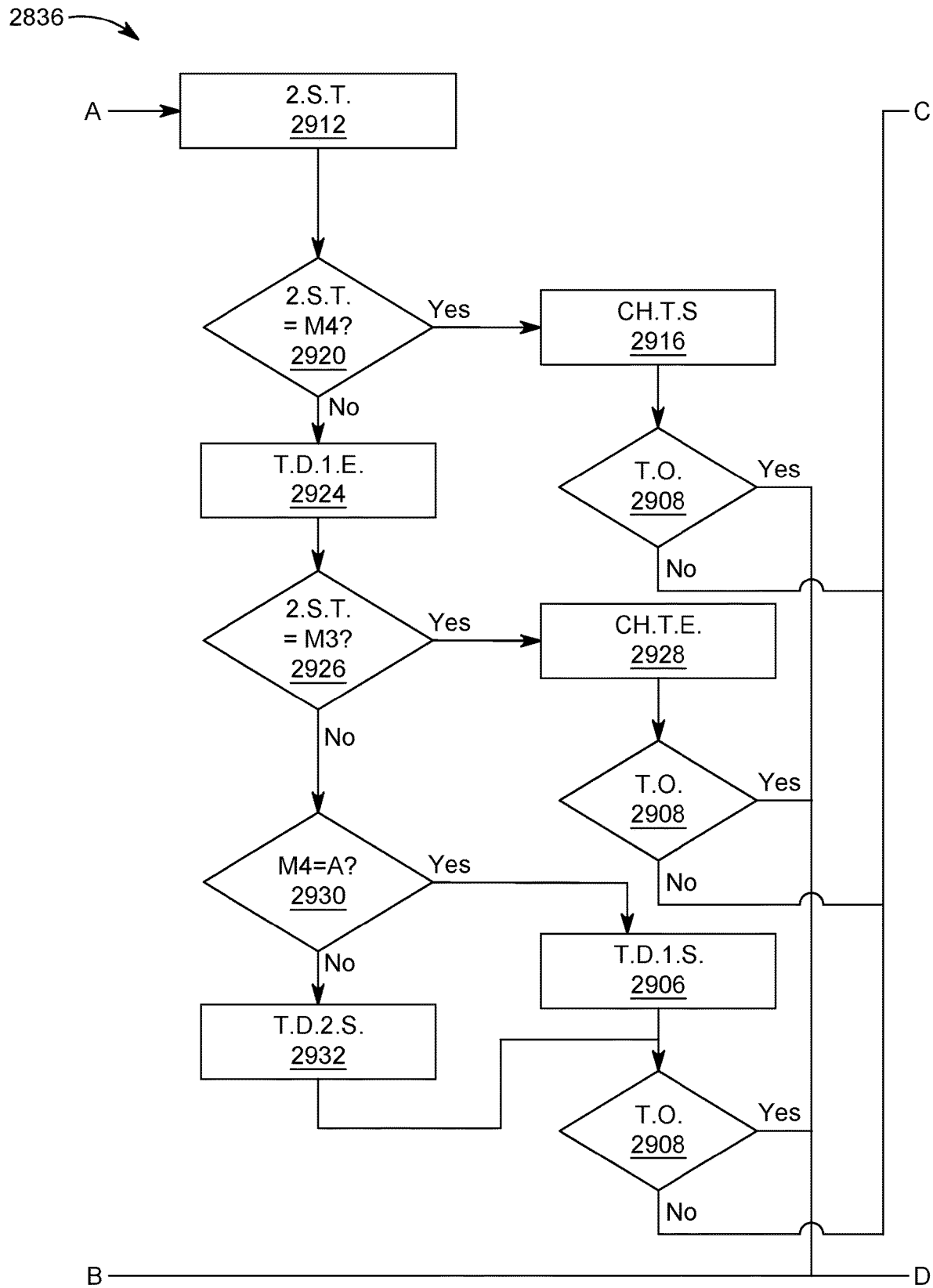
Figure 29C:
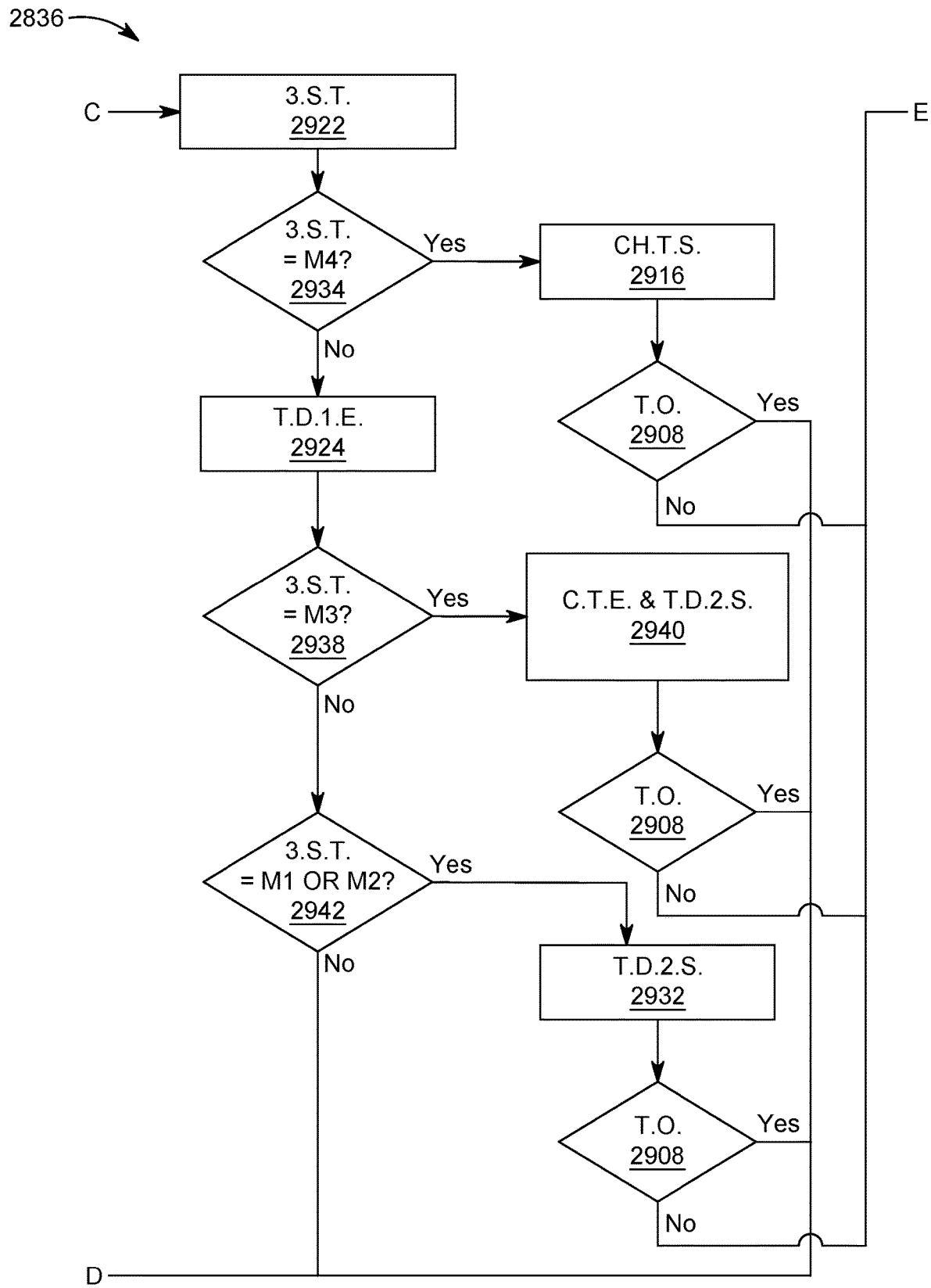
Figure 29D:
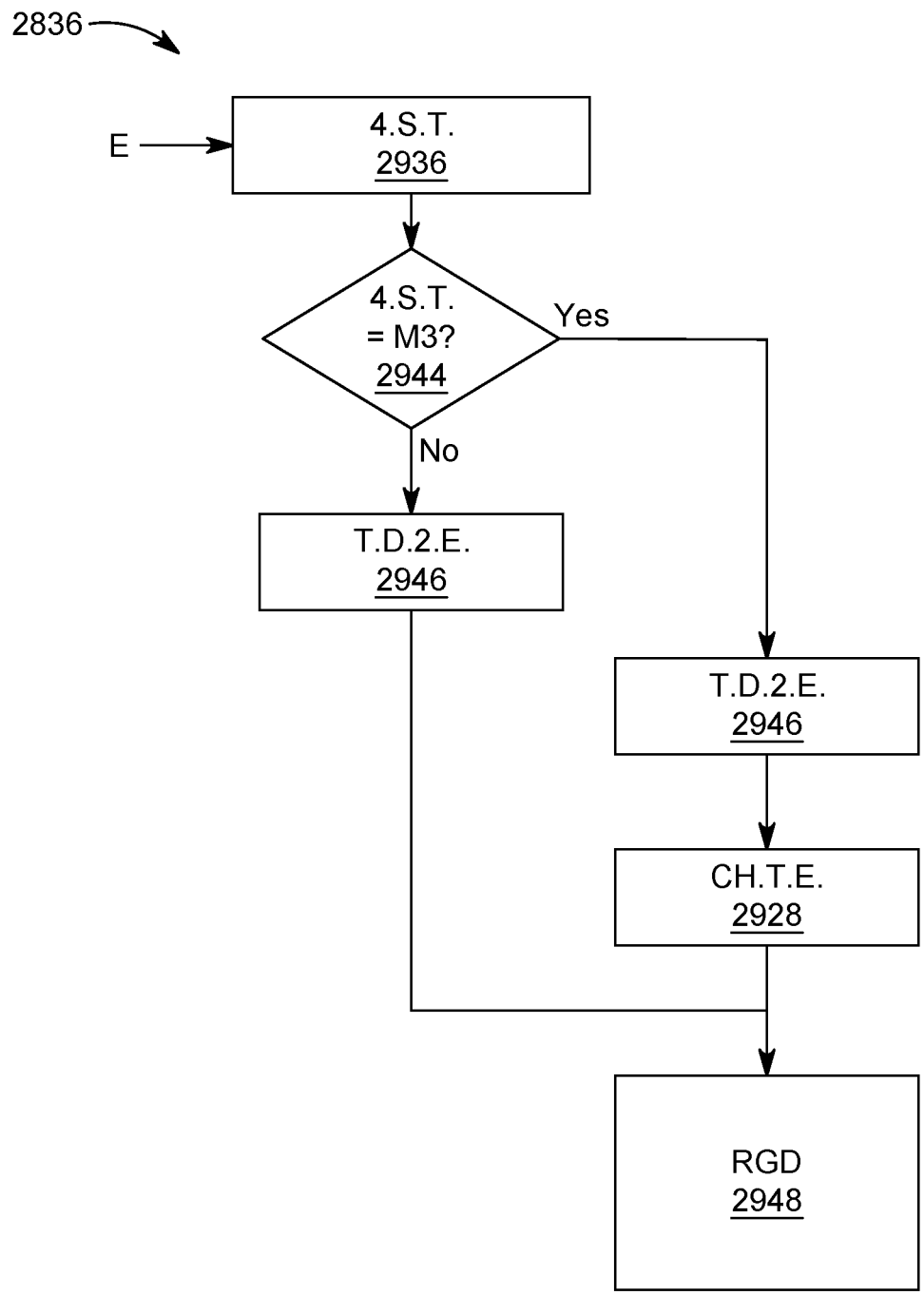

Referring now to FIGS. 28A-28C, therein is shown a control flow for an impact placement process 2802 for the target tracking system 100 of FIG. 1. The impact placement process 2802 can be initialized when the target tracking system 100 executes a single or multi shooter selection step 2804. During the single or multi shooter selection step 2804, the user or shooter can select between the multi-shooter match of FIG. 25 and the single-shooter match of FIGS. 22-24.

The target tracking system 100 can also execute a bullet and target data step 2806. During the bullet and target data step 2806, the target tracking system 100 can request information regarding the ballistics of the ammunition, which can include weight, size, kind, and make of the projectile. The ballistics can also include the amount and type of charge or load. Furthermore, it is contemplated that germane information regarding the firearm could be gathered also; and could include barrel length, bore twist, make, and model.

Target data could also be entered by the user during the bullet and target data step 2806. Information about the target could include an estimated distance between the shooter transceiver 132 of FIG. 1 and the target 114, a target size, or a target location within the target frame 102 of FIG. 1.

The information gathered in the bullet and target data step 2806 can be used to pre-populate a lookup matrix 2808 during a pre-population step 2810. The lookup matrix 2808 could be a matrix of the area of the target frame 102, the area of the extended target 2204 of FIG. 22, or the area within the target frame 102.

The lookup matrix 2808 can break the area down into ⅛th inch cells and can be used to look up the X-Y coordinate placement of the bullet impact on the target 114 similar to that shown in FIG. 23, for example. The pre-population step 2810 can calculate a sensor order and time differential for the four target microphones of FIG. 1.

That is, the pre-population step 2810 can calculate the microphone order and time difference that a bullet would generate for each of the ⅛ inch cells of the target 114, or the area of the extended target 2204, or the area within the target frame 102, or a combination thereof. Once the lookup matrix 2808 is pre-populated, the impact placement process 2802 can execute a system ready step 2812.

For the purposes of this application, pre-populating the lookup matrix 2808 with the pre-population step 2810 is a solution necessarily rooted in computer technology that previously failed to provide an acceptably fast solution to identifying shot placement. Extended calculating for shot placement results in usability issues as lag times can be problematic, especially in rapid fire situations. Shooters could only fire as fast as previous systems could calculate.

Here, however, the pre-population step 2810 prevents calculations after each shot which would cause the Shooter to have to wait a long time to see their shot. The pre-population step 2810 provides calculations upfront for the lookup matrix 2808 for matching all possible combinations of data from the target microphones, including triggering order and triggering time differential, with their X-Y coordinates so that once the target tracking system 100 obtains good shot data from the target transceiver 104, all that is needed is a fast lookup for the closest match and the corresponding X-Y location is immediately presented to the Shooter.

The system ready step 2812 can provide and display the graphical view of the fire when ready screen of FIG. 22 or can provide and display the graphical view of the multi-shooter match fire when ready screen of FIG. 25. The target tracking system 100 can execute the system ready step 2812 until a shot is detected from the shooting position.

During the system ready step 2812, a shot detection and verification step 2814 could be executed. The shot detection and verification step 2814 could include the side-shooter exclusion process 2704 and the bump exclusion process 2720 in their entirety. As a positive result from the side-shooter exclusion process 2704 or the bump exclusion process 2720 will initiate the wake up target transceiver step 2732, so does the shot detection and verification step 2814.

Once the target transceiver 104 of FIG. 1 is woken up by the wake up target transceiver step 2732, the target transceiver 104 can perform multiple steps and gather multiple types of data.

Illustratively, the target transceiver 104 can execute a shooter transceiver temperature step 2816, wherein the temperature is determined and recorded by the shooter temperature sensor 2016 within the shooter transceiver 132, both of FIG. 1. The target tracking system 100 can next execute the start time of flight timer step 2734. The start time of flight timer step 2734 can, for example, begin the count on one of the 555 timers 1806 of FIGS. 18A-18C or 18H.

Once the start time of flight timer step 2734 has been executed, the target tracking system 100 can execute a status viability step 2818. During the status viability step 2818 the status of each of the sensors contained in the target transceiver 104 can be obtained. This can include the first target microphone 106, the second target microphone 108, the third target microphone 110, and the fourth target microphone 112 all of FIG. 1.

Furthermore, during the status viability step 2818, the status of the humidity sensor 1808 and the air pressure sensor 1810, both of FIG. 18F, can be obtained. Yet furthermore during the status viability step 2818, the status of the shooter microphone 2002, the piezo inducer 2014, and the shooter temperature sensor 2016, all of FIG. 20A, can be obtained.

Once the status of all sensors has been determined in the status viability step 2818, the target tracking system 100 can execute a sensor delay offset step 2820. The sensor delay offset step 2820 can sample and determine a calibration offset for each of the sensors, and more particularly the first target microphone 106, the second target microphone 108, the third target microphone 110, and the fourth target microphone 112. The offset can be determined based on the temperature at the shooter transceiver 132.

The impact placement process 2802 can further execute a sample target humidity step 2822. During the sample target humidity step 2822, the target tracking system 100 can sample a humidity 2823 from the humidity sensor 1808 and record the humidity 2823 as a component of a shot packet 2824. The shot packet 2824 can be a log of all of the data from each shot, stored in a .CSV file.

That is, the shot packet 2824 can be a collection of over 55 data points for each shot placed into an Excel file to include user input, measured environmental data, measured bullet parameters, and calculated bullet parameters. The User can bring up any of their past shooting sessions to view a graph of the average deviation from center. An iterative process is used to back calculate the exact ballistic path the bullet took using the measured and collected data, this includes the ballistic coefficient, launch angle, plunging angle, speeds, gyroscopic stability factor, etc.

The impact placement process 2802 can further execute a sample target temperature step 2826. During the sample target temperature step 2826, the target tracking system 100 can sample a temperature 2827 from the humidity sensor 1808 and record the temperature 2827 as a component of the shot packet 2824.

The impact placement process 2802 can further execute a sample target air pressure step 2828. During the sample target air pressure step 2828, the target tracking system 100 can sample an air pressure 2829 from the air pressure sensor 1810 and record the air pressure 2829 as a component of the shot packet 2824.

The impact placement process 2802 can further execute a sample target battery level step 2830. During the sample target battery level step 2830, the target tracking system 100 can sample a battery level 2831 from a battery coupled to the target transceiver 104 and record the battery level 2831 as a component of the shot packet 2824.

While the target tracking system 100 executes the start time of flight timer step 2734, the status viability step 2818, the sensor delay offset step 2820, the sample target humidity step 2822, the sample target temperature step 2826, the sample target air pressure step 2828, and the sample target battery level step 2830, the bullet can be traveling from the shooter transceiver 132 to the target transceiver 104 in a bullet travel step 2832.

It is contemplated that the bullet travel step 2832 could occur simultaneously with the system ready step 2812, the shot detection and verification step 2814, the wake up target transceiver step 2732, and the shooter transceiver temperature step 2816. As will be appreciated, it will be understood by those of ordinary skill in the art that the impact placement process 2802 therefore, cannot practically be performed in the human mind, for instance because the human mind is not equipped to perform the technical steps during a bullet's flight time as is described herein.

The target tracking system 100 can further execute a bullet travel time out determination step 2834. If the bullet travel time out determination step 2834 reaches the end of its counter, the target tracking system 100 will re-execute the system ready step 2812.

If the bullet travel time out determination step 2834 determines that the associated time out counter has not reached a timeout threshold, the target tracking system 100 will execute a sensor timer logic step 2836. The sensor timer logic step 2836 is disclosed and described as FIGS. 29A-29D.

The sensor timer logic step 2836 can provide a determination of whether the target microphones detected and provided good shot data 2838 to the target transceiver 104. This can be done according to a timing analysis of the data or "timing logic" for the four target microphones as described below.

The target tracking system 100 can further execute a no data time out determination step 2840. If the no data time out determination step 2840 reaches the end of its counter or the target tracking system 100 determines that the good shot data 2838 of the sensor timer logic step 2836 is not found, the target tracking system 100 will re-execute the system ready step 2812.

If the no data time out determination step 2840 determines that the associated time out counter has not reached a timeout threshold and the good shot data 2838 has been identified by the sensor timer logic step 2836, the target tracking system 100 will execute a calculate order step 2842.

The calculate order step 2842 will determine which of the target microphones attached to the target frame 102 were triggered in which order. Illustratively, the calculate order step 2842 can provide an order for the first target microphone 106 (OM1 2844), an order for the second target microphone 108 (OM2 2846), and an order for the third target microphone 110 (OM3 2848).

The order for the fourth target microphone 112 should always be known because the fourth target microphone 112 should be the first triggered out of the four target microphones as it is closer to the shooter transceiver 132. Once the calculate order step 2842 is completed, the target tracking system 100 will execute a calculate time differential step 2850.

The calculate time differential step 2850 can provide time differentials between the target microphones attached to the target frame 102; that is, between the first target microphone 106, the second target microphone 108, and the third target microphone 110.

The orders of the target microphones attached to the target frame 102 are recorded as the values for the OM1 2844, the OM2 2846, and the OM3 2848. The calculate time differential step 2850 can provide a first time differential 2852 between the target microphone attached to the target frame 102 that was triggered first and second.

The calculate time differential step 2850 can further provide a second time differential 2854 between the target microphone attached to the target frame 102 that was triggered second and third. Once the first time differential 2852 and the second time differential 2854 are calculated, the target tracking system 100 can execute a calculate bullet flight time step 2856 in order to calculate a bullet flight time 2858. It is contemplated that the calculate bullet flight time step 2856 can be performed in the same manner as the collect measured time-of-flight step 2744 of FIG. 27.

Once the bullet flight time 2858 is calculated, the target tracking system 100 can execute a calculate chronometer time step 2860 for calculating a chronometer time 2862. The chronometer time 2862 can be the time difference or differential between the fourth target microphone 112 and the third target microphone 110 triggering as the bullet shockwave passes by both sensors. The chronometer time 2862 can be used to calculate the speed of the bullet at the target as the distance between the fourth target microphone 112 and the third target microphone 110 is maintained at a fixed and predetermined distance, such as 180 inches.

The target transceiver 104 can further collect any status indicators 2864 provided by the various sensors of the target transceiver 104 or coupled to the target transceiver 104, such as the target microphones. The status indicators 2864 can be stored in the shot packet 2824.

The target tracking system 100 can further execute an adjust first and second time differentials step 2866. The adjust first and second time differentials step 2866 can adjust the first time differential 2852 and the second time differential 2854 with the chronometer time 2862 and the calibration offsets for each of the sensors, as determined by the sensor delay offset step 2820.

Once the adjust first and second time differentials step 2866 calculates and saves the adjusted values as the first time differential 2852 and the second time differential 2854, the target tracking system 100 can execute a send shot packet step 2868 wherein the shot packet 2824 is transmitted to the shooter transceiver 132. After the shot packet 2824 is transmitted the target transceiver 104 can be put into a sleep mode with a target transceiver sleep step 2870.

The target tracking system 100 can execute many of the steps of the disclosed system on the target transceiver 104 itself or on the shooter transceiver 132. However, some of the following steps are contemplated to be performed on the laptop 134 of FIG. 1, for example while the target transceiver 104 sleeps. However, it is contemplated that the target transceiver 104 or the shooter transceiver 132 could be made capable of performing all calculations without departing from the target tracking system 100 disclosed herein.

Illustratively for example, the target tracking system 100 could execute a calculate average temperature step 2872. The calculate average temperature step 2872 can calculate an average temperature at both the target transceiver 104 and the shooter transceiver 132.

The target tracking system 100 can execute a calculate air density from atmospheric data step 2874 where an air density could be calculated both at the shooter transceiver 132 and the target transceiver 104. The target tracking system 100 can also execute a calculate bullet speed step 2876 where a speed of the bullet is calculated from the chronometer time 2862 and the fixed distance between the fourth target microphone 112 and the third target microphone 110.

The target tracking system 100 can also execute a calculate theoretical bullet speed step 2877. During the calculate theoretical bullet speed step 2877, the target tracking system 100 can use the air density, user inputs, and ballistics equations to calculate a theoretical bullet speed. The theoretical bullet speed can be compared against the calculated speed of the actual bullet determined in the calculate bullet speed step 2876. The theoretical bullet speed determined in the calculate theoretical bullet speed step 2877 can be adjusted if there is a significant difference between the theoretical bullet speed and the calculated speed of the actual bullet determined in the calculate bullet speed step 2876.

The target tracking system 100 can also execute a calculate speed of sound step 2878. The calculate speed of sound step 2878 can calculate the speed of sound at the shooter transceiver 132 and at the target transceiver 104 from the average temperatures at each transceiver or based on the temperature data collected thereby.

The target tracking system 100 can further execute a calculate Mach angle and longitudinal speed step 2880. The calculate Mach angle and longitudinal speed step 2880 can first calculate a Mach angle for the bullet based on the bullet's speed and atmospheric conditions determined both by the shooter transceiver 132 and the target transceiver 104. The longitudinal speed of the bullet parallel to the sensor frame plane, can also be calculated.

The target tracking system 100 can next adjust the first time differential 2852 and the second time differential 2854 based on the longitudinal speed of the bullet in an adjust for longitudinal speed step 2882. The target tracking system 100 can next execute a lookup step 2884.

The lookup step 2884 can lookup X-Y coordinates for the shot within the lookup matrix 2808. The X-Y coordinates could be found using the measured order of the microphones, the OM1 2844, the OM2 2846, and the OM3 2848, together with the first time differential 2852 and the second time differential 2854; both of which adjusted as previously described with regard to the adjust first and second time differentials step 2866 and the adjust for longitudinal speed step 2882.

If the target tracking system 100 runs the lookup step 2884 and the measured order of the microphones, the first time differential 2852, and the second time differential 2854 do not match closely with coordinates contained within the lookup matrix 2808, the target tracking system 100 could display "No Impact, No Idea", on the laptop 134 in a display no data step 2886.

A close match can be determined by utilizing thresholds for the values being matched and the values contained within the lookup matrix 2808. For example, it is contemplated that there could be a threshold on the time differentials, where a time differential that is over a differential threshold would no longer be considered close for the purposes of matching with the lookup matrix 2808.

A variation of this display is depicted in FIG. 24 when displaying "No Shot Data". If the target tracking system 100 runs the lookup step 2884 and the X-Y coordinates are found, the target tracking system 100 can execute a re-plot previous shot step 2888.

The re-plot previous shot step 2888 will re-plot a previous shot as a blue dot or arrow and display it on the laptop 134. If no previous shot is recorded the re-plot previous shot step 2888 will be skipped.

The target tracking system 100 can plot the X-Y coordinate of the current shot, as determined by the lookup step 2884, on the laptop 134 as a red dot indicating the shot placement 2304 of FIG. 23 in a dot placement step 2890. The target tracking system 100 can plot the X-Y coordinate of the current shot, as determined by the lookup step 2884, on the laptop 134 as a red arrow indicating the directional indicator 2404 of FIG. 24 in an arrow placement step 2892.

The target tracking system 100 can further execute a back calculate and display step 2894. The back calculate and display step 2894 can use air density, actual bullet speed, and user input to back-calculate the actual range to target and a ballistics coefficient. The target tracking system 100 can display an impact X Coordinate, an impact Y Coordinate, an actual bullet speed, actual speed of sound, actual range to target, temperature, ballistics coefficient, battery level, and remaining sensor status, for example. The target tracking system 100 will then re-execute the system ready step 2812.

Referring now to FIGS. 29A-29D, therein is shown a control flow for the sensor timer logic step 2836 of FIG. 28B for the target tracking system 100 of FIG. 1. The control flow for the sensor timer logic step 2836 relies on the timing of a detection for each of the target microphones.

Specifically, the triggering order of the first target microphone 106, the second target microphone 108, the third target microphone 110, and the fourth target microphone 112, all of FIG. 1, will be discussed herein and relies, for proper illustration, on the placement of the target microphones as they are shown and described in FIG. 1. As the bullet passes through the target frame 102 of FIG. 1, the first target microphone 106, the second target microphone 108, the third target microphone 110, and the fourth target microphone 112 will be triggered at different times based on the placement of the bullet within the target frame 102.

The triggering order of the target microphones will be evaluated within the sensor timer logic step 2836. If the triggering order is not one of a fixed set of triggering orders, the sensor timer logic step 2836 will indicate that the shot data is not good, and no data time out determination step 2840 will re-execute the system ready step 2812 of FIG. 28A.

The sensor timer logic step 2836 of FIGS. 29A-29D will be described and should be understood as the same operation performed at different places within the sensor timer logic step 2836. Illustratively, for example, starting the chronometer timer (the chronometer timer start step 2916) for calculating the chronometer time 2862 of FIG. 28B, could happen at three different times during the sensor timer logic step 2836. The first instance will be referred to as a chronometer timer start step 2916, while subsequent recitations of this step will be referred to as the chronometer timer start step 2916 for clarity only.

Although the chronometer timer start step 2916, for example, is described multiple times with regard to the sensor timer logic step 2836, the chronometer timer start step 2916 will only run once in practice and the timing of which is determined by the logic as described herein. This is the case for other elements such as the first and second time differential start and end steps and the chronometer timer end step.

The sensor timer logic step 2836 is also described with regard to a time out determination step 2908. For ease of description the time out determination step 2908 is described as the same step using the same counters. However, in practice it is understood that the time out determination step 2908 could use counters specifically tailored to each individual time out determination step.

The target tracking system 100 can begin when a bullet triggers a first sensor out of the four target microphones in a first sensor trigger step 2902. Once one of the target microphones, including the first target microphone 106, the second target microphone 108, or the fourth target microphone 112 is triggered, the target tracking system 100 will execute a first sensor M1 or M2 determination step 2904. It has been discovered that determining which of these three microphones is triggered first can provide multiple indications of bullet position and trajectory without the additional third target microphone 110, and the logic flow eliminating the third target microphone 110 from the initial assessment can speed up determination of bullet placement and provide robust shot validity with less equipment.

The first sensor M1 or M2 determination step 2904 can determine whether the first target microphone 106 or the second target microphone 108 were the first sensor triggered. If the first target microphone 106 or the second target microphone 108 is the first sensor triggered, then the first sensor M1 or M2 determination step 2904 will return an affirmative result and the target tracking system 100 can execute a time differential #1 timer start step 2906.

The time differential #1 timer start step 2906 can begin the timer for recording and determining the first time differential 2852 of FIG. 28B. The target tracking system 100 can further execute a time out determination step 2908. If the time out determination step 2908 reaches the end of its counter, the target tracking system 100 will execute a no data time out return step 2910.

The no data time out return step 2910 will indicate that the shot data is not good, and no data time out determination step 2840 will re-execute the system ready step 2812. If the time out determination step 2908 determines that the associated time out counter has not reached a timeout threshold, the target tracking system 100 will execute and detect a triggering of one of the four target microphones in a second sensor trigger step 2912.

The second sensor trigger step 2912 can determine and detect a bullet triggering a second sensor out of the four target microphones.

Returning now to the first sensor M1 or M2 determination step 2904, if the first target microphone 106 or the second target microphone 108 is not the first sensor triggered then the first sensor M1 or M2 determination step 2904 can return a negative result and the target tracking system 100 will execute a first sensor M4 determination step 2914.

The first sensor M4 determination step 2914 will determine whether the fourth target microphone 112 is the first of the target microphones to be triggered by the bullet. If the fourth target microphone 112 is the first sensor triggered by the shot, an affirmative result will be generated and the target tracking system 100 will execute a chronometer timer start step 2916.

The chronometer timer start step 2916 can begin a chronometer timer for calculating the chronometer time 2862. The target tracking system 100 can execute the time out determination step 2908 after the chronometer timer start step 2916. If the time out determination step 2908 reaches the end of its counter, the target tracking system 100 will execute the no data time out return step 2910.

The no data time out return step 2910 will indicate that the shot data is not good, and no data time out determination step 2840 will re-execute the system ready step 2812. If the time out determination step 2908 determines that the associated time out counter has not reached a timeout threshold, the target tracking system 100 will execute the second sensor trigger step 2912.

If the first sensor M4 determination step 2914 returns a negative result the target tracking system 100 can execute the no data time out return step 2910. As will be appreciated, if the third target microphone 110 is the first sensor triggered in the first sensor trigger step 2902, the target tracking system 100 will recognize bad data because the fourth target microphone 112 should always be triggered prior to the third target microphone 110, and which is one logical step that allows the target tracking system 100 to distinguish good and bad shot data solving a long felt problem with target tracking systems.

Once the second sensor trigger step 2912 has made a second detection by one of the target microphones, the target tracking system 100 will execute a second sensor M4 determination step 2920. If the fourth target microphone 112 is the second sensor triggered, the second sensor M4 determination step 2920 will return an affirmative result and the target tracking system 100 will execute the chronometer timer start step 2916.

The chronometer timer start step 2916 can begin the chronometer timer for calculating the chronometer time 2862. The target tracking system 100 can execute the time out determination step 2908 after the chronometer timer start step 2916. If the time out determination step 2908 reaches the end of its counter, the target tracking system 100 will execute the no data time out return step 2910.

The no data time out return step 2910 will indicate that the shot data is not good, and no data time out determination step 2840 will re-execute the system ready step 2812. If the time out determination step 2908 determines that the associated time out counter has not reached a timeout threshold, the target tracking system 100 will execute a third sensor trigger step 2922.

If the second sensor M4 determination step 2920 returns a negative result the target tracking system 100 can execute a time differential #1 timer end step 2924.

The time differential #1 timer end step 2924 can end the timer for recording and determining the first time differential 2852 started by the time differential #1 timer start step 2906. The target tracking system 100 can thereafter execute a second sensor M3 determination step 2926.

If the third target microphone 110 is determined to be the second sensor triggered out of the target microphones, the second sensor M3 determination step 2926 will return a positive result and the target tracking system 100 will execute a chronometer timer end step 2928.

The chronometer timer end step 2928 can end the chronometer timer for calculating the chronometer time 2862. The target tracking system 100 can execute the time out determination step 2908 after the chronometer timer end step 2928. If the time out determination step 2908 reaches the end of its counter, the target tracking system 100 will execute the no data time out return step 2910.

The no data time out return step 2910 will indicate that the shot data is not good, and no data time out determination step 2840 will re-execute the system ready step 2812. If the time out determination step 2908 determines that the associated time out counter has not reached a timeout threshold, the target tracking system 100 will execute the third sensor trigger step 2922.

If the third target microphone 110 is determined not to be the second sensor triggered out of the target microphones, the second sensor M3 determination step 2926 will return a negative result and the target tracking system 100 will execute a fourth target microphone active determination step 2930. The fourth target microphone active determination step 2930 can determine whether the fourth target microphone 112 was triggered by the shot at all.

If the fourth target microphone 112 is active and has therefore been triggered, the fourth target microphone active determination step 2930 will return an affirmative result and the target tracking system 100 will execute the time differential #1 timer start step 2906. The time differential #1 timer start step 2906 can begin the timer for recording and determining the first time differential 2852.

If the fourth target microphone 112 is not active and has not therefore been triggered, the fourth target microphone active determination step 2930 will return a negative result and the target tracking system 100 will execute a time differential #2 timer start step 2932.

The time differential #2 timer start step 2932 can begin the timer for recording and determining the second time differential 2854 of FIG. 28B. The target tracking system 100 can further execute the time out determination step 2908 after both the time differential #2 timer start step 2932 and the time differential #1 timer start step 2906.

More particularly, the fourth target microphone active determination step 2930 checks if the fourth target microphone 112 has been previously activated. The fourth target microphone 112 could have been the first sensor activated or it could have been the second sensor activated.

If the fourth target microphone 112 was the first sensor activated, the time differential #1 timer can be initiated while the time differential #2 timer can be initiated when the fourth target microphone 112 is determined to be the second sensor activated. If the time out determination step 2908 reaches the end of its counter, the target tracking system 100 will execute a no data time out return step 2910.

The no data time out return step 2910 will indicate that the shot data is not good, and no data time out determination step 2840 will re-execute the system ready step 2812. If the time out determination step 2908 determines that the associated time out counter has not reached a timeout threshold, the target tracking system 100 will execute the third sensor trigger step 2922.

The third sensor trigger step 2922 can be the triggering of a third sensor of the target microphones. Once the third sensor trigger step 2922 has made a third detection, the target tracking system 100 will execute a third sensor M4 determination step 2934. If the fourth target microphone 112 is the third sensor triggered, the third sensor M4 determination step 2934 will return an affirmative result and the target tracking system 100 will execute the chronometer timer start step 2916.

The chronometer timer start step 2916 can begin the chronometer timer for calculating the chronometer time 2862. The target tracking system 100 can execute the time out determination step 2908 after the chronometer timer start step 2916. If the time out determination step 2908 reaches the end of its counter, the target tracking system 100 will execute the no data time out return step 2910.

The no data time out return step 2910 will indicate that the shot data is not good, and no data time out determination step 2840 will re-execute the system ready step 2812. If the time out determination step 2908 determines that the associated time out counter has not reached a timeout threshold, the target tracking system 100 will execute a fourth sensor trigger step 2936.

If the third sensor M4 determination step 2934 returns a negative result the target tracking system 100 can execute a time differential #1 timer end step 2924.

The time differential #1 timer end step 2924 can end the timer for recording and determining the first time differential 2852 started by the time differential #1 timer start step 2906. The target tracking system 100 can thereafter execute a third sensor M3 determination step 2938.

If the third target microphone 110 is determined to be the third sensor triggered out of the target microphones, the third sensor M3 determination step 2938 will return a positive result and the target tracking system 100 will execute the chronometer timer end step 2928 and the time differential #2 timer start step 2932 together in a single chronometer timer end and time differential #2 timer start step 2940. The chronometer timer end step 2928 can end the chronometer timer for calculating the chronometer time 2862 while the time differential #2 timer start step 2932 can begin the timer for recording and determining the second time differential 2854.

The target tracking system 100 can further execute the time out determination step 2908 after the chronometer timer end and time differential #2 timer start step 2940. If the time out determination step 2908 reaches the end of its counter, the target tracking system 100 will execute a no data time out return step 2910.

The no data time out return step 2910 will indicate that the shot data is not good, and no data time out determination step 2840 will re-execute the system ready step 2812. If the time out determination step 2908 determines that the associated time out counter has not reached a timeout threshold, the target tracking system 100 will execute the fourth sensor trigger step 2936.

If the third target microphone 110 is not the third sensor triggered in during the third sensor trigger step 2922, the third sensor M3 determination step 2938 will return a negative result and the target tracking system 100 will execute a third sensor M1 or M2 determination step 2942.

If either the first target microphone 106 or the second target microphone 108 is determined to be the third sensor triggered, the third sensor M1 or M2 determination step 2942 will return an affirmative result and the target tracking system 100 will execute the time differential #2 timer start step 2932.

The time differential #2 timer start step 2932 can begin the timer for recording and determining the second time differential 2854. The target tracking system 100 can further execute the time out determination step 2908 after the time differential #2 timer start step 2932. If the time out determination step 2908 reaches the end of its counter, the target tracking system 100 will execute a no data time out return step 2910.

The no data time out return step 2910 will indicate that the shot data is not good, and no data time out determination step 2840 will re-execute the system ready step 2812. If the time out determination step 2908 determines that the associated time out counter has not reached a timeout threshold, the target tracking system 100 will execute the fourth sensor trigger step 2936.

The fourth sensor trigger step 2936 can be the triggering of a fourth sensor of the target microphones and should not be the fourth target microphone 112. Once the fourth sensor trigger step 2936 has made a fourth detection, the target tracking system 100 will execute a fourth sensor M3 determination step 2944. If the third target microphone 110 is the fourth sensor triggered, the fourth sensor M3 determination step 2944 will return an affirmative result and the target tracking system 100 will execute a time differential #2 timer end step 2946.

The time differential #2 timer end step 2946 can end the timer for recording and determining the second time differential 2854 started by the time differential #2 timer start step 2932. The target tracking system 100 can thereafter execute the chronometer timer end step 2928.

The chronometer timer end step 2928 can end the chronometer timer for calculating the chronometer time 2862. Once the chronometer timer end step 2928 is completed, the target tracking system 100 can return a positive result from the sensor timer logic step 2836 with the receipt of good data by the target microphones, as indicated by a received good data step 2948.

If the third target microphone 110 is not the fourth sensor triggered, the fourth sensor M3 determination step 2944 will return a negative result and the target tracking system 100 will execute the time differential #2 timer end step 2946.

The time differential #2 timer end step 2946 can end the timer for recording and determining the second time differential 2854 started by the time differential #2 timer start step 2932. Once the time differential #2 timer end step 2946 is completed, the target tracking system 100 can return a positive result from the sensor timer logic step 2836 with the receipt of good data by the target microphones, as indicated by the received good data step 2948.

For the purposes of this application, the solution of discerning between data from good shots and data from bad shots using the detection of the shot shockwave alone, is necessarily rooted in computer and software technology that previously failed to provide an acceptable solution to distinguishing good and bad shot data. Bad shot data specifically arises in the realm of bullet tracking or targeting systems because bullets can trigger the target microphones in abnormal ways due to echos, misses, ricochets, etc. The abnormal triggering generally produces increased power and resource utilization as the system attempts to deal with a larger amount of bad data mixed with good data. Furthermore, the good data mixed with bad data shown to the user is difficult to effectively utilize, and in some cases presents such time delays that rapid fire shooting becomes difficult to effectively track with previous systems as the firing rate increases. With the limited data processing provided by previous systems, bad shot data compounded many of these problems.

Recognizing that a shot is not good overcomes at least one shortcoming of other previous systems, in that previous systems have great difficulty in discerning good data from bad data by the detection of the shot alone. Here, the target tracking system solves the problem of discerning bad shot data by providing new, specific, and unique logical conditions of the target microphones being triggered, which enables the target tracking system to distinguish bad shots from the good shot data 2838.

More particularly, it has been discovered that good shot determination can include determining a first sensor triggered from the first target microphone 106, the second target microphone 108 and the fourth target microphone 112; providing an error if the third target microphone 110 is first triggered; determining a second sensor triggered between the fourth target microphone 112 and the third target microphone 110; determining a third sensor triggered between the fourth target microphone 112, the third target microphone 110, and the first target microphone 106 or the second target microphone 108; and determining whether the third target microphone 110 is a fourth sensor triggered.

Furthermore, for the purposes of this application, the solution of determining shot placement using the logic and timers of the sensor timer logic step 2836, including for example the chronometer timer start step 2916, the chronometer timer end step 2928, or the single chronometer timer end and time differential #2 timer start step 2940, is necessarily rooted in computer and software technology that previously failed to provide an acceptable solution to robustly and quickly determining shot placement.

One improvement in the target tracking system 100 is the provision of accurate and robust timing measurements, which can be used to back-calculate a bullet's flight path, were not previously used. Rather previous attempted solutions either ignored bullet speed altogether, relied on estimated pre-loaded velocities, or purpose built chronometers which are not required by the target tracking system 100. These previous solutions fail to provide a robust shot placement because the actual measured velocity of the bullet is not used.

Bad shot placement specifically arises in the realm of bullet tracking or targeting systems because bullets can trigger the target microphones in abnormal ways due to echos, misses, ricochets, etc. The abnormal triggering generally produces increased power and resource utilization as the system attempts to deal with a larger amount of bad data mixed with good data.

Here, determining shot placement using the logic and timers of the sensor timer logic step 2836 can provide fast, robust shot placement because the shot detections that are not logically recognized based on the order of triggering of the target microphones can be ignored leaving the order and timing of proper target microphone triggering the only major task to determine shot placement.

This has been shown to provide consistent, reliable, accurate, and fast shot placement that previous systems could not because of the increased processing requirements of bad shot data. Therefore, timing of these logical conditions, for example the target microphones being triggered and controlling the various timers discussed herein, can be used to accurately predict shot placement using lightweight, small, readily available sensors.

More particularly, it has been discovered that determining an accurate shot placement can include starting a time differential #1 timer based on the first target microphone 106 or the second target microphone 108 being a first sensor triggered; starting a chronometer timer based on the fourth target microphone 112 being the first sensor triggered or the second sensor triggered; ending the chronometer timer based on the third target microphone 110 being the second sensor triggered; starting the time differential #1 timer based on the fourth target microphone 112 being active and the third target microphone 110 not being the second sensor triggered or starting a time differential #2 timer based on the fourth target microphone 112 not being active and the third target microphone 110 not being the second sensor triggered; starting the chronometer timer based on the fourth target microphone 112 being the third sensor triggered; ending the time differential #1 timer based on the fourth target microphone 112 not being the third sensor triggered; ending the chronometer timer and starting the time differential #2 timer based on the third target microphone 110 being the third sensor triggered; starting the time differential #2 timer based on the first target microphone 106 or the second target microphone 108 being the third sensor triggered; ending the time differential #2 timer and ending the chronometer timer based on the third target microphone 110 being the fourth sensor triggered; and ending the time differential #2 timer based on the third target microphone 110 not being the fourth sensor triggered.

Figure 30:
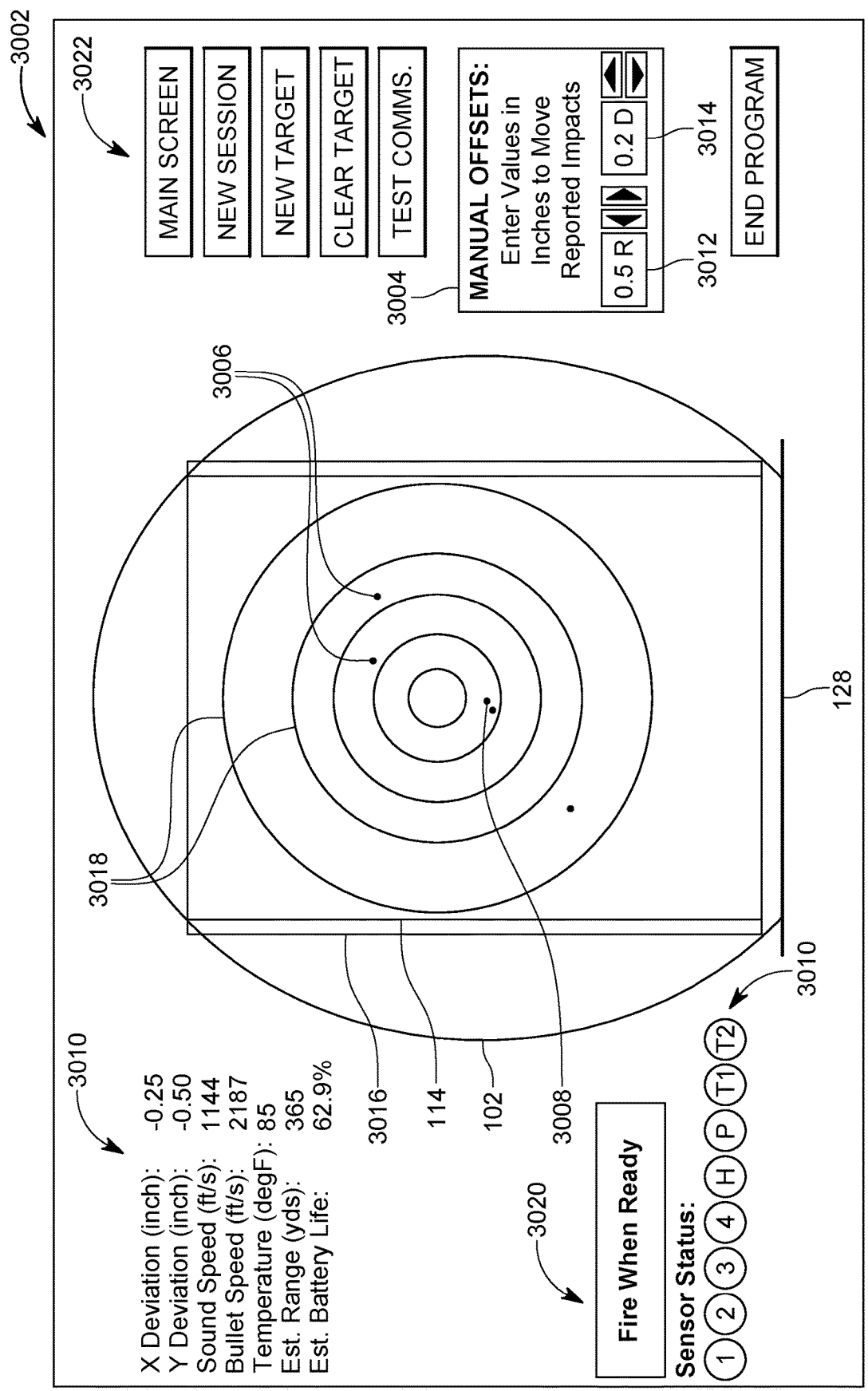
FIG. 30 is a graphical view of a fire when ready screen with manual offsets of the target tracking system of FIG. 1.

Referring now to FIG. 30, therein is shown a graphical view of a fire when ready screen 3002 with manual offsets 3004 of the target tracking system 100 of FIG. 1. The fire when ready screen 3002 can include a graphical representation of the target 114, the target frame 102, and the four-piece segmented H-frame base 128.

The target tracking system 100 can be implemented as a software based application that interprets the data from the target transceiver 104 and the shooter transceiver 132, both of FIG. 1, into a graphical display of shot analysis, for example the bullet's impact on target on the Shooter's laptop, can be displayed as shot placements 3006 and should be understood herein as shot analysis.

The bullet caliber, grain weight, muzzle velocity, estimated target range, and estimated slope angle to the target can be entered and used for pre-populating the X-Y coordinate matrix as part of the shot analysis, for example disclosed above with regard to the pre-population step 2810 of FIG. 28A. The application can plot the latest shot on the screen in red as a last shot placement 3008 and turns the previous shot placements blue, which are represented as the shot placements 3006.

The shot placement 3006 can be determined either by a processor within the target transceiver 104, the shooter transceiver 132, the laptop, or a processor in communication therewith. The shot placement 3006 can be the position a bullet arrives at the sensor frame plane relative to the target microphones.

An information display region 3010 can be displayed within the fire when ready screen 3002 after each shot. The information display region 3010 can display a temperature, speed of sound, bullet speed at target, estimated target range, impact deviation from center, battery life remaining, and sensor status.

The manual offsets 3004 can provide a lateral offset 3012 and a vertical offset 3014 which can move the last shot placement 3008 laterally or vertically, respectively, on the fire when ready screen 3002. The manual offsets 3004 can be used when a shooter sees his shot physically on the target at a different place than is represented by the last shot placement 3008 and can then correct the last shot placement 3008 to reflect the physical placement of the shot at the target 114.

It has been discovered that the lateral offset 3012 and the vertical offset 3014 allow a User to observe their physical target shot pattern, compare against the reported shot pattern, and add in a corrective offset to make sure the next round of shots matches more closely. The lateral offset 3012 and the vertical offset 3014 therefore allows the User to overcome any remaining significant error due to the sensors being mismatched.

The fire when ready screen 3002 is depicted to include an extended target 3016 around the target 114 and concentric circles 3018. The extended target 3018 can be a virtual target, used for dialing in future shots, and for recording shot placement for later analysis and training. The concentric circles 3018 can provide a center mass indicator, a critical hit indicator, or a points indicator.

The fire when ready screen 3002 can indicate that the target tracking system 100 is ready for the shooter to fire with a fire indicator 3020 in the bottom left of the screen. The fire indicator 3020 can display the message "Fire When Ready".

The fire when ready screen 3002 can further include program operation buttons 3022. The program operation buttons 3022 can allow a user to control the target tracking system 100 during use. The program operation selections 3022 can include a main screen button, a new session button, a new target button, a test comms. button, and an end program button.

After each shot the target tracking system 100 conducts a function check on all sensors and measures the battery level and then sends this data back to the shooter transceiver 132 which displays the sensor and battery status visually to the Shooter. The test comms button allows the Shooter to verify that the shooter transceiver 132 has line-of-sight communication with the target transceiver 104 prior to shooting.

Figure 31:
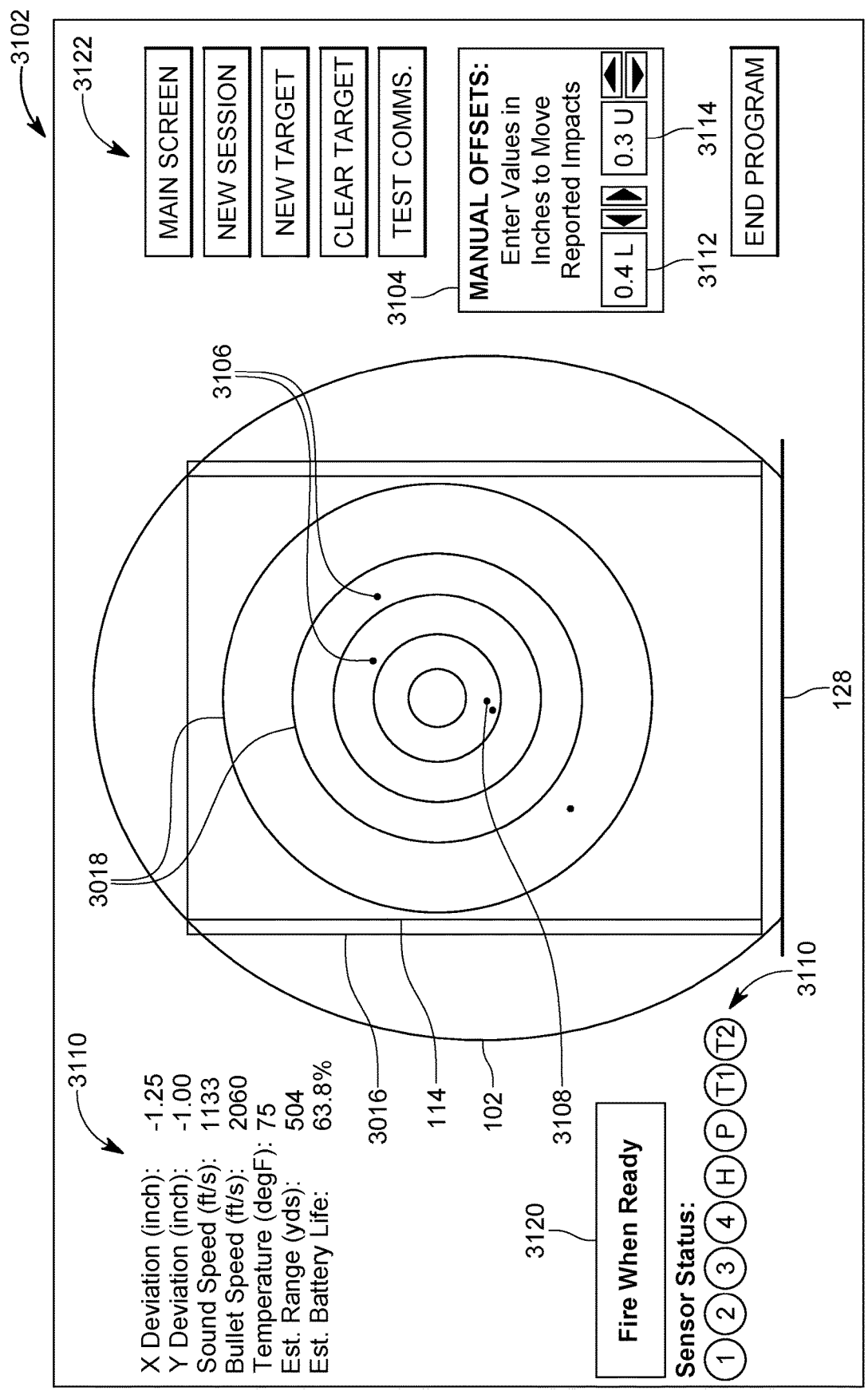
FIG. 31 is a graphical view of a second fire when ready screen with manual offsets of the target tracking system of FIG. 1.

Referring now to FIG. 31, therein is shown a graphical view of a second fire when ready screen 3102 with manual offsets 3104 of the target tracking system of FIG. 1. The fire when ready screen 3102 can include a graphical representation of the target 114, the target frame 102, and the four-piece segmented H-frame base 128.

The target tracking system 100 can be implemented as a software application that interprets the data from the target transceiver 104 and the shooter transceiver 132, both of FIG. 1, into a graphical display of shot analysis, for example the bullet's impact on target on the Shooter's laptop, can be displayed as shot placements 3106 and should be understood herein as shot analysis.

The bullet caliber, grain weight, muzzle velocity, estimated target range, and estimated slope angle to the target can be entered and used for pre-populating the X-Y coordinate matrix as part of the shot analysis, for example disclosed above with regard to the pre-population step 2810 of FIG. 28A. The application can plot the latest shot on the screen in red as a last shot placement 3108 and turns the previous shot placements blue, which are represented as the shot placements 3106.

The shot placement 3106 can be determined either by a processor within the target transceiver 104, the shooter transceiver 132, the laptop, or a processor in communication therewith. The shot placement 3106 can be the position a bullet arrives at the sensor frame plane relative to the target microphones.

An information display region 3110 can be displayed within the fire when ready screen 3102 after each shot. The information display region 3110 can display a temperature, speed of sound, bullet speed at target, estimated target range, impact deviation from center, battery life remaining, and sensor status.

The manual offsets 3104 can provide a lateral offset 3112 and a vertical offset 3114 which can move the last shot placement 3108 laterally or vertically, respectively, on the fire when ready screen 3102. The manual offsets 3104 can be used when a shooter sees his shot physically on the target at a different place than is represented by the last shot placement 3108 and can then correct the last shot placement 3108 to reflect the physical placement of the shot at the target 114.

The fire when ready screen 3102 is depicted to include an extended target 3116 around the target 114 and concentric circles 3118. The extended target 3118 can be a virtual target, used for dialing in future shots, and for recording shot placement for later analysis and training. The concentric circles 3118 can provide a center mass indicator, a critical hit indicator, or a points indicator.

The fire when ready screen 3102 can indicate that the target tracking system 100 is ready for the shooter to fire with a fire indicator 3120 in the bottom left of the screen. The fire indicator 3120 can display the message "Fire When Ready".

The fire when ready screen 3102 can further include program operation buttons 3122. The program operation buttons 3122 can allow a user to control the target tracking system 100 during use. The program operation selections 3122 can include a main screen button, a new session button, a new target button, a test comms. button, and an end program button.

After each shot the target tracking system 100 conducts a function check on all sensors and measures the battery level and then sends this data back to the shooter transceiver 132 which displays the sensor and battery status visually to the Shooter. The test comms button allows the Shooter to verify that the shooter transceiver 132 has line-of-sight communication with the target transceiver 104 prior to shooting.

Figure 32:
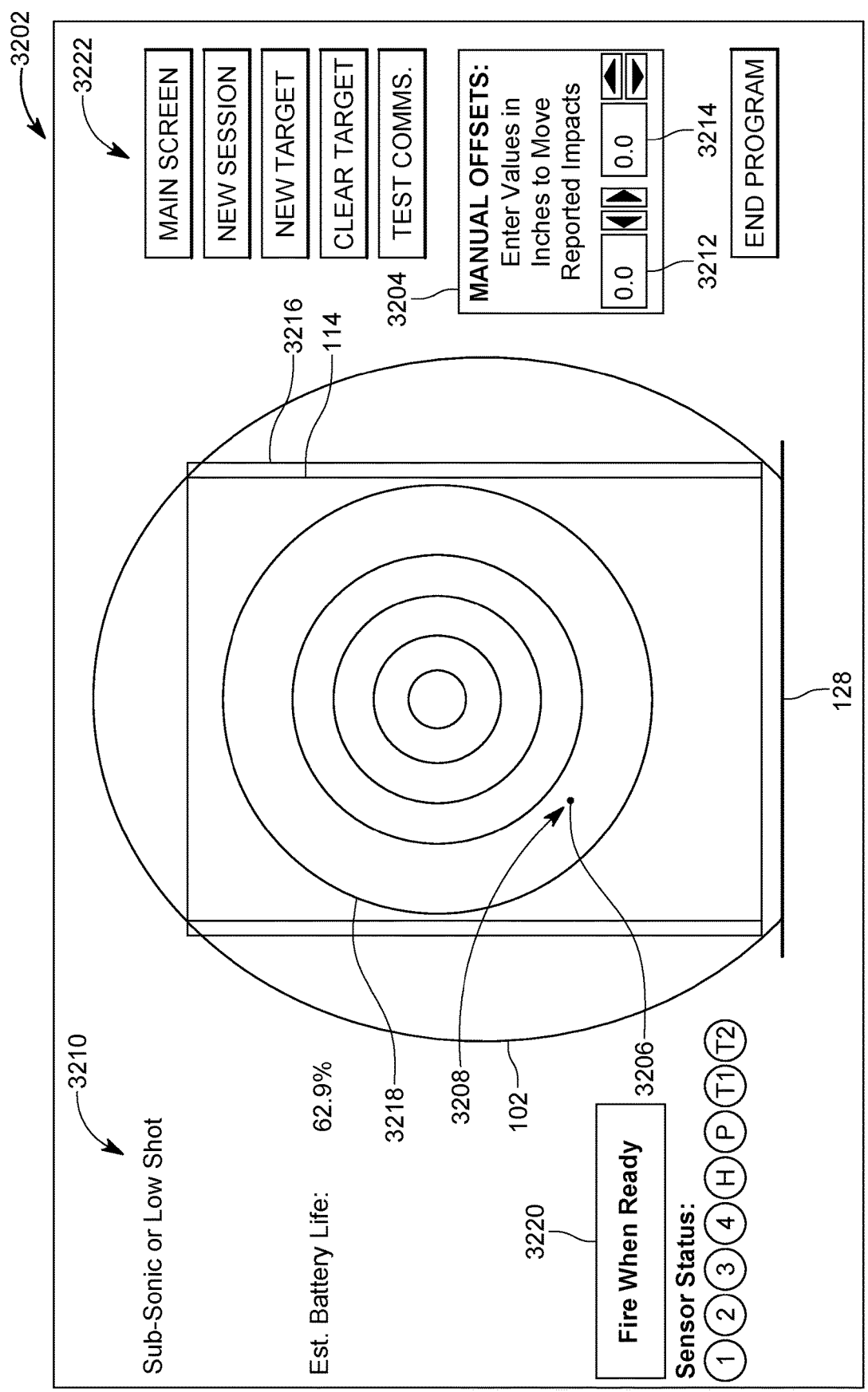
FIG. 32 is a graphical view of a third fire when ready screen with manual offsets of the target tracking system of FIG. 1.

Referring now to FIG. 32, therein is shown a graphical view of a third fire when ready screen 3202 with manual offsets 3204 of the target tracking system of FIG. 1. The fire when ready screen 3202 can include a graphical representation of the target 114, the target frame 102, and the four-piece segmented H-frame base 128.

The target tracking system 100 can be implemented as a software based software application that interprets the data from the target transceiver 104 and the shooter transceiver 132, both of FIG. 1, into a graphical display of shot analysis, for example the bullet's impact on target on the Shooter's laptop, can be displayed as shot placements 3206 and should be understood herein as shot analysis.

The bullet caliber, grain weight, muzzle velocity, estimated target range, and estimated slope angle to the target can be entered and used for pre-populating the X-Y coordinate matrix as part of the shot analysis, for example disclosed above with regard to the pre-population step 2810 of FIG. 28A. The application can plot the latest shot on the screen in red as a last shot placement 3208 and turns the previous shot placements blue. In the present case, only a single shot has been detected in which case the fire when ready screen 3202 identifies the last shot placement 3208 in red with no other shots displayed. The last shot placement 3208 can be understood as one of the shot placements 3206.

The shot placement 3206 can be determined either by a processor within the target transceiver 104, the shooter transceiver 132, the laptop, or a processor in communication therewith. The shot placement 3206 can be the position a bullet arrives at the sensor frame plane relative to the target microphones.

An information display region 3210 can be displayed within the fire when ready screen 3202 after each shot. The information display region 3210 can display the error "sub-sonic or low shot" when the shot was either sub-sonic or low.

The manual offsets 3204 can provide a lateral offset 3212 and a vertical offset 3214 which can move the last shot placement 3208 laterally or vertically, respectively, on the fire when ready screen 3202. The manual offsets 3204 can be used when a shooter sees his shot physically on the target at a different place than is represented by the last shot placement 3208 and can then correct the last shot placement 3208 to reflect the physical placement of the shot at the target 114. It is contemplated that when the target tracking system 100 detects a sub-sonic or low shot, the manual offsets 3204 will not be used and can remain at 0.0.

The fire when ready screen 3202 is depicted to include an extended target 3216 around the target 114 and concentric circles 3218. The extended target 3218 can be a virtual target, used for dialing in future shots, and for recording shot placement for later analysis and training. The concentric circles 3218 can provide a center mass indicator, a critical hit indicator, or a points indicator.

The fire when ready screen 3202 can indicate that the target tracking system 100 is ready for the shooter to fire with a fire indicator 3220 in the bottom left of the screen. The fire indicator 3220 can display the message "Fire When Ready".

The fire when ready screen 3202 can further include program operation buttons 3222. The program operation buttons 3222 can allow a user to control the target tracking system 100 during use. The program operation selections 3222 can include a main screen button, a new session button, a new target button, a test comms. button, and an end program button.

After each shot the target tracking system 100 conducts a function check on all sensors and measures the battery level and then sends this data back to the shooter transceiver 132 which displays the sensor and battery status visually to the Shooter. The test comms button allows the Shooter to verify that the shooter transceiver 132 has line-of-sight communication with the target transceiver 104 prior to shooting.

Figure 33:
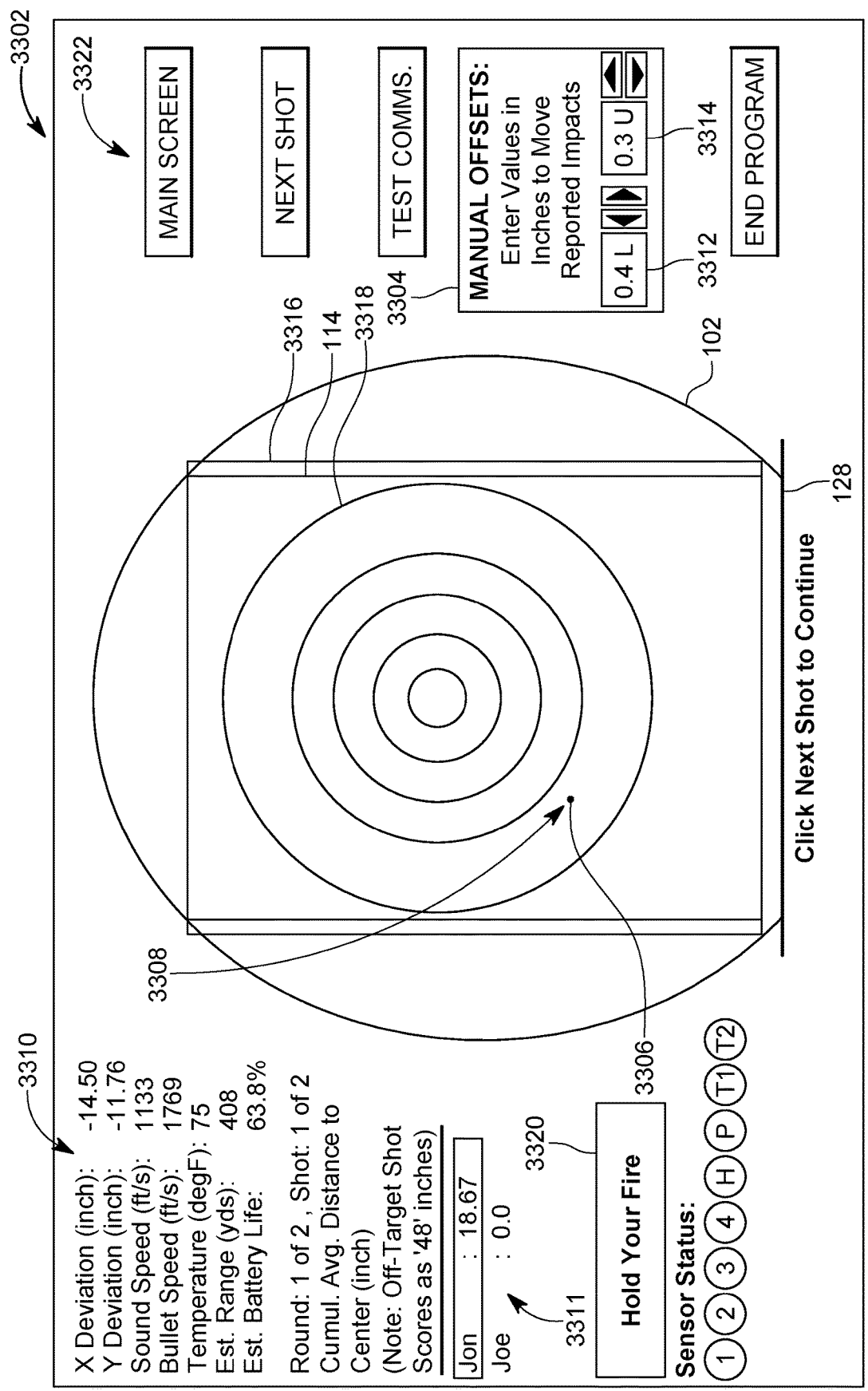
FIG. 33 is a graphical view of a first multi-shooter match hold your fire screen with manual offsets of the target tracking system of FIG. 1.

Referring now to FIG. 33, therein is shown a graphical view of a first multi-shooter match hold your fire screen 3302 with manual offsets 3304 of the target tracking system 100 of FIG. 1. The first multi-shooter match hold your fire screen 3302 can include a graphical representation of the target 114, the target frame 102, and the four-piece segmented H-frame base 128.

The target tracking system 100 can be implemented as a software based software application that interprets the data from the target transceiver 104 and the shooter transceiver 132, both of FIG. 1, into a graphical display of shot analysis, for example the bullet's impact on target on the Shooter's laptop, can be displayed as shot placements 3306 and should be understood herein as shot analysis.

The bullet caliber, grain weight, muzzle velocity, estimated target range, and estimated slope angle to the target can be entered and used for pre-populating the X-Y coordinate matrix as part of the shot analysis, for example disclosed above with regard to the pre-population step 2810 of FIG. 28A. The application can plot the latest shot on the screen in red as a last shot placement 3308 and turns the previous shot placements blue. In the present case, only a single shot has been detected in which case the first multi-shooter match hold your fire screen 3302 identifies the last shot placement 3308 in red with no other shots displayed. The last shot placement 3308 can be understood as one of the shot placements 3306.

The shot placement 3306 can be determined either by a processor within the target transceiver 104, the shooter transceiver 132, the laptop, or a processor in communication therewith. The shot placement 3306 can be the position a bullet arrives at the sensor frame plane relative to the target microphones.

An information display region 3310 can be displayed within the first multi-shooter match hold your fire screen 3302 after each shot. The information display region 3310 can display a temperature, speed of sound, bullet speed at target, estimated target range, impact deviation from center, battery life remaining, and sensor status.

The information display region 3310 can also display a shooter indicator 3311. The shooter indicator 3311 can provide a highlighting, outlining, bolding, underlining, or other indicator of a shooter currently expected to be shooting. The shooter indicator 3311 can further include the names of each shooter correlated with an average cumulative distance to the center of the target 114 for the shots of each shooter.

The manual offsets 3304 can provide a lateral offset 3312 and a vertical offset 3314 which can move the last shot placement 3308 laterally or vertically, respectively, on the first multi-shooter match hold your fire screen 3302. The manual offsets 3304 can be used when a shooter sees his shot physically on the target at a different place than is represented by the last shot placement 3308 and can then correct the last shot placement 3308 to reflect the physical placement of the shot at the target 114.

It is contemplated that manually correcting the shot placement can change the average cumulative distance to the center of the target 114 for the shots of each shooter displayed in the shooter indicator 3311. The first multi-shooter match hold your fire screen 3302 is depicted to include an extended target 3316 around the target 114 and concentric circles 3318.

The extended target 3318 can be a virtual target used for dialing in future shots, and for recording shot placement for later analysis and training. The concentric circles 3318 can provide a center mass indicator, a critical hit indicator, or a points indicator. The first multi-shooter match hold your fire screen 3302 can indicate that the target tracking system 100 is not ready for the shooter to fire with a fire indicator 3320 in the bottom left of the screen stating "Hold Your Fire".

The first multi-shooter match hold your fire screen 3302 can further include program operation buttons 3322. The program operation buttons 3322 can allow a user to control the target tracking system 100 during use. The program operation selections 3322 can include a main screen button, a next shot button, a new session button, a new target button, a test comms. button, and an end program button.

When the fire indicator 3320 indicates "Hold Your Fire" the target tracking system 100 can be instructed to continue to continue to the next shot of the shooter by clicking the "next shot button" for the program operation selections 3322.

After each shot the target tracking system 100 conducts a function check on all sensors and measures the battery level and then sends this data back to the shooter transceiver 132 which displays the sensor and battery status visually to the Shooter. The test comms button allows the Shooter to verify that the shooter transceiver 132 has line-of-sight communication with the target transceiver 104 prior to shooting.

Figure 34:
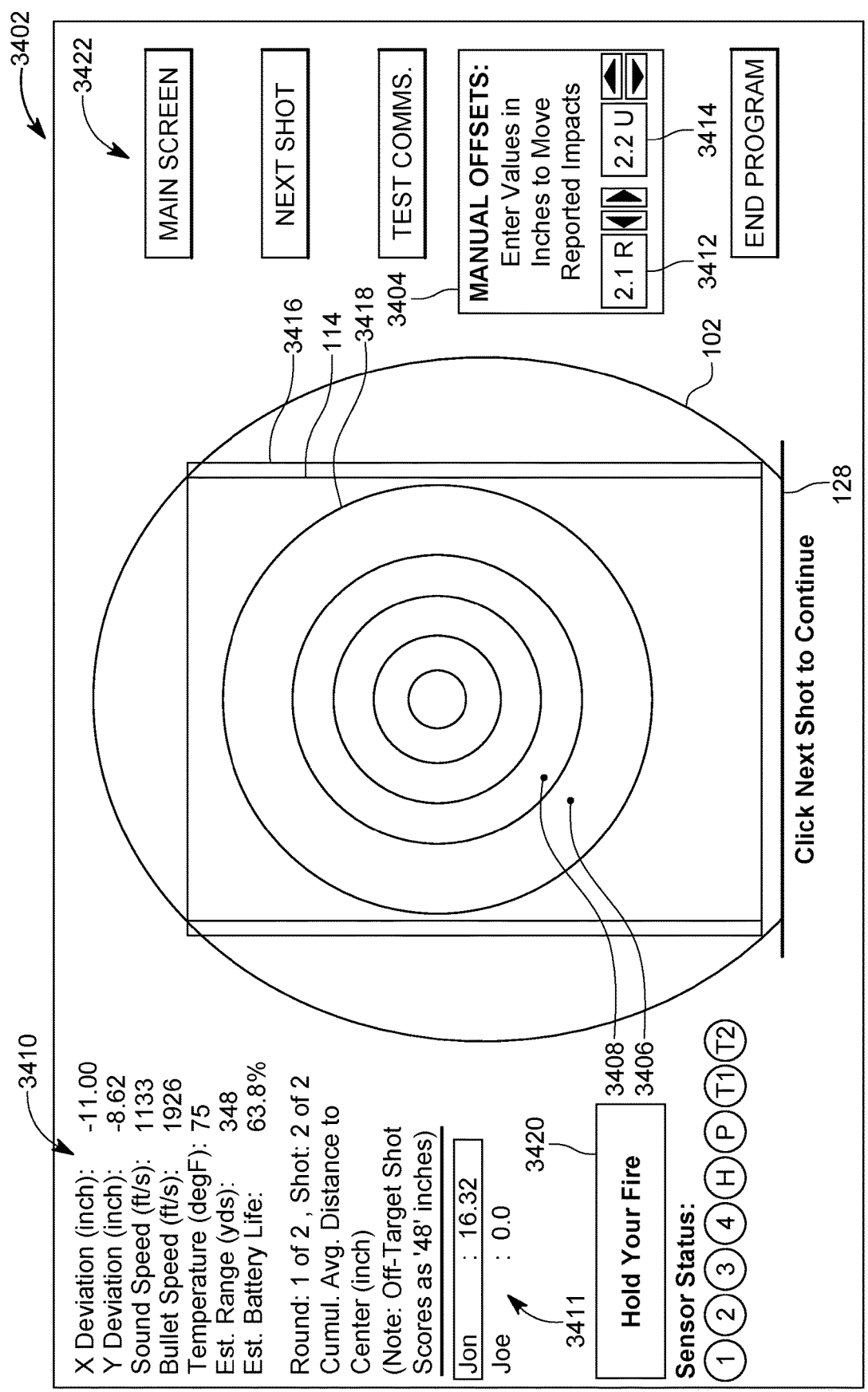
FIG. 34 is a graphical view of a second multi-shooter match hold your fire screen with manual offsets of the target tracking system of FIG. 1.

Referring now to FIG. 34, therein is shown a graphical view of a second multi-shooter match hold your fire screen 3402 with manual offsets 3404 of the target tracking system 100 of FIG. 1. The second multi-shooter match hold your fire screen 3402 can include a graphical representation of the target 114, the target frame 102, and the four-piece segmented H-frame base 128.

The target tracking system 100 can be implemented as a software based software application that interprets the data from the target transceiver 104 and the shooter transceiver 132, both of FIG. 1, into a graphical display of shot analysis, for example the bullet's impact on target on the Shooter's laptop, can be displayed as shot placements 3406 and should be understood herein as shot analysis.

The bullet caliber, grain weight, muzzle velocity, estimated target range, and estimated slope angle to the target can be entered by the shooter or user and used for pre-populating the X-Y coordinate matrix as part of the shot analysis, for example disclosed above with regard to the pre-population step 2810 of FIG. 28A. The application can plot the latest shot on the screen in red as a last shot placement 3408 and turns the previous shot placements blue. The last shot placement 3408 can be understood as one of the shot placements 3406.

The shot placement 3406 can be determined either by a processor within the target transceiver 104, the shooter transceiver 132, the laptop, or a processor in communication therewith. The shot placement 3406 can be the position a bullet arrives at the sensor frame plane relative to the target microphones.

An information display region 3410 can be displayed within the second multi-shooter match hold your fire screen 3402 after each shot. The information display region 3410 can display a temperature, speed of sound, bullet speed at target, estimated target range, impact deviation from center, battery life remaining, and sensor status.

The information display region 3410 can also display a shooter indicator 3411. The shooter indicator 3411 can provide a highlighting, outlining, bolding, underlining, or other indicator of a shooter currently expected to be shooting or engaging with the target tracking system 100. The shooter indicator 3411 can further include the names of each shooter correlated with an average cumulative distance to the center of the target 114 for the shots of each shooter.

The manual offsets 3404 can provide a lateral offset 3412 and a vertical offset 3414 which can move the last shot placement 3408 laterally or vertically, respectively, on the second multi-shooter match hold your fire screen 3402. The manual offsets 3404 can be used when a shooter sees his shot physically on the target at a different place than is represented by the last shot placement 3408 and can then correct the last shot placement 3408 to reflect the physical placement of the shot at the target 114.

It is contemplated that manually correcting the shot placement can change the average cumulative distance to the center of the target 114 for the shots of each shooter displayed in the shooter indicator 3411. The second multi-shooter match hold your fire screen 3402 is depicted to include an extended target 3416 around the target 114 and concentric circles 3418.

The extended target 3418 can be a virtual target, used for dialing in future shots, and for recording shot placement for later analysis and training. The concentric circles 3418 can provide a center mass indicator, a critical hit indicator, or a points indicator. The second multi-shooter match hold your fire screen 3402 can indicate that the target tracking system 100 is not ready for the shooter to fire with a fire indicator 3420 in the bottom left of the screen stating "Hold Your Fire".

The second multi-shooter match hold your fire screen 3402 can further include program operation buttons 3422. The program operation buttons 3422 can allow a user to control the target tracking system 100 during use. The program operation selections 3422 can include a main screen button, a next shot button, a new session button, a new target button, a test comms. button, and an end program button.

When the fire indicator 3420 indicates "Hold Your Fire" the target tracking system 100 can be instructed to continue to continue to the next shot of the shooter by the user clicking the "next shot button" for the program operation selections 3422.

After each shot the target tracking system 100 conducts a function check on all sensors and measures the battery level and then sends this data back to the shooter transceiver 132 which displays the sensor and battery status visually to the Shooter. The test comms button allows the Shooter to verify that the shooter transceiver 132 has line-of-sight communication with the target transceiver 104 prior to shooting.

Figure 35:
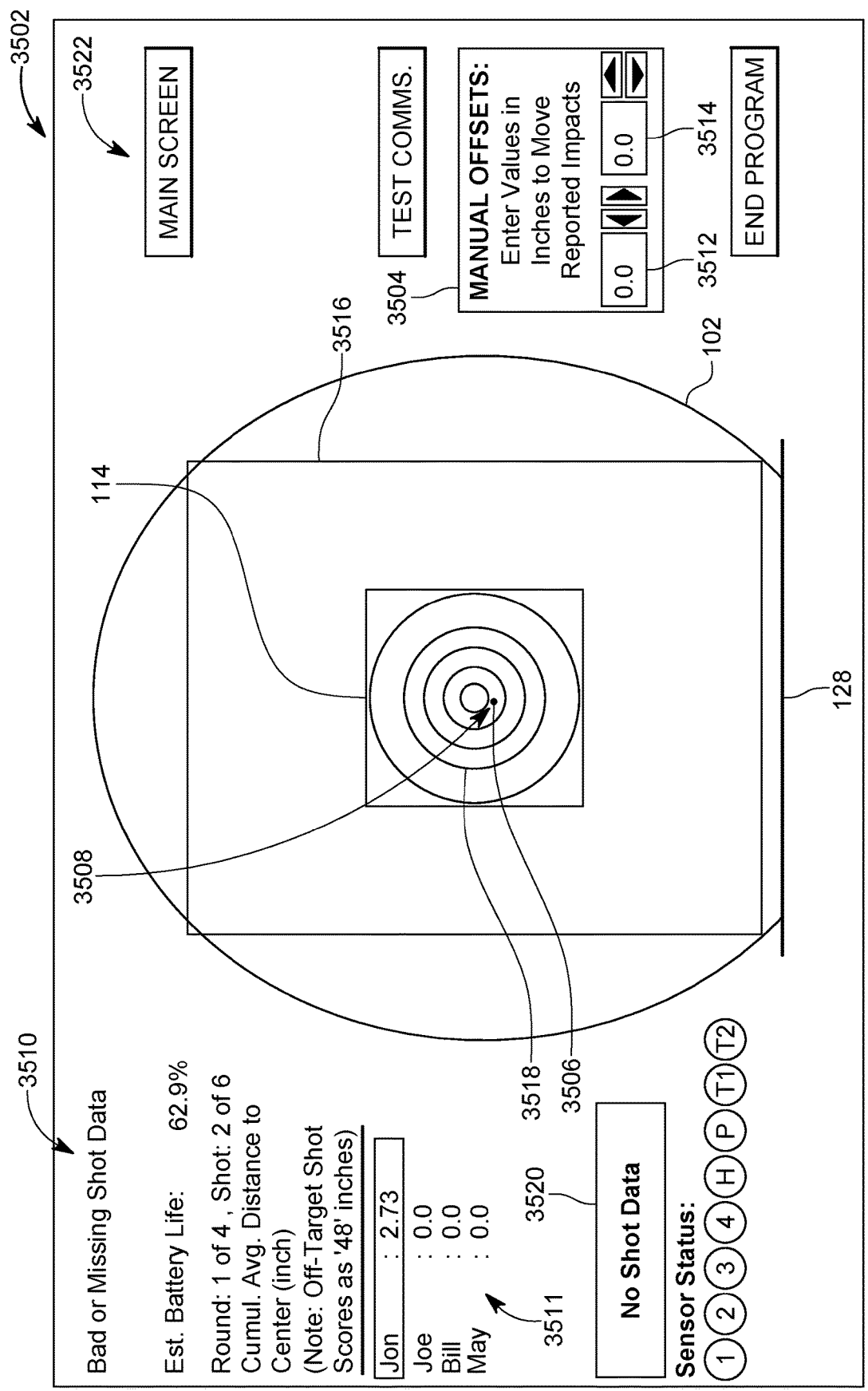
FIG. 35 is a graphical view of a multi-shooter match no shot data screen with manual offsets of the target tracking system of FIG. 1.

Referring now to FIG. 35, therein is shown a graphical view of a multi-shooter match no shot data screen 3502 with manual offsets 3504 of the target tracking system of FIG. 1. The multi-shooter match no shot data screen 3502 can include a graphical representation of the target 114, the target frame 102, and the four-piece segmented H-frame base 128.

The target tracking system 100 can be implemented as a software based software application that interprets the data from the target transceiver 104 and the shooter transceiver 132, both of FIG. 1, into a graphical display of shot analysis, for example the bullet's impact on target on the Shooter's laptop, can be displayed as shot placements 3506 and should be understood herein as shot analysis.

The bullet caliber, grain weight, muzzle velocity, estimated target range, and estimated slope angle to the target can be entered by the shooter or user and used for pre-populating the X-Y coordinate matrix as part of the shot analysis, for example disclosed above with regard to the pre-population step 2810 of FIG. 28A. The application can plot the latest shot on the screen in red as a last shot placement 3508 and turns the previous shot placements blue. In the present case, only a single shot has been detected in which case the target tracking system 100 identifies the last shot placement 3208 in red with no other shots displayed. The last shot placement 3508 can be understood as one of the shot placements 3506.

The shot placement 3506 can be determined either by a processor within the target transceiver 104, the shooter transceiver 132, the laptop, or a processor in communication therewith. The shot placement 3506 can be the position a bullet arrives at the sensor frame plane relative to the target microphones.

An information display region 3510 can be displayed within the multi-shooter match no shot data screen 3502 after each shot. The information display region 3510 can display errors such as low shot, sub-sonic shot, and bad or missing shot data. The information display region 3510 can also display a temperature, speed of sound, bullet speed at target, estimated target range, impact deviation from center, battery life remaining, and sensor status.

The information display region 3510 can also display a shooter indicator 3511. The shooter indicator 3511 can provide a highlighting, outlining, bolding, underlining, or other indicator of a shooter currently expected to be shooting or engaging with the target tracking system 100. The shooter indicator 3511 can further include the names of each shooter correlated with an average cumulative distance to the center of the target 114 for the shots of each shooter.

The manual offsets 3504 can provide a lateral offset 3512 and a vertical offset 3514 which can move the last shot placement 3508 laterally or vertically, respectively, on the multi-shooter match no shot data screen 3502. The manual offsets 3504 can be used when a shooter sees his shot physically on the target at a different place than is represented by the last shot placement 3508 and can then correct the last shot placement 3508 to reflect the physical placement of the shot at the target 114.

It is contemplated that manually correcting the shot placement can change the average cumulative distance to the center of the target 114 for the shots of each shooter displayed in the shooter indicator 3511. The multi-shooter match no shot data screen 3502 is depicted to include an extended target 3516 around the target 114 and concentric circles 3518.

The extended target 3518 can be a virtual target, used for dialing in future shots, and for recording shot placement for later analysis and training. The concentric circles 3518 can provide a center mass indicator, a critical hit indicator, or a points indicator.

It is contemplated that the extended target 3518 could be smaller or a different shape from the target 114. The multi-shooter match no shot data screen 3502 can indicate that the target tracking system 100 has received no shot data with the error displayed in the information display region 3510 as well as a fire indicator 3520 in the bottom left of the screen stating "No Shot Data".

The multi-shooter match no shot data screen 3502 can further include program operation buttons 3522. The program operation buttons 3522 can allow a user to control the target tracking system 100 during use. The program operation selections 3522 can include a main screen button, and a test comms. button.

After each shot the target tracking system 100 conducts a function check on all sensors and measures the battery level and then sends this data back to the shooter transceiver 132 which displays the sensor and battery status visually to the Shooter. The test comms button allows the Shooter to verify that the shooter transceiver 132 has line-of-sight communication with the target transceiver 104 prior to shooting.

Thus, it has been discovered that the target tracking system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

As will be appreciated target tracking system 100 algorithm, steps, control flows, and operations use the measured total flight time of the bullet, the estimated range from the Shooter, and the measured speed of sound to exclude plotting shots fired from adjacent Shooters. Adjacent Shooter muzzle blasts and/or bullet shockwaves can trigger the target position microphone sensors and/or the shooting position transceiver microphone sensor so this logic is necessarily provided to deconflict these external triggers from those of the Shooter using the target tracking system 100 as is shown in FIGS. 27A and 27B and FIGS. 29A-29D.

One benefit discovered is the portability of the target tracking system 100, in that the components, for example of FIG. 1, can be moved easily and easily positioned in a new shooting range. Furthermore, the target tracking system 100 accurately provides long-range shot placement tracking and determination between 200 and 3,000 yards, and transmit this data wirelessly back to the shooting position where it is analyzed to display either the bullet's precise on-target impact or off-target heading on a graphical representation of the target loaded on the Shooter's laptop.

The components of the target tracking system 100 that are located at the target 114, while vulnerable to being hit and damaged by a bullet, are small, low-cost, and easily interchangeable and replaceable with spare components provided with the target tracking system 100. The probability of being hit is very low but when a hit does occur the time to replace the affected component and resume shooting is very small. Furthermore, the target frame including a hoop coupled to a frame base, and the target microphones are lightweight and portable by a single person.

While the target tracking system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

It is to be understood that the target microphones, shooter microphones, and processors described herein can not be replaced with a human equivalent. For example, it is impossible for the human ear to record the precise time and order of a shockwave from multiple locations simultaneously with enough accuracy to calculate a location that a bullet passed creating the shockwave or its speed.

What is claimed is:

1. A target tracking system comprising:
   target microphones configured to generate a detection of a shock wave of a bullet, the target microphones including an offset target microphone;
   a target transceiver communicatively connected to the target microphones for wirelessly transmitting data generated based on the detection of the shock wave; and
   a processor communicatively connected with the target transceiver for determining a shot placement of the bullet relative to the target microphones, the shot placement determined with a lookup matrix for matching a triggering order of the target microphones and triggering time differentials of the target microphones with X-Y coordinates, the processor configured to determine a bullet speed at the target microphones based on the shock wave detected by the offset target microphone.

2. The system of claim 1 wherein:
   the target microphones include a first target microphone, a second target microphone, and a third target microphone distributed on a target frame, and the data is generated based on the detection of the shock wave with the first target microphone, the second target microphone, and the third target microphone; and
   the processor is configured to determine good shot data based on timing analysis of the data.

3. The system of claim 1 wherein:
   the target microphones include other target microphones; and
   the offset target microphone is offset a distance more than one foot from the other target microphones.

4. The system of claim 1 further comprising a speaker configured to emit a tone for verifying the target microphones are operational, for calibrating the target microphones, or a combination thereof.

5. The system of claim 1 further comprising a target frame including a hoop coupled to a frame base, and at least one of the target microphones is affixed to the hoop.

6. A target tracking system comprising:
   target microphones configured to generate a detection of a shock wave of a bullet, the target microphones including an offset target microphone;
   a target transceiver communicatively connected to the target microphones for wirelessly transmitting data generated based on the detection of the shock wave;
   a shooter transceiver configured to wirelessly communicate with the target transceiver; and
   a processor communicatively connected with the target transceiver for determining a shot placement of the bullet relative to the target microphones, the shot placement determined with a lookup matrix for matching a triggering order of the target microphones and triggering time differentials of the target microphones with X-Y coordinates, the processor configured to determine a bullet speed at the target microphones based on the shock wave detected by the offset target microphone.

7. The system of claim 6 wherein the shooter transceiver is configured to provide a wake up signal for the target transceiver based on the shooter transceiver detecting a shot.

8. The system of claim 6 wherein:
   the shooter transceiver includes a shooter microphone for detecting sound and a sensor for detecting vibration; and
   the processor is configured to determine whether a triggering of the shooter transceiver was from an adjacent shooter or from the vibration of the shooter transceiver and the triggering should be ignored.

9. The system of claim 6 wherein the processor is configured to provide a multi-shooter mode and a single-shooter mode.

10. The system of claim 6 further comprising a digital display communicatively connected with the processor and the shooter transceiver, the digital display displaying the shot placement, the digital display further displaying a lateral offset or a vertical offset for changing a location of the shot placement displayed on the digital display.

11. A method of operating a target tracking system comprising:
   generating data based on a detection of a shock wave of a bullet by target microphones, the target microphones including an offset target microphone;
   wirelessly transmitting the data with a target transceiver communicatively connected to the target microphones;
   determining a bullet speed at the target microphones based on the shock wave detected by the offset target microphone with a processor; and determining a shot placement of the bullet relative to the target microphones with the processor, the shot placement determined with a lookup matrix for matching a triggering order of the target microphones and triggering time differentials of the target microphones with X-Y coordinates, the processor communicatively connected to the target transceiver.

12. The method of claim 11 wherein:
generating the data based on the detection of the shock wave by the target microphones includes detecting the shock wave with a first target microphone, a second target microphone, and a third target microphone distributed on a target frame; and
determining good shot data based on a timing analysis, with the processor, of the data.

13. The method of claim 11 wherein generating the data based on the detection of the shock wave by the target microphones includes detecting the shock wave with the offset target microphone and an other target microphone, the offset target microphone offset a distance more than one foot from the other target microphone.

14. The method of claim 11 further comprising emitting a tone with a speaker for verifying the target microphones are operational, for calibrating the target microphones, or a combination thereof.

15. The method of claim 11 further comprising:
coupling a target frame including a hoop to a frame base; and
affixing at least one of the target microphones to the hoop.

16. The method of claim 11 further comprising wirelessly connecting a shooter transceiver with the target transceiver.

17. The method of claim 16 further comprising providing a wake up signal for the target transceiver based on the shooter transceiver detecting a shot.

18. The method of claim 16 wherein:
wirelessly connecting the shooter transceiver includes wirelessly connecting a shooter microphone for detecting sound and a sensor for detecting vibration; and
further comprising:
determining, with the processor, whether a triggering of the shooter transceiver was from an adjacent shooter or from the vibration of the shooter transceiver and the triggering should be ignored.

19. The method of claim 16 further comprising providing, with the processor, a multi-shooter mode and a single-shooter mode.

20. The method of claim 16 further comprising:
displaying the shot placement on a digital display; and
displaying a lateral offset, or a vertical offset for changing a location of the shot placement displayed on the digital display.

* * * * *